United States Patent
Yun et al.

(10) Patent No.: US 10,961,457 B2
(45) Date of Patent: Mar. 30, 2021

(54) LIQUID-CRYSTALLINE MEDIUM

(71) Applicant: Merck Patent GmbH, Darmstadt (DE)

(72) Inventors: Chang-Jun Yun, Gyeonggi-do (KR); Chang-Suk Choi, Chungcheongnam-do (KR); Yeon-Jeong Han, Gyeonggi-do (KR); Heui-Seok Jin, Gyeonggi-do (KR); Yong-Kuk Yun, Gyeonggi-do (KR)

(73) Assignee: Merck Patent GmbH, Darmstadt (DE)

( * ) Notice: Subject to any disclaimer, the term of this patent is extended or adjusted under 35 U.S.C. 154(b) by 45 days.

(21) Appl. No.: 15/923,424

(22) Filed: Mar. 16, 2018

(65) Prior Publication Data
US 2018/0265785 A1  Sep. 20, 2018

(30) Foreign Application Priority Data

Mar. 16, 2017  (EP) ................. 17161384

(51) Int. Cl.
| | | |
|---|---|---|
| *G02F 1/1333* | (2006.01) | |
| *C09K 19/54* | (2006.01) | |
| *C09K 19/30* | (2006.01) | |
| *C09K 19/20* | (2006.01) | |
| *C09K 19/02* | (2006.01) | |
| *C09K 19/34* | (2006.01) | |
| *C09K 19/04* | (2006.01) | |
| *C09K 19/12* | (2006.01) | |
| *G02F 1/00* | (2006.01) | |

(52) U.S. Cl.
CPC .......... *C09K 19/54* (2013.01); *C09K 19/0208* (2013.01); *C09K 19/20* (2013.01); *C09K 19/3066* (2013.01); *C09K 19/3402* (2013.01); *C09K 2019/0466* (2013.01); *C09K 2019/123* (2013.01); *C09K 2019/3004* (2013.01); *C09K 2019/3009* (2013.01); *C09K 2019/3016* (2013.01); *C09K 2019/3027* (2013.01); *C09K 2019/3422* (2013.01); *G02F 1/0045* (2013.01)

(58) Field of Classification Search
CPC .... C09K 19/54; C09K 19/0208; C09K 19/20; C09K 19/3066; C09K 19/3402; C09K 2019/0466; C09K 2019/123; C09K 2019/3004; C09K 2019/3009; C09K 2019/3016; C09K 2019/3027; C09K 2019/3422; G02F 1/1333; G02F 1/0045

USPC .................................................... 252/299.5
See application file for complete search history.

(56) References Cited

U.S. PATENT DOCUMENTS

| | | | |
|---|---|---|---|
| 5,858,270 | A | 1/1999 | Matsui |
| 9,873,834 | B2 | 1/2018 | Goebel |
| 2013/0207038 | A1 | 8/2013 | Haensel |
| 2013/0256596 | A1 | 10/2013 | Hirschmann |
| 2016/0060528 | A1 | 3/2016 | Goetz |
| 2017/0002269 | A1 | 1/2017 | Junge |
| 2017/0037315 | A1 | 2/2017 | Hirschmann |
| 2017/0037316 | A1* | 2/2017 | Goetz ............ G02F 1/137 |
| 2017/0362506 | A1 | 12/2017 | Hirschmann |

FOREIGN PATENT DOCUMENTS

| | | |
|---|---|---|
| EP | 0786445 B1 | 7/2002 |
| EP | 2628779 A2 | 8/2013 |
| EP | 3112441 A1 | 1/2017 |
| EP | 3127989 A1 | 2/2017 |
| EP | 2993216 B1 | 7/2017 |
| WO | 2004048501 A1 | 6/2004 |
| WO | 2012076104 A1 | 6/2012 |
| WO | 2016146245 A1 | 9/2016 |

OTHER PUBLICATIONS

Search Report in corresponding EP application 18161353 dated May 25, 2018.

* cited by examiner

*Primary Examiner* — Geraldina Visconti
(74) *Attorney, Agent, or Firm* — Millen White Zelano & Branigan, PC; Brion P. Heaney

(57) ABSTRACT

The present invention relates to liquid-crystalline media comprising
a) one or more compounds of the formula ST-1, as defined herein,
and
b) one or more compounds of the formula ST-2, as defined herein,
and
c) one or more compounds of the formula RV, as defined herein,
and
d) one or more compounds selected from formula IA and IB, as defined herein,
and to liquid-crystal displays containing these media, especially to displays addressed by an active matrix and in particular to displays of the in-plane switching (IPS) or fringe-field switching (FFS) type.

24 Claims, No Drawings

LIQUID-CRYSTALLINE MEDIUM

The present invention relates to liquid-crystalline media and to liquid-crystal displays containing these media, especially to displays addressed by an active matrix and in particular to displays of the in-plane switching (IPS) or fringe-field switching (FFS) type.

Liquid-crystal displays (LCDs) are used in many areas for the display of information. LCDs are used both for direct-view displays and for projection-type displays. The electro-optical modes used are, for example, the twisted nematic (TN), super twisted nematic (STN), optically compensated bend (OCB) and electrically controlled birefringence (ECB) modes together with their various modifications, as well as others. All these modes utilize an electric field which is substantially perpendicular to the substrates or the liquid-crystal layer. Besides these modes, there are also electro-optical modes that utilize an electric field which is substantially parallel to the substrates or the liquid-crystal layer, such as, for example, the in-plane switching (IPS) mode (as disclosed, for example, in DE 40 00 451 and EP 0 588 568) and the fringe field switching (FFS) mode, in which a strong "fringe field" is present, i.e. a strong electric field close to the edge of the electrodes and, throughout the cell, an electric field which has both a strong vertical component and a strong horizontal component. These latter two electro-optical modes in particular are used for LCDs in modern desktop monitors and displays for TV sets and multimedia applications. The liquid crystals according to the present invention are preferably used in displays of this type. In general, dielectrically positive liquid-crystalline media having rather lower values of the dielectric anisotropy are used in FFS displays, but in some cases liquid-crystalline media having a dielectric anisotropy of only about 3 or even less are also used in IPS displays.

For these displays, novel liquid-crystalline media having improved properties are required. The addressing times in particular have to be improved for many types of application. Thus, liquid-crystalline media having lower viscosities ($\eta$), especially having lower rotational viscosities ($\gamma_1$), are required. Besides these viscosity parameters, the media must have a nematic phase range of suitable width and position and an appropriate birefringence ($\Delta n$), and the dielectric anisotropy ($\Delta\varepsilon$) should be sufficiently high to allow a reasonably low operating voltage.

The displays according to the present invention are preferably addressed by an active matrix (active matrix LCDs, AMDs for short), preferably by a matrix of thin film transistors (TFTs). However, the liquid crystals according to the invention can also advantageously be used in displays having other known addressing means.

Liquid-crystal compositions which are suitable for LCDs and especially for IPS displays are known, for example, from JP 07-181 439 (A), EP 0 667 555, EP 0 673 986, DE 195 09 410, DE 195 28 106, DE 195 28 107, WO 96/23 851 and WO 96/28 521. However, these compositions have certain disadvantages. Amongst other deficiencies, most of them result in disadvantageously long addressing times, have inadequate values of the resistivity and/or require excessively high operating voltages. In addition, there is a demand for improving the low-temperature behavior of LCDs. Both an improvement in the operating properties and also in the shelf life are necessary here.

A special problem arises during the manufacture of a display panel. An LCD display is typically produced by adhesively bonding a first substrate having a pixel electrode, a thin-film transistor (TFT) and other components to a second substrate which contains a common electrode, using a sealant. The space enclosed by the substrates is filled with the liquid crystal via a fill opening by means of capillary force or vacuum; the fill opening is subsequently sealed using a sealant. With the increase in the size of liquid-crystal displays in recent years, the so-called "one drop filling" process (ODF process) has been proposed as a process for the mass production of liquid-crystal displays (see, for example, JPS63-179323 and JPH10-239694) in order to shorten the cycle times during production. This is a process for the production of a liquid-crystal display in which one or a plurality of drops of the liquid crystal is applied to the substrate, which is fitted with electrodes and is provided with a sealant round the edges. The second substrate is subsequently mounted in vacuo and the sealant is cured.

However, the one drop filling bears the risk of causing display defects referred to as "ODF mura" or "drop mura" where symmetrical patterns related to the arrangement of the individual drops that had been dispensed in the ODF process remain visible after assembly of the panel. Depending on their size and shape, small circular spots ("dotting mura") or larger, rather square areas (chess pattern mura) can be visible. Another visible defect is the so-called spreading or edge mura which is associated with the ODF process especially for large panels e.g. for TV and which is a defect that becomes visible near the edges of a display.

The invention has the object of providing media, in particular for FFS, IPS, TN, positive VA (vertically aligned) or STN displays of this type, which do not exhibit the disadvantages indicated above or only do so to a lesser extent and preferably have fast response times and low rotational viscosities at the same time as a high clearing point, as well as high dielectric anisotropy and a low threshold voltage and the use of which leads to at least partial or complete elimination of mura, in particular spreading mura or edge mura, sufficiently low for applications.

The problem was solved by providing liquid-crystalline media comprising stabilizers as described below.

The invention relates to a liquid-crystalline medium, characterized in that it comprises a) one or more compounds of the formula ST-1,

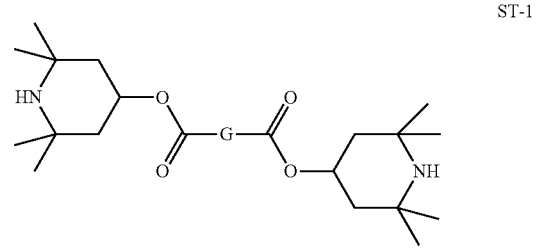

ST-1 in which

G denotes a divalent aliphatic or cycloaliphatic radical having 1 to 20 C atoms;

and b) one or more compounds of the formula ST-2

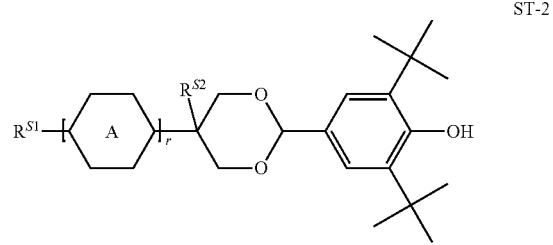

ST-2 in which

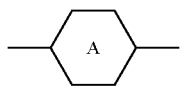

denotes

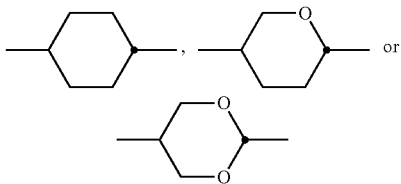

$R^{S1}$ denotes H, an alkyl, alkenyl or alkoxy radical having up to 15 C atoms, in which one or more H atoms may each be replaced by halogen, $R^{S2}$ denotes H, alkyl or alkenyl or alkoxy having up to 7 C atoms, in which one or more H atoms may each be replaced by halogen, r is 0 or 1;

and c) one or more compounds of the formula RV

in which $R^{21}$ denotes an unsubstituted alkyl radical having 1 to 7 C atoms or an unsubstituted alkenyl radical having 2 to 7 C atoms, and $R^{22}$ denotes an unsubstituted alkenyl radical having 2 to 7 C atoms, and d) one or more compounds selected from the group of compounds of the formulae IA and IB,

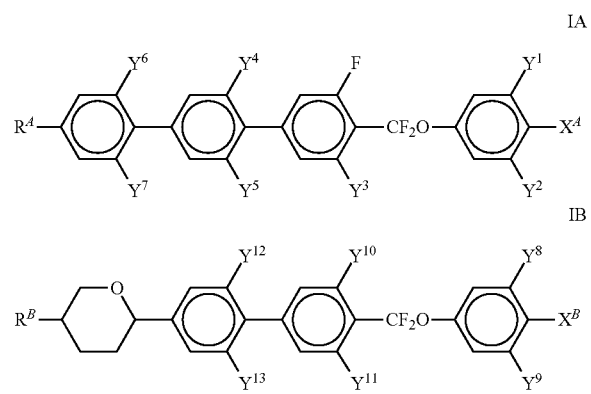

wherein $R^A$ and $R^B$ each, independently of one another, denote a halogenated or unsubstituted alkyl or alkoxy radical having 1 to 15 C atoms, where, in addition, one or more $CH_2$ groups in these radicals may each be replaced, independently of one another, by —C≡C—, —$CF_2$O—, —CH=CH—,

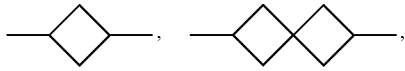

—O—, —CO—O— or —O—CO— in such a way that O atoms are not linked directly to one another, $X^A$ and $X^B$ each, independently of one another, denote F, Cl, CN, $SF_5$, SCN, NCS, a halogenated alkyl radical, a halogenated alkenyl radical, a halogenated alkoxy radical or a halogenated alkenyloxy radical, each having up to 6 C atoms, and $Y^{1-13}$ each, independently of one another, denote H or F.

Surprisingly, it has been found that the liquid-crystalline media according to the invention show improved reliability compared to unstabilized media. Unexpectedly, the improved reliability is associated with a very low level of edge mura in display panels.

The compounds of the formulae IA and IB are known, for example, from WO 2004/048501 A and EP 0 786 445.

Stabilizers of formula ST-1 are described for example in EP 2 993 216 A1. A stabilizer of formula ST-2 is proposed in WO 2012/076104 as a co-stabilizer in media having negative dielectric anisotropy.

If $R^A$ and $R^B$ in the formulae above and below denote an alkyl radical and/or an alkoxy radical, this may be straight-chain or branched. It is preferably straight-chain, has 2, 3, 4, 5, 6 or 7 C atoms and accordingly preferably denotes ethyl, propyl, butyl, pentyl, hexyl, heptyl, ethoxy, propoxy, butoxy, pentoxy, hexyloxy or heptyloxy, furthermore methyl, octyl, nonyl, decyl, undecyl, dodecyl, tridecyl, tetradecyl, pentadecyl, methoxy, octyloxy, nonyloxy, decyloxy, undecyloxy, dodecyloxy, tridecyloxy or tetradecyloxy. $R^A$ and $R^B$ each preferably denote straight-chain alkyl having 2-6 C atoms.

Oxaalkyl preferably denotes straight-chain 2-oxapropyl (=methoxymethyl), 2-(=ethoxymethyl) or 3-oxabutyl (=2-methoxyethyl), 2-, 3- or 4-oxapentyl, 2-, 3-, 4- or 5-oxahexyl, 2-, 3-, 4-, 5- or 6-oxaheptyl, 2-, 3-, 4-, 5-, 6- or 7-oxaoctyl, 2-, 3-, 4-, 5-, 6-, 7- or 8-oxanonyl, 2-, 3-, 4-, 5-, 6-, 7-, 8- or 9-oxa-decyl.

If $R^A$ and $R^B$ denote an alkyl radical in which one $CH_2$ group has been replaced by —CH=CH—, this may be straight-chain or branched. It is preferably straight-chain and has 2 to 10 C atoms. Accordingly, it denotes, in particular, vinyl, prop-1- or -2-enyl, but-1-, -2- or -3-enyl, pent-1-, -2-, -3- or -4-enyl, hex-1-, -2-, -3-, -4- or -5-enyl, hept-1-, -2-, -3-, -4-, -5- or -6-enyl, oct-1-, -2-, -3-, -4-, -5-, -6- or -7-enyl, non-1-, -2-, -3-, -4-, -5-, -6-, -7- or -8-enyl, dec-1-, -2-, -3-, -4-, -5-, -6-, -7-, -8- or -9-enyl.

If $R^A$ and $R^B$ denote an alkyl or alkenyl radical which is at least monosubstituted by halogen, this radical is preferably straight-chain, and halogen is preferably F or Cl. In the case of polysubstitution, halogen is preferably F. The resultant radicals also include perfluorinated radicals. In the case of monosubstitution, the fluorine or chlorine substituent may be in any desired position, but is preferably in the ω-position.

In the formulae above and below, $X^A$ and/or $X^B$ are preferably F, Cl or a mono- or polyfluorinated alkyl or alkoxy radical having 1, 2 or 3 C atoms or a mono- or polyfluorinated alkenyl radical having 2 or 3 C atoms. $X^A$ and/or $X^B$ are particularly preferably F, Cl, $CF_3$, $CHF_2$, $OCF_3$, $OCHF_2$, $OCFHCF_3$, $OCFHCHF_2$, $OCFHCF_3$, $OCF_2CH_3$, $OCF_2CHF_2$, $OCF_2CF_3$, $OCF_2CF_2CHF_2$, $OCF_2CF_2CF_3$, $OCFHCF_2CF_3$, $OCFHCF_2CHF_2$, $OCF_2CF_2CF_3$, $OCF_2CF_2CClF_2$, $OCClFCF_2CF_3$, $OCH=CF_2$, $CH=CF_2$, or $OCF=CF_2$, very particularly preferably F or $OCF_3$, furthermore $CF_3$, $OCF=CF_2$, $OCHF_2$ or $OCH=CF_2$.

Particular preference is given to compounds of the formulae IA and IB in which $X^A$ and/or $X^B$ denote F or $OCF_3$, preferably F. Preferred compounds of the formula IA are those in which $Y^1$ denotes F, those in which $Y^2$ denotes F, those in which $Y^3$ denotes H, those in which $Y^4$ denotes H and $Y^5$ denotes F, and those in which $Y^6$ and $Y^7$ each denote H. Preferred compounds of the formula IB are those in which $Y^8$ denotes F, those in which $Y^9$ denotes F, those in which $Y^{19}$ denotes F, those in which $Y^{11}$ denotes F, and those in which $Y^{12}$ and $Y^{13}$ each denote H.

Examples of the group G in Formula ST-1 are methylene, ethylene or polymethylene having up to 20 carbon atoms; or the alkylene radical is interrupted by one or two hetero atoms, such as the bivalent radicals —$CH_2OCH_2$—, —$CH_2CH_2OCH_2CH_2$—, —$CH_2CH_2OCH_2CH_2OCH_2CH_2$—, —$CH_2C(O)OCH_2CH_2O(O)CCH_2$—, —$CH_2CH_2C(O)OCH_2CH_2O(O)CCH_2CH_2$—, —$CH_2CH_2$—C(O)O(CH_2)_4O(O)C—CH_2CH_2$—, —$CH_2CH_2O(O)C(CH_2)_4C(O)OCH_2CH_2$— and —$CH_2CH_2O(O)C(CH_2)_8C(O)OCH_2CH_2$—.

G can also be arylene-bis-alkylene, e.g. p-xylylene, benzene-1,3-bis(ethylene), biphenyl-4,4'-bis(methylene) or naphthalene-1,4-bis(methylene).

Preferably, the compounds of formula ST-1 are selected from the compounds of the formula ST-1a

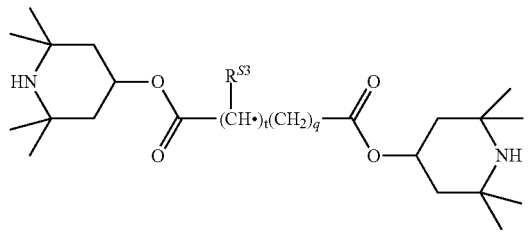

ST-1a wherein
$R^{S3}$ denotes H or alkyl having 1 to 6 C atoms, preferably H or ethyl;
t is 0 or 1, and
q is 0, 1, 2, 3, 4, 5, 6, 7, 8, or 9.

Particularly preferably, the compounds of formula ST-1a are selected from the compounds of the formulae ST-1a-1 and ST-1a-2, preferably ST-1a-2. These compounds are distinguished by a very good solubility in liquid-crystalline media.

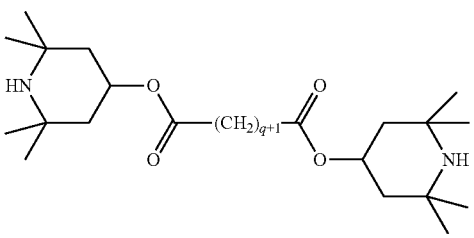

ST-1a-1

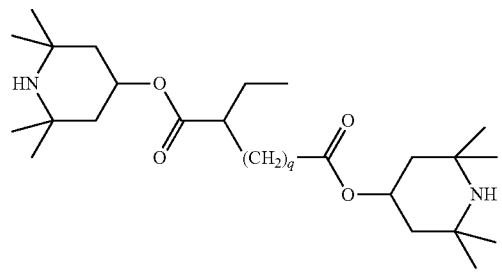

ST-1a-2 wherein q is 0, 1, 2, 3, 4, 5, 6, 7, 8, or 9, preferably 6, 7 or 8, particularly preferably 7.

Preferred compounds of the formula ST-2 are the compounds selected from the group of compounds of the formulae ST-2a and ST-2b, particularly preferred from the compounds of the formula ST-2a:

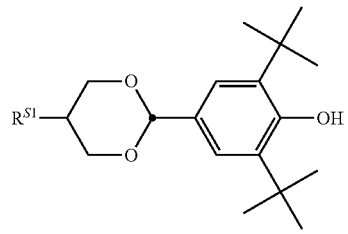

ST-2a

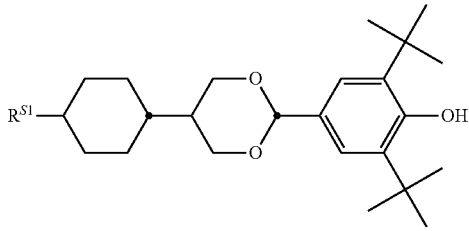

ST-2b in which
$R^{S1}$ has the meaning given above and preferably denotes alkyl having 1 to 7 C atoms, particularly preferably ethyl, n-propyl, n-butyl or n-pentyl.

The medium according to the invention preferably comprises one or more compounds of formula ST-2a, preferably selected from the group of compounds of the formulae ST-2a-1 to ST-2a-5

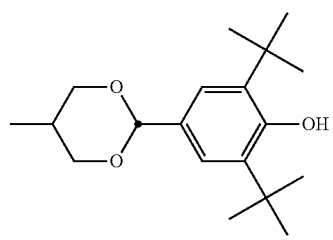

ST-2a-1

ST-2a-2

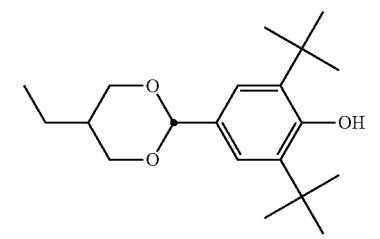

ST-2a-3

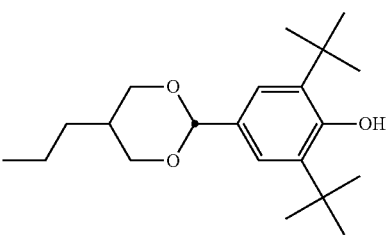

ST-2a-4

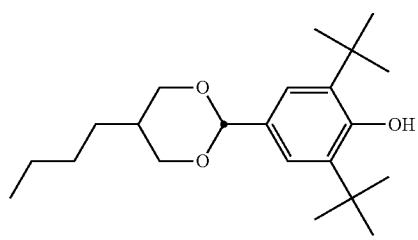

ST-2a-5

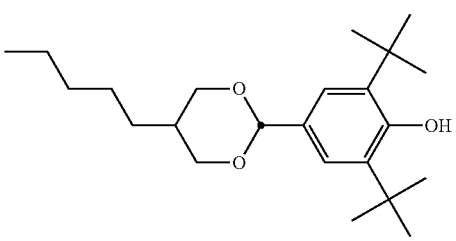

Particularly preferably, compound ST-2a-3 is employed.

Preferred compounds of formula RV are selected from the group of compounds of the formulae RV-1 to RV-7

RV-1

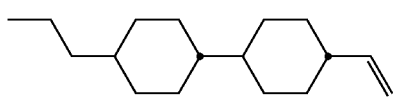

RV-2

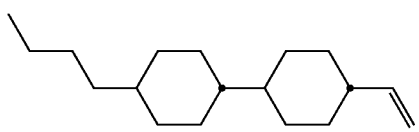

RV-3

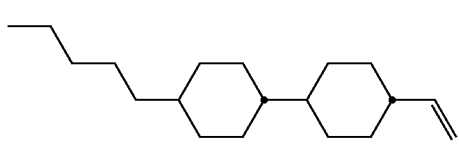

RV-4

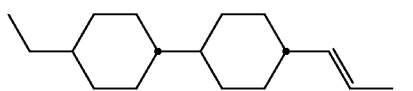

RV-5

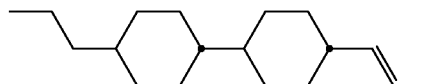

RV-6

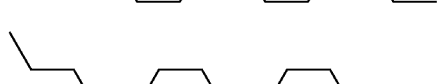

RV-7

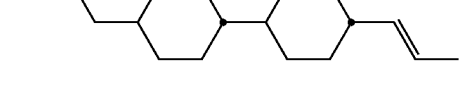

Particularly preferred compounds of the formula IA are selected from the following sub-formulae:

IA-a

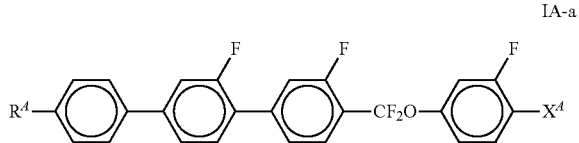

IA-b

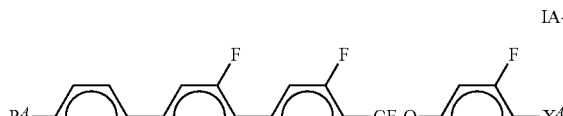

IA-c

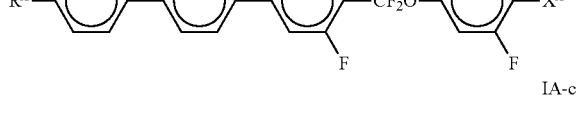

IA-d

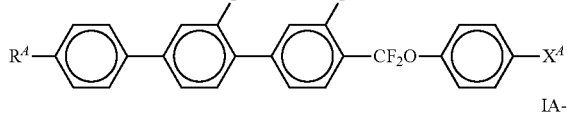

IA-e

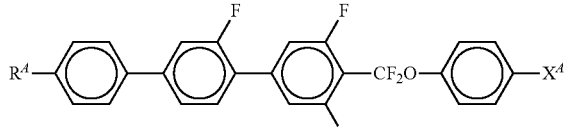

IA-f

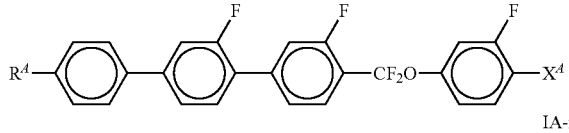

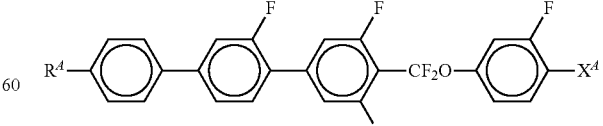

in which $R^A$ and $X^A$ have the meanings indicated above in formula IA.

$R^A$ preferably denotes straight-chain alkyl having 1 to 6 C atoms, in particular ethyl and propyl, furthermore alkenyl having 2 to 6 C atoms.

Very particular preference is given to the compound of the sub-formula IA-b.

Particularly preferred compounds of the formula IB are selected from the following sub-formulae:

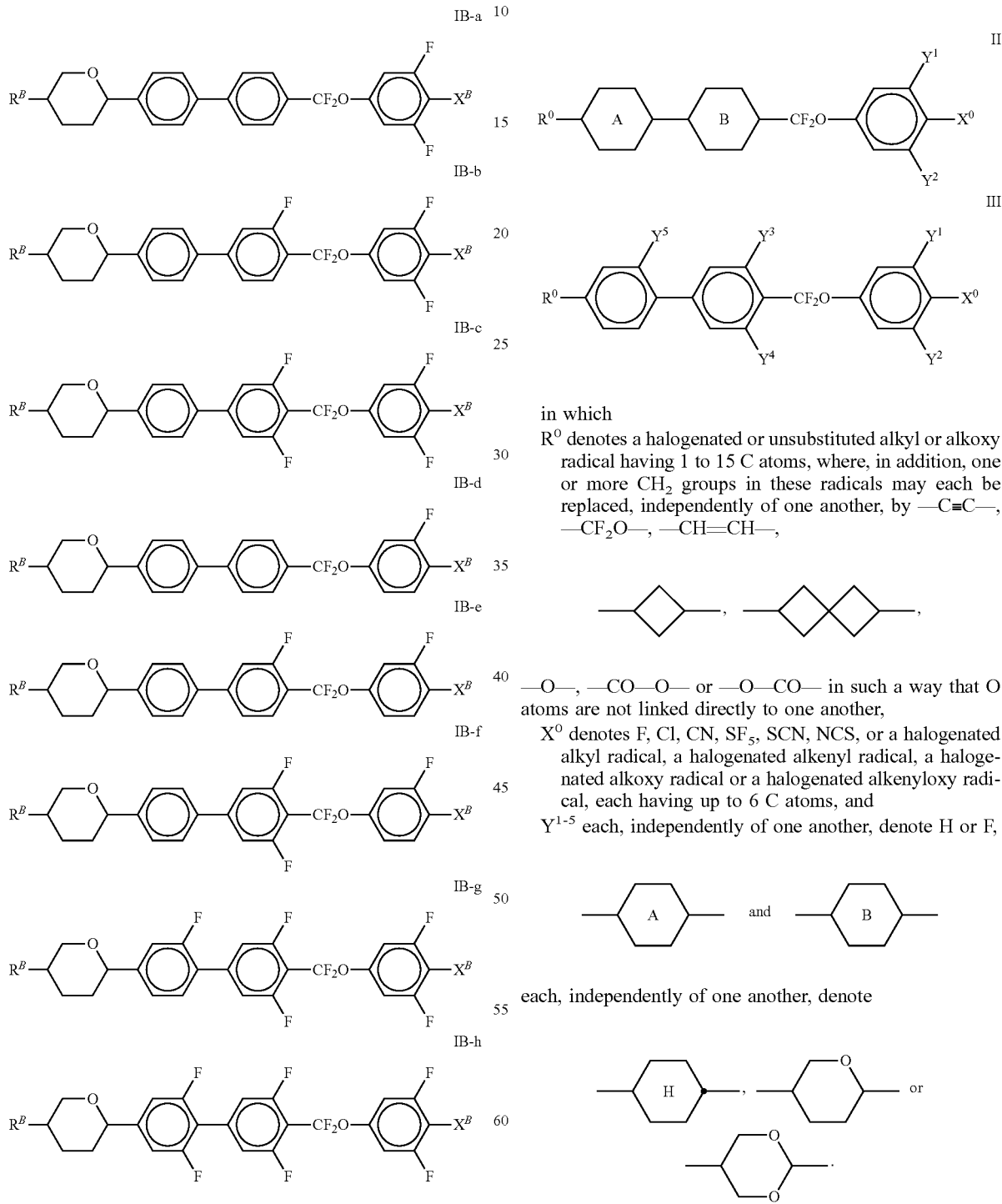

in which $R^B$ and $X^B$ have the meanings indicated in above in formula IB.

$R^B$ preferably denotes straight-chain alkyl having 1 to 6 C atoms, in particular propyl, butyl and pentyl, furthermore alkenyl having 2 to 6 C atoms.

Very particular preference is given to the compound of the sub-formula IB-c.

Further preferred embodiments are indicated below:

The medium additionally comprises one or more compounds of the formulae II and/or III in which $R^0$ denotes a halogenated or unsubstituted alkyl or alkoxy radical having 1 to 15 C atoms, where, in addition, one or more $CH_2$ groups in these radicals may each be replaced, independently of one another, by —C≡C—, —$CF_2$O—, —CH═CH—, —O—, —CO—O— or —O—CO— in such a way that O atoms are not linked directly to one another, $X^0$ denotes F, Cl, CN, $SF_5$, SCN, NCS, or a halogenated alkyl radical, a halogenated alkenyl radical, a halogenated alkoxy radical or a halogenated alkenyloxy radical, each having up to 6 C atoms, and $Y^{1-5}$ each, independently of one another, denote H or F, each, independently of one another, denote The compounds of the formula II are preferably selected from the following formulae:

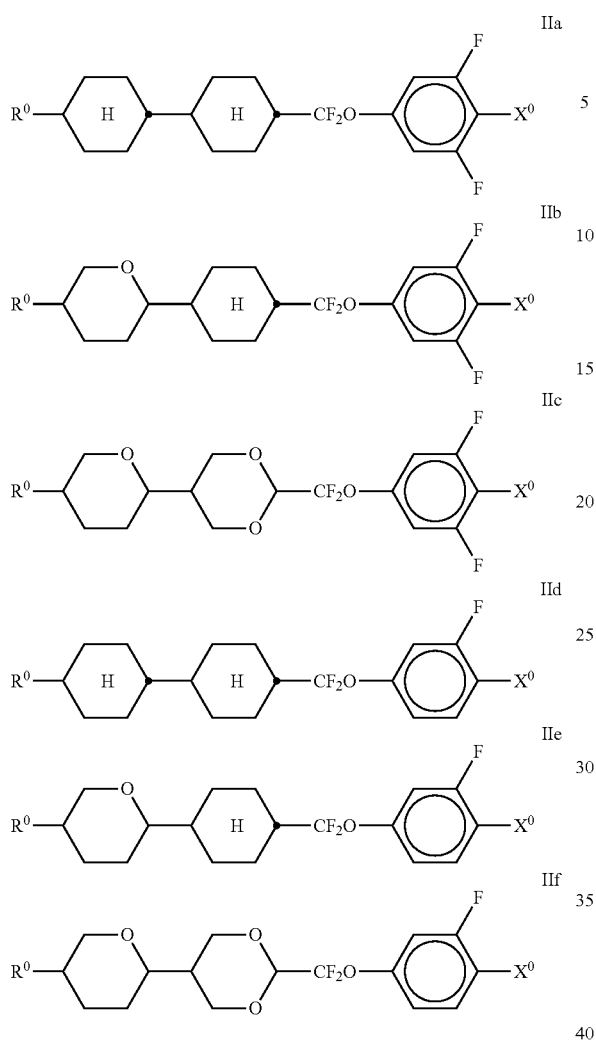

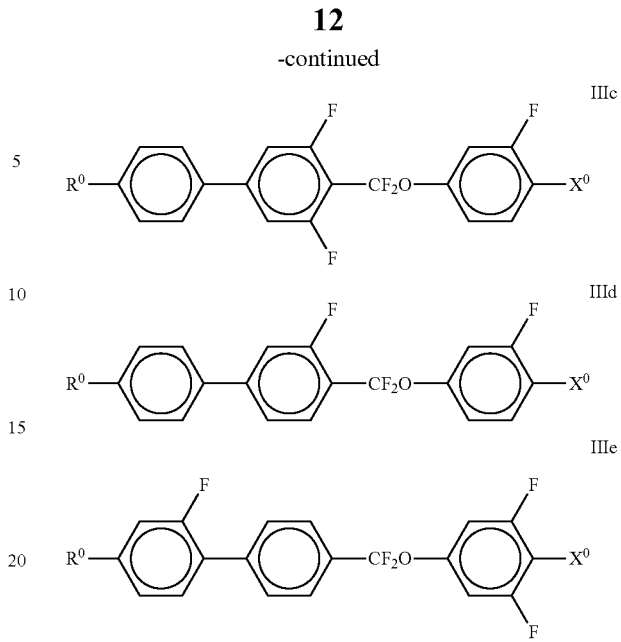

in which $R^0$ and $X^0$ have the meanings indicated above.

$R^0$ preferably denotes alkyl having 1 to 6 C atoms. $X^0$ preferably denotes F. Particular preference is given to compounds of the formulae IIIa and IIIe, in particular compounds of the formula IIIa;

The medium additionally comprises one or more compounds selected from the following formulae:

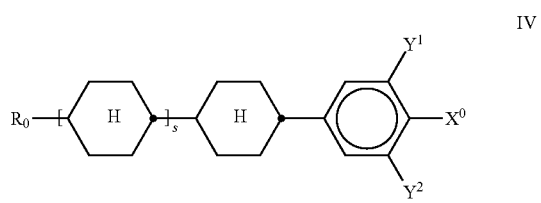

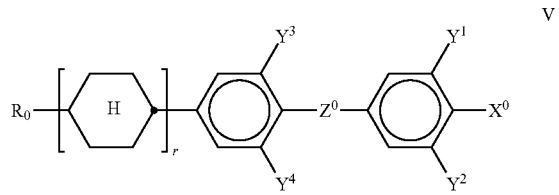

in which $R^0$ and $X^0$ have the meanings indicated above.

$R^0$ preferably denotes alkyl having 1 to 6 C atoms. $X^0$ preferably denotes F. Particular preference is given to compounds of the formulae IIa and IIb, in particular compounds of the formulae IIa and IIb in which $X^0$ denotes F.

The compounds of the formula III are preferably selected from the following formulae:

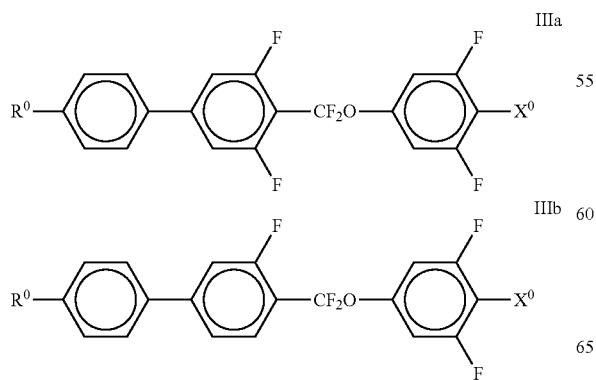

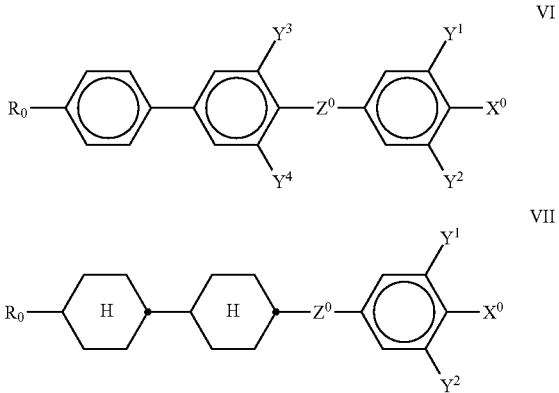

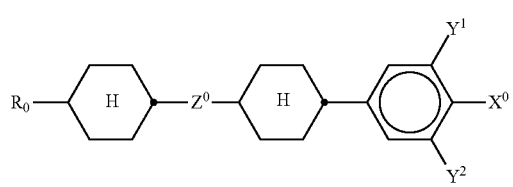

VIII in which

R⁰, X⁰ and $Y^{1-4}$ have the meanings indicated above, and

Z⁰ denotes —$C_2H_4$—, —$(CH_2)_4$—, —CH=CH—, —CF=CF—, —$C_2F_4$—, —$CH_2CF_2$—, —$CF_2CH_2$—, —$CH_2O$—, —$OCH_2$—, —COO— or —$OCF_2$—, in formulae V and VI also a single bond, in formulae V and VIII also —$CF_2O$—, r denotes 0 or 1, and s denotes 0 or 1;

The compounds of the formula IV are preferably selected from the following formulae:

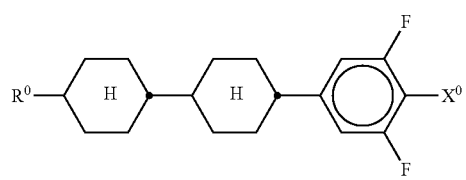

IVa

IVb

IVc

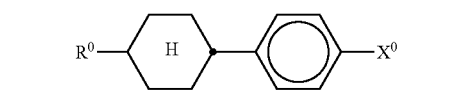

IVd in which R⁰ and X⁰ have the meanings indicated above.

R⁰ preferably denotes alkyl having 1 to 6 C atoms. X⁰ preferably denotes F or $OCF_3$, furthermore $OCF=CF_2$ or Cl;

The compounds of the formula V are preferably selected from the following formulae:

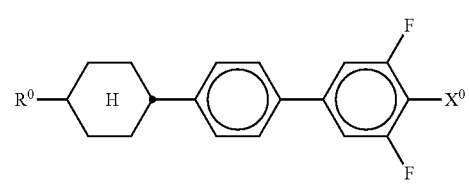

Va

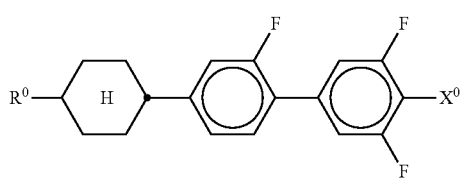

Vb

Vc

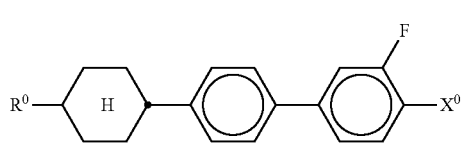

Vd

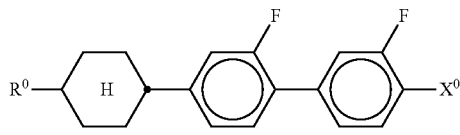

Ve

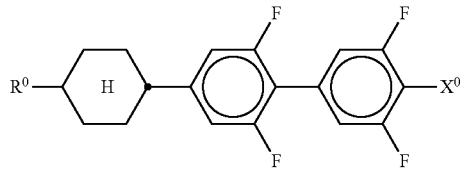

Vf

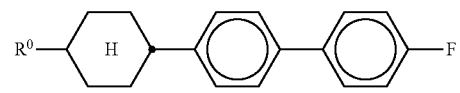

Vg

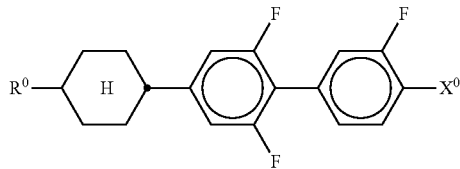

Vh

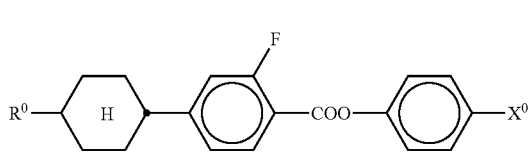

in which R⁰ and X⁰ have the meanings indicated above.

R⁰ preferably denotes alkyl having 1 to 6 C atoms. X⁰ preferably denotes F and $OCF_3$, furthermore $OCHF_2$, $CF_3$, $OCF=CF_2$ and $OCH=CF_2$;

The compounds of the formula VI are preferably selected from the following formulae:

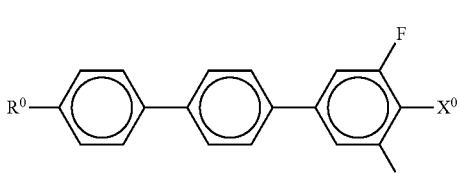

VIa

-continued

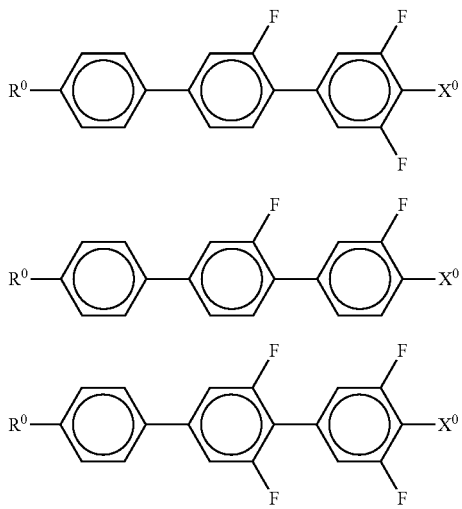

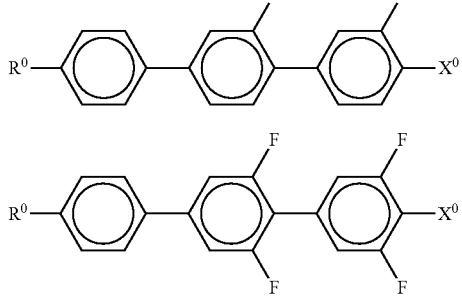

in which R⁰ and X⁰ have the meanings indicated above. R⁰ preferably denotes alkyl having 1 to 6 C atoms. X⁰ preferably denotes F, furthermore OCF$_3$, CF$_3$, CF=CF$_2$, OCHF$_2$ and OCH=CF$_2$;

The compounds of the formula VII are preferably selected from the following formulae:

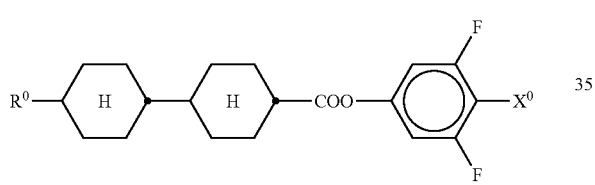

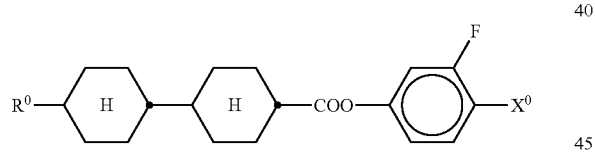

in which R⁰ and X⁰ have the meanings indicated above. R⁰ preferably denotes alkyl having 1 to 6 C atoms. X⁰ preferably denotes F, furthermore OCF$_3$, OCHF$_2$ and OCH=CF$_2$.

The medium additionally comprises one or more compounds selected from the following formulae:

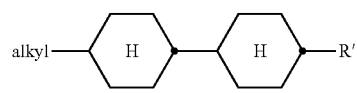

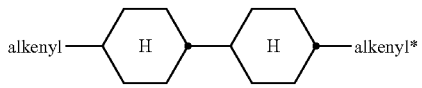

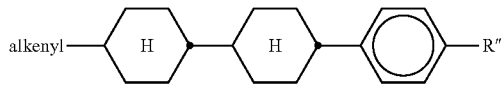

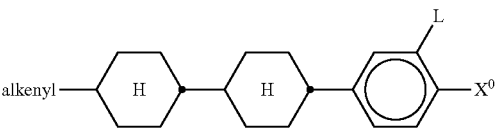

in which X⁰ has the meanings indicated above, and

L denotes H or F,

"alkyl" denotes C$_{1-6}$-alkyl,

R' denotes C$_{1-6}$-alkyl or C$_{1-6}$-alkoxy

R" denotes C$_{1-6}$-alkyl, C$_{1-6}$-alkoxy or C$_{2-6}$-alkenyl, and

"alkenyl" and "alkenyl*" each, independently of one another, denote C$_{2-6}$-alkenyl.

The compounds of the formulae IX-XII are preferably selected from the following formulae:

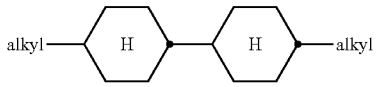

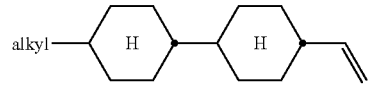

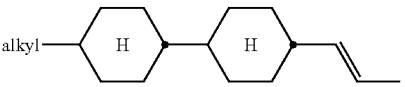

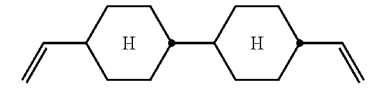

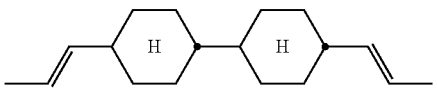

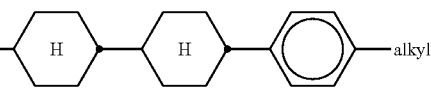

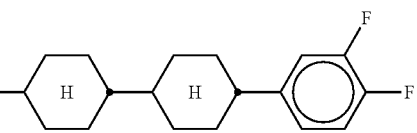

in which "alkyl" has the meaning indicated above.

Particular preference is given to the compounds of the formulae IXa, IXb, IXc, Xa, Xb, XIa and XIIa. In the formulae IXa, IXb, and IXc "alkyl" preferably, independently of one another, denotes n-C$_3$H$_7$, n-C$_4$H$_9$ or n-C$_5$H$_{11}$, in particular n-C$_3$H$_7$.

The medium additionally comprises one or more compounds selected from the following formulae:

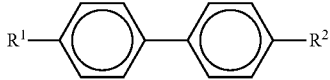

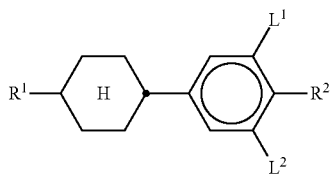

XIV in which L¹ and L² each denote F, Cl, CF₃ or CHF₂, and R¹ and R² each, independently of one another, denote alkyl (e.g., n-alkyl), alkoxy, oxaalkyl, fluoroalkyl or alkenyl, each having up to 6 C atoms, and preferably each, independently of one another, denote alkyl having 1 to 6 C atoms; in the compound of the formula XIII, at least one of the radicals R¹ and R² preferably denotes alkenyl having 2 to 6 C atoms.

The medium comprises one or more compounds of the formula XIII in which at least one of the radicals R¹ and R² denotes alkenyl having 2 to 6 C atoms, preferably those selected from the following formulae:

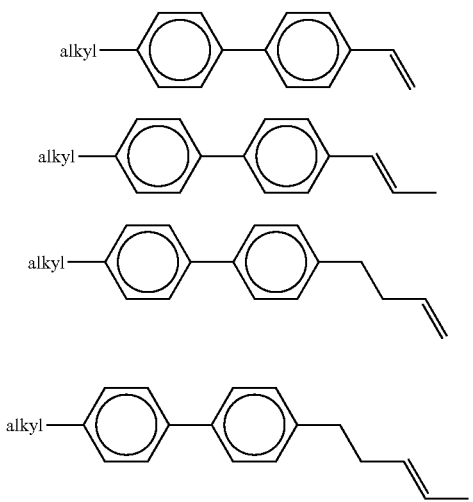

XIIIa

XIIIb

XIIIc

XIIId in which "alkyl" has the meaning indicated above;

The medium comprises one or more compounds of the following formulae:

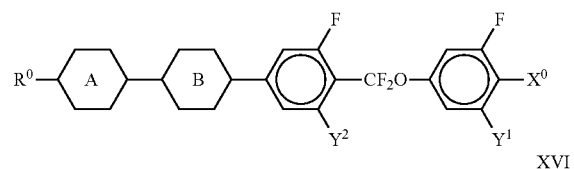

XV

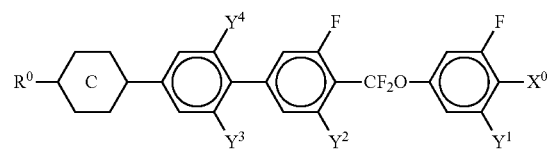

XVI in which R⁰, X⁰ and Y¹⁻⁴ have the meanings indicated in formula III, and

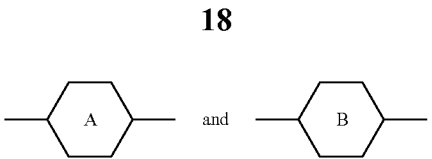

each, independently of one another, denote

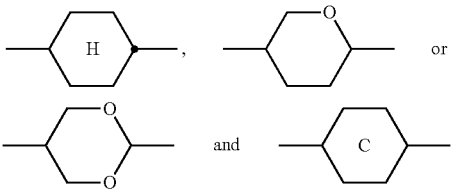

denotes

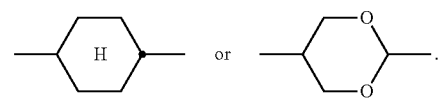

The compounds of the formulae XV and XVI are preferably selected from the following formulae:

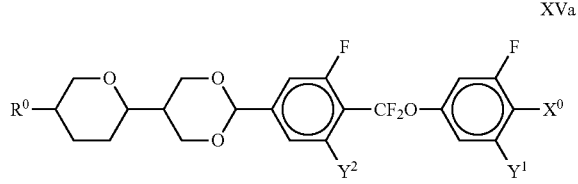

XVa

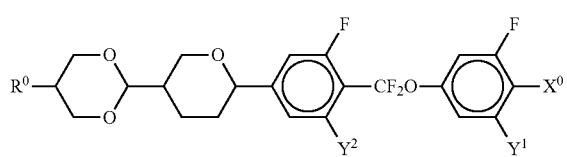

XVb

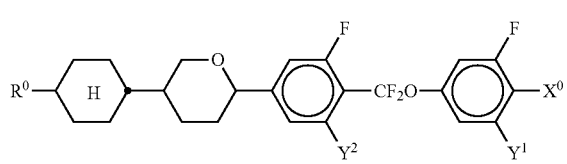

XVc

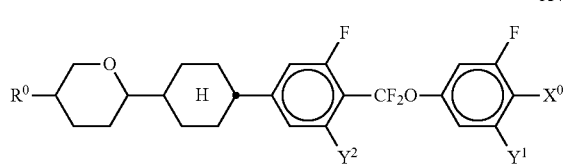

XVd

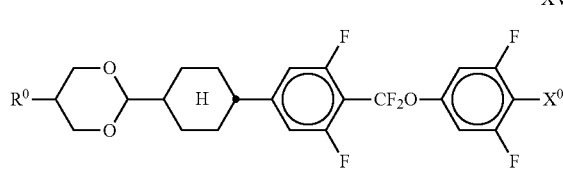

XVe

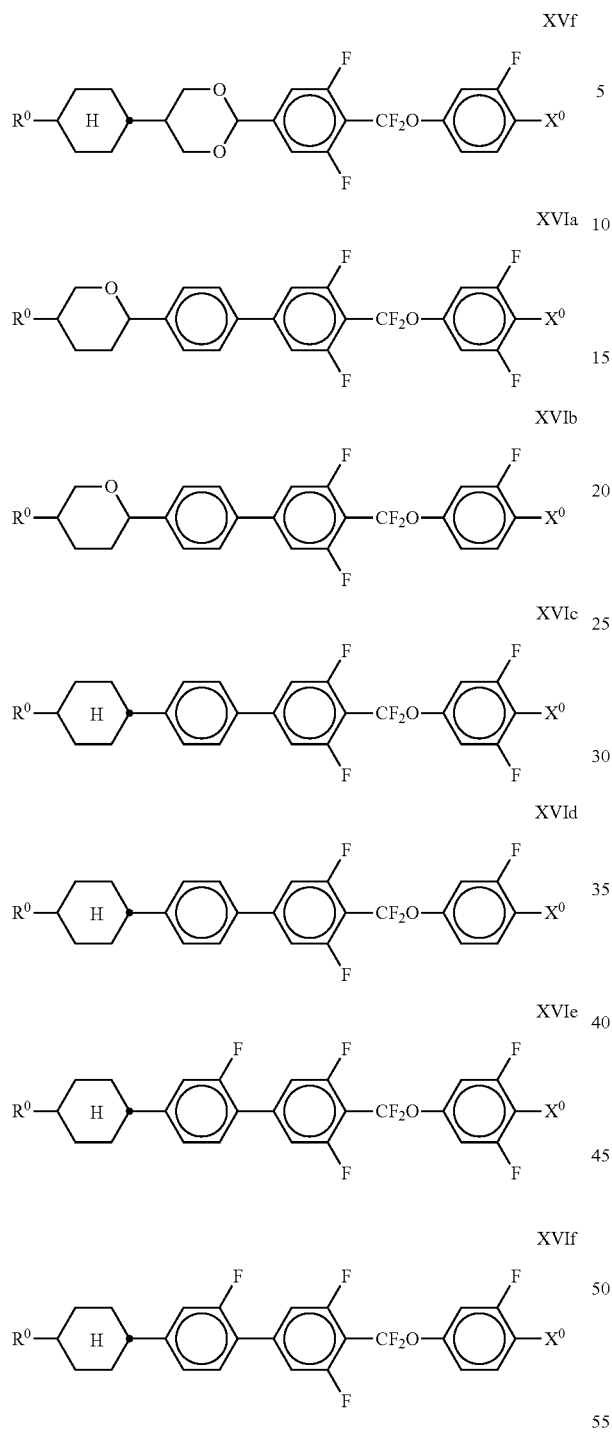

in which $R^0$ and $X^0$ have the meanings indicated above. $R^0$ preferably denotes alkyl having 1 to 6 C atoms. $X^0$ preferably denotes F, furthermore $OCF_3$. Particularly preferred compounds of the formulae XV and XVa-XVf are those in which $Y^1$ denotes F and $Y^2$ denotes H or F, preferably F. The mixture according to the invention particularly preferably comprises at least one compound of the formula XVf.

The medium comprises one or more compounds of the formula XVII,

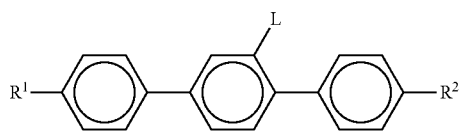

in which $R^1$ and $R^2$ have the meanings indicated above and preferably each, independently of one another, denote alkyl having 1 to 6 C atoms. L denotes H or F.

Particularly preferred compounds of the formula XVII are those of the sub-formulae

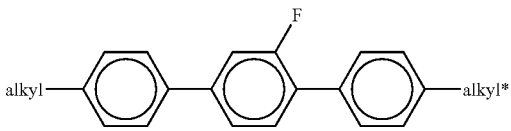

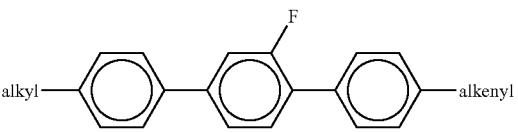

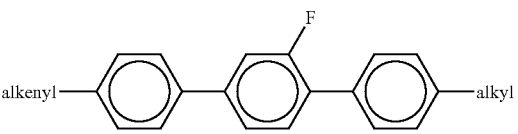

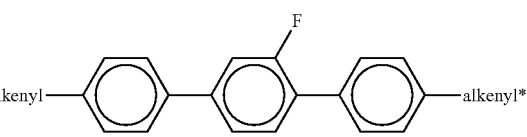

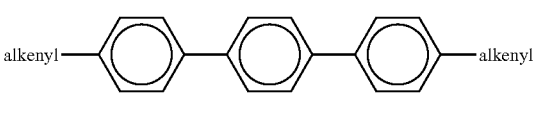

in which alkyl and alkyl* each, independently of one another, denote a straight-chain alkyl radical having 1-6 C atoms, in particular ethyl, propyl and pentyl, alkenyl and alkenyl* each, independently of one another, denote a straight-chain alkenyl radical having 2-6 C atoms, in particular $CH_2$=$CHC_2H_4$, $CH_3CH$=$CHC_2H_4$, $CH_2$=$CH$ and $CH_3CH$=$CH$.

Particular preference is given to the compounds of the formulae XVII-b and XVII-c. Very particular preference is given to the compounds of the formulae

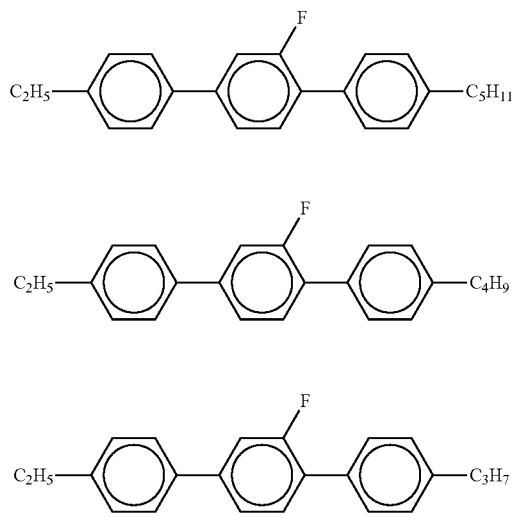

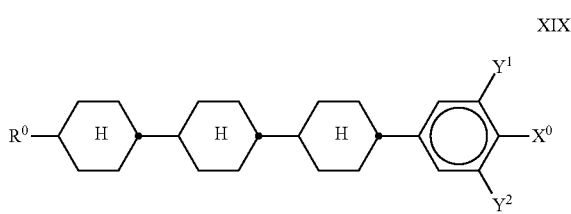

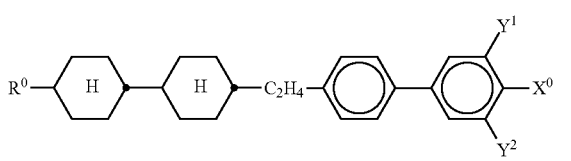

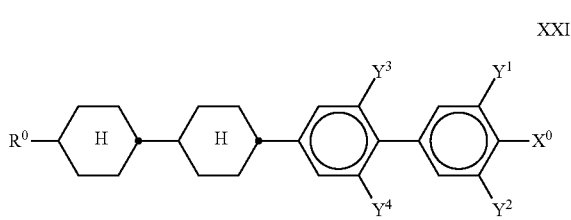

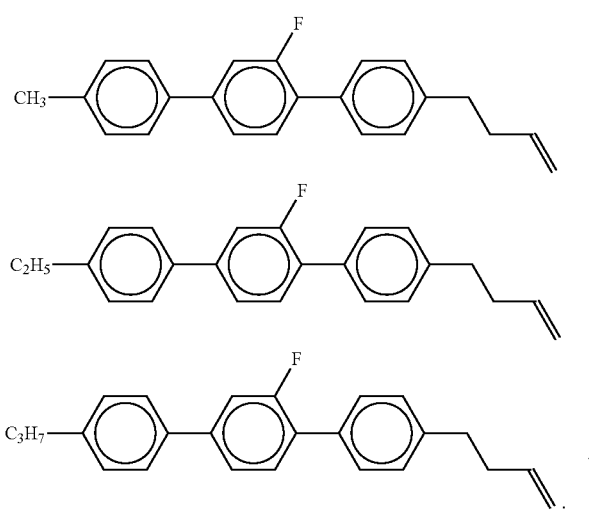

The medium comprises one or more compounds of the following formulae:

XVIIIa

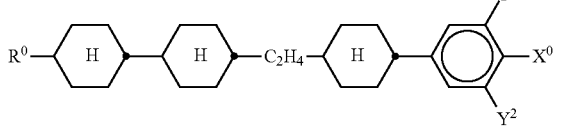

XVIIIb

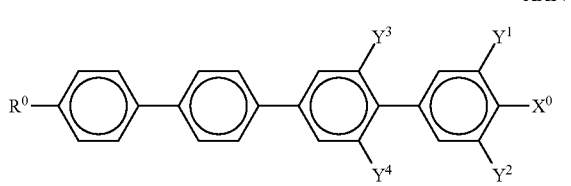

in which $R^1$ and $R^2$ have the meanings indicated above and preferably each, independently of one another, denote alkyl having 1 to 6 C atoms. L denotes H or F;

The medium additionally comprises one or more compounds selected from the following formulae:

in which $R^0$ and $X^0$ each, independently of one another, have one of the meanings indicated above, and $Y^{1-4}$ each, independently of one another, denote H or F. $X^0$ is preferably F, Cl, $CF_3$, $OCF_3$ or $OCHF_2$. $R^0$ preferably denotes alkyl, alkoxy, oxaalkyl, fluoroalkyl or alkenyl, each having up to 6 C atoms.

The mixture according to the invention particularly preferably comprises one or more compounds of the formula XXIV-a, XXIV-a

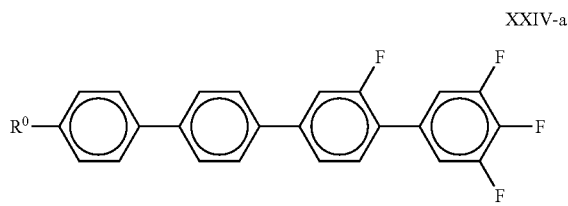

in which R⁰ has the meanings indicated above. R⁰ preferably denotes straight-chain alkyl, in particular ethyl, n-propyl, n-butyl and n-pentyl and very particularly preferably n-propyl. The compound(s) of the formula XXIV, in particular of the formula XXIV-a, is (are) preferably employed in the mixtures according to the invention in amounts of 0.5-20% by weight, particularly preferably 1-15% by weight.

The medium additionally comprises one or more compounds of the formula XXIV,

XXIV

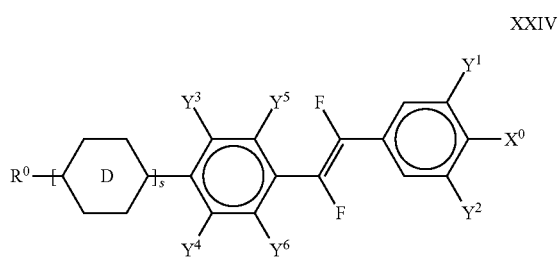

in which $R^0$, $X^0$ and $Y^{1-5}$ have the meanings indicated in formula III, $Y^6$ denotes H or F, s denotes 0 or 1, and

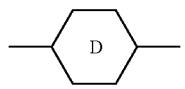

denotes

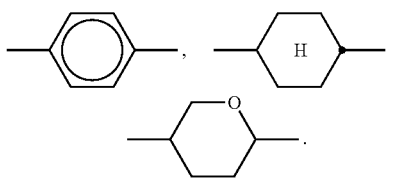

In the formula XXIV, $X^0$ may also denote an alkyl radical having 1-6 C atoms or an alkoxy radical having 1-6 C atoms. The alkyl or alkoxy radical is preferably straight-chain.

$R^0$ preferably denotes alkyl having 1 to 6 C atoms. $X^0$ preferably denotes F;

The compounds of the formula XXIV are preferably selected from the following formulae:

XXIVa

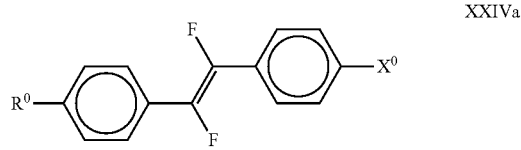

XXIVb

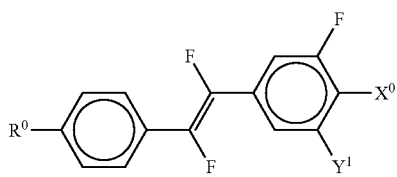

XXIVc

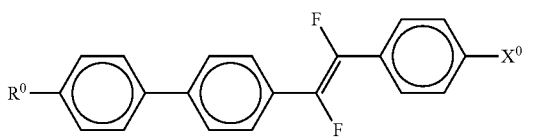

XXIVd

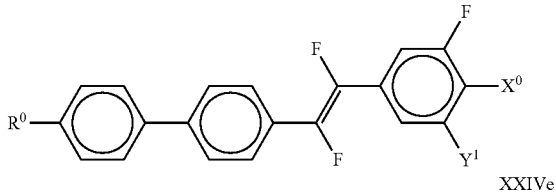

XXIVe

XXIVf

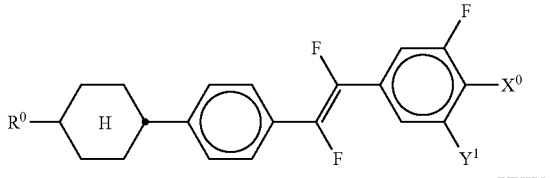

XXIVg

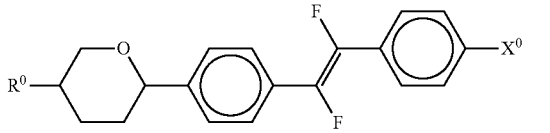

XXIVh

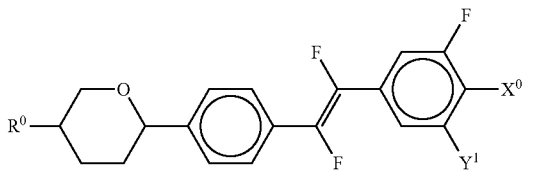

in which $R^0$, $X^0$ and $Y^1$ have the meanings indicated above. $R^0$ preferably denotes alkyl having 1 to 6 C atoms. $X^0$ preferably denotes F, and $Y^1$ is preferably F;

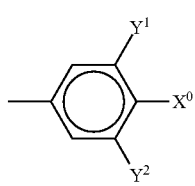

is preferably

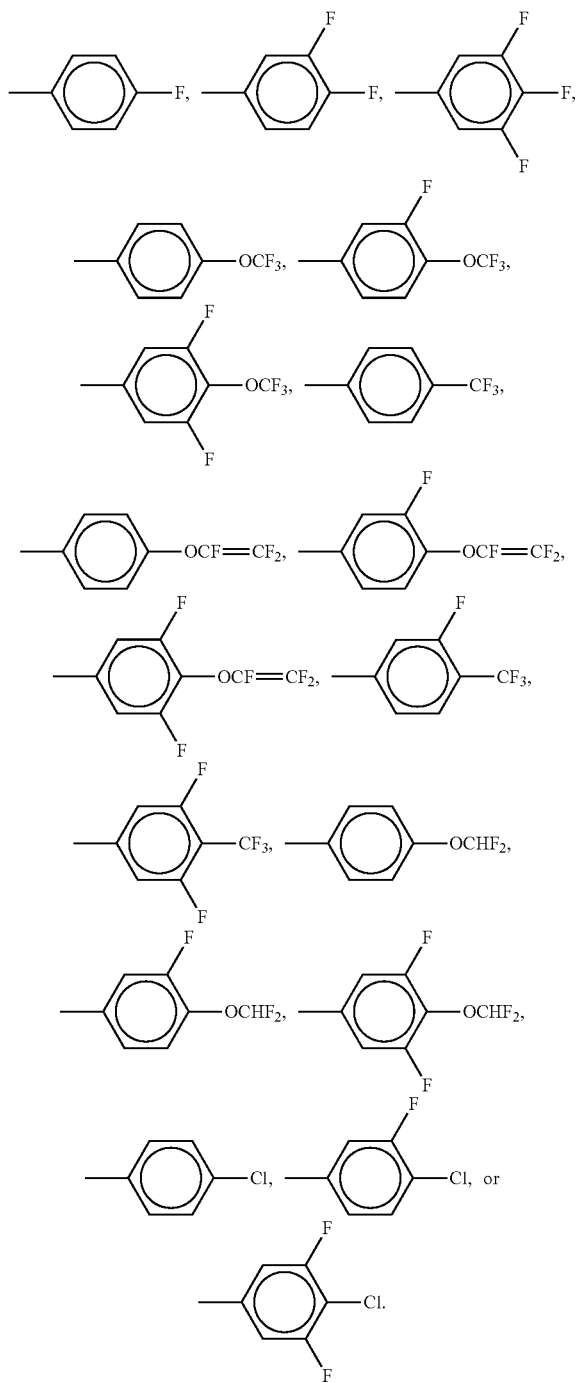

$R^0$ is straight-chain alkyl or alkenyl having 2 to 6 C atoms;

The medium comprises one or more compounds of the following formulae:

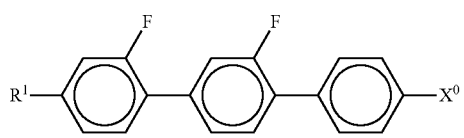
XXV

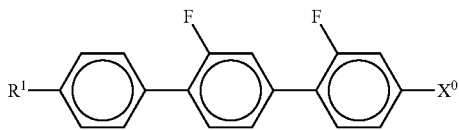
XXVI in which $R^1$ and $X^0$ have the meanings indicated above. $R^1$ preferably denotes alkyl having 1 to 6 C atoms. $X^0$ preferably denotes F or Cl. In the formula XXV, $X^0$ very particularly preferably denotes Cl.

The medium comprises one or more compounds of the following formulae:

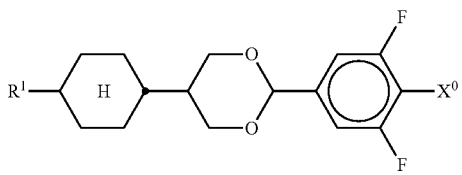
XXVII

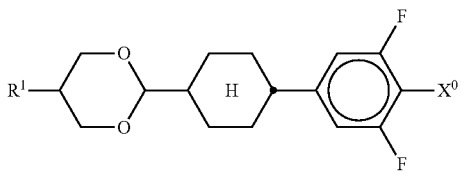
XXVIII

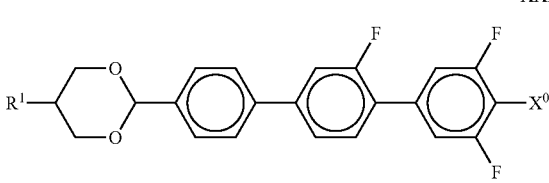
XXIX in which $R^1$ and $X^0$ have the meanings indicated above. $R^1$ preferably denotes alkyl having 1 to 6 C atoms. $X^0$ preferably denotes F. The medium according to the invention particularly preferably comprises one or more compounds of the formula XXIX in which $X^0$ preferably denotes F. The compound(s) of the formulae XXVII-XXIX is (are) preferably employed in the mixtures according to the invention in amounts of 1-20% by weight, particularly preferably 1-15% by weight. Particularly preferred mixtures comprise at least one compound of the formula XXIX.

The medium comprises one or more compounds of the following pyrimidine or pyridine compounds of the formulae

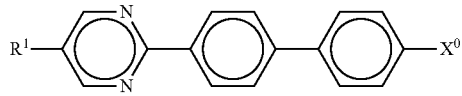
M-1

-continued

M-2

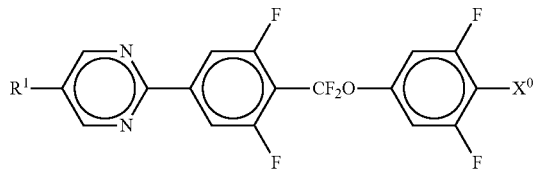

M-3

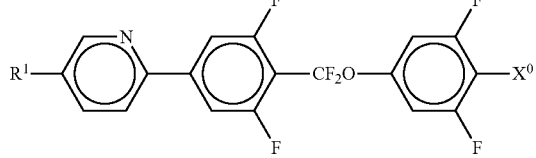

in which R¹ and X⁰ have the meanings indicated above. R¹ preferably denotes alkyl having 1 to 6 C atoms. X⁰ preferably denotes F. The medium according to the invention particularly preferably comprises one or more compounds of the formula M-1, in which X⁰ preferably denotes F. The compound(s) of the formulae M-1-M-3 is (are) preferably employed in the mixtures according to the invention in amounts of 1-20% by weight, particularly preferably 1-15% by weight.

In a preferred embodiment, the liquid-crystalline medium additionally comprises one or more compounds selected from the group of the compounds of the formulae IIA, IIB and IIC,

IIA

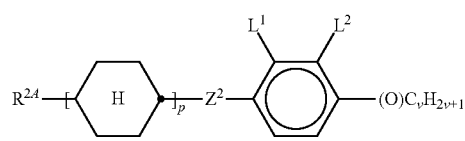

IIB

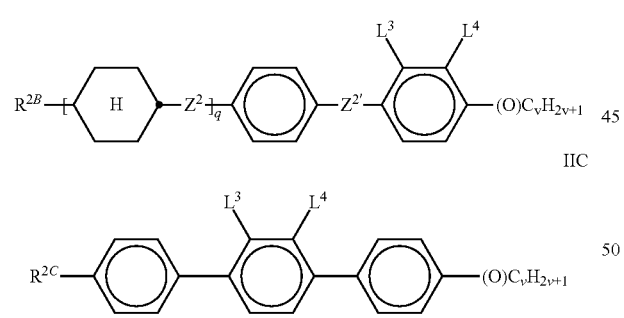

IIC in which $R^{2A}$, $R^{2B}$ and $R^{2C}$ each, independently of one another, denote H, an alkyl or alkenyl radical having up to 15 C atoms which is unsubstituted, monosubstituted by CN or CF₃ or at least monosubstituted by halogen, where, in addition, one or more CH₂ groups in these radicals may each be replaced by —O—, —S—,

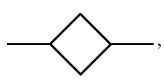

—C≡C—, —CF₂O—, —OCF₂—, —OC—O— or —O—CO— in such a way that O atoms are not linked directly to one another, $L^{1-4}$ each, independently of one another, denote F, Cl, CF₃ or CHF₂, $Z^2$ and $Z^{2'}$ each, independently of one another, denote a single bond, —CH₂CH₂—, —CH=CH—, —CF₂O—, —OCF₂—, —CH₂O—, —OCH₂—, —COO—, —OCO—, —C₂F₄—, —CF=CF—, or —CH=CHCH₂O—, p denotes 0, 1 or 2,
q denotes 0 or 1, and
v denotes 1 to 6.

In the compounds of the formulae IIA and IIB, $Z^2$ may have identical or different meanings. In the compounds of the formula IIB, $Z^2$ and $Z^{2'}$ may have identical or different meanings.

In the compounds of the formulae IIA, IIB and IIC, $R^{2A}$, $R^{2B}$ and $R^{2C}$ each preferably denote alkyl having 1-6 C atoms, in particular CH₃, C₂H₅, n-C₃H₇, n-C₄H₉, or n-C₅H₁₁.

In the compounds of the formulae IIA and IIB, $L^1$, $L^2$, $L^3$ and $L^4$ preferably denote $L^1=L^2=F$ and $L^3=L^4=F$, furthermore $L^1=F$ and $L^2=Cl$, $L^1=Cl$ and $L^2=F$, $L^3=F$ and $L^4=Cl$, $L^3=Cl$ and $L^4=F$. $Z^2$ and $Z^{2'}$ in the formulae IIA and IIB preferably each, independently of one another, denote a single bond, furthermore a —C₂H₄— bridge.

If, in the formula IIB, $Z^{2'}$=—C₂H₄— or —CH₂O—, $Z^2$ is preferably a single bond or, if $Z^{2'}$=—C₂H₄— or —CH₂O—, $Z^2$ is preferably a single bond. In the compounds of the formulae IIA and IIB, (O)C_vH_{2v+1} preferably denotes OC_vH_{2v+1}, furthermore C_vH_{2v+1}. In the compounds of the formula IIC, (O)C_vH_{2v+1} preferably denotes C_vH_{2v+1}. In the compounds of the formula IIC, $L^3$ and $L^4$ preferably each denote F.

Preferred compounds of the formulae IIA, IIB and IIC are indicated below:

IIA-1

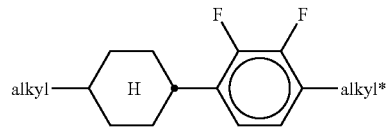

IIA-2

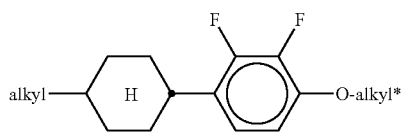

IIA-3

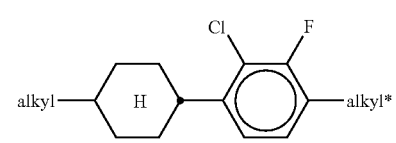

IIA-4

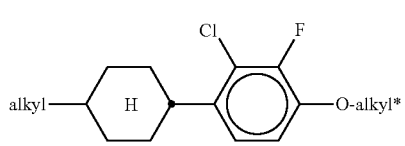

IIA-5

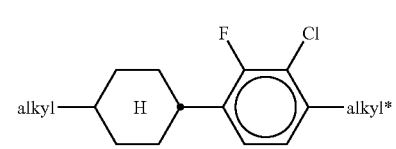

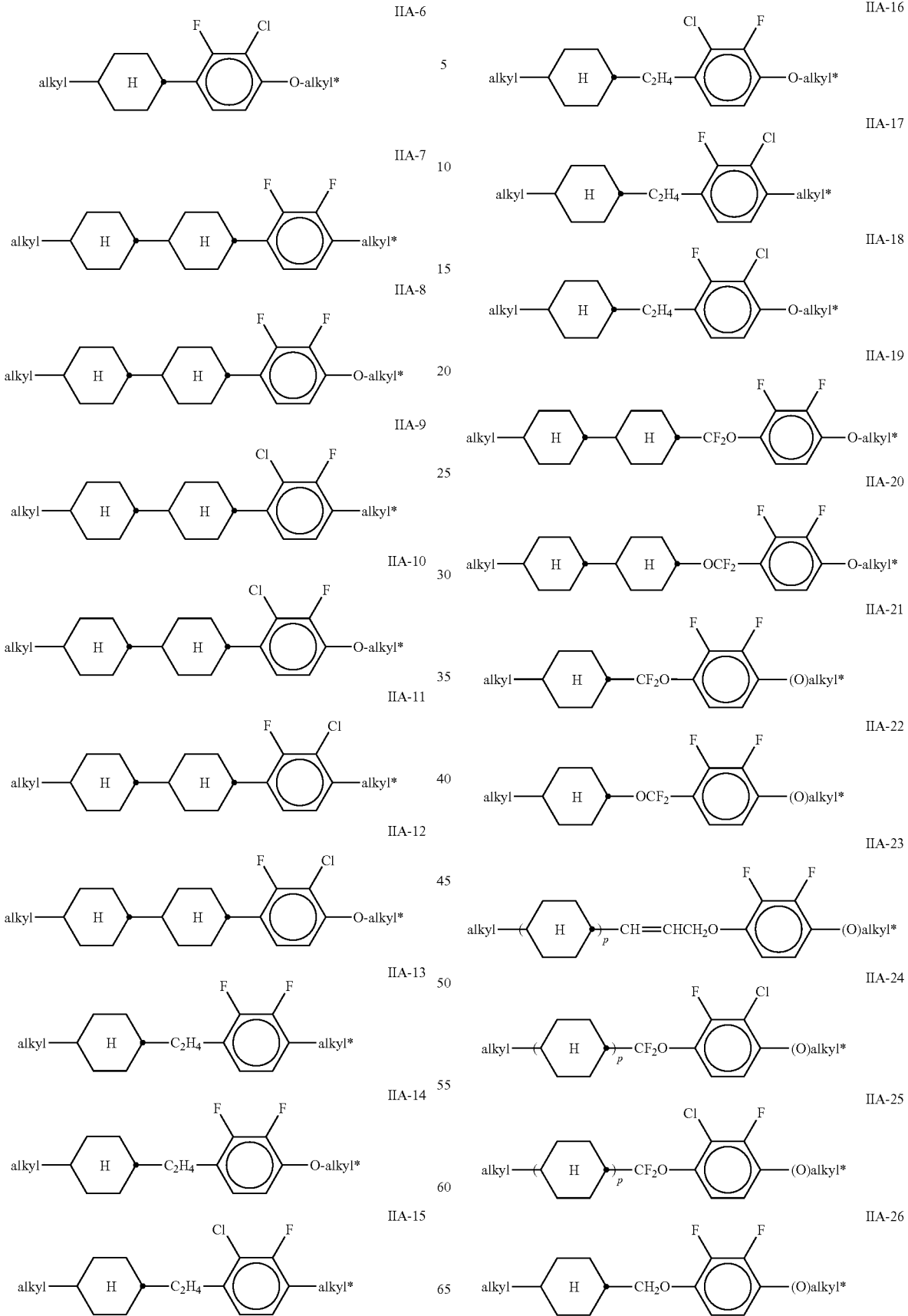

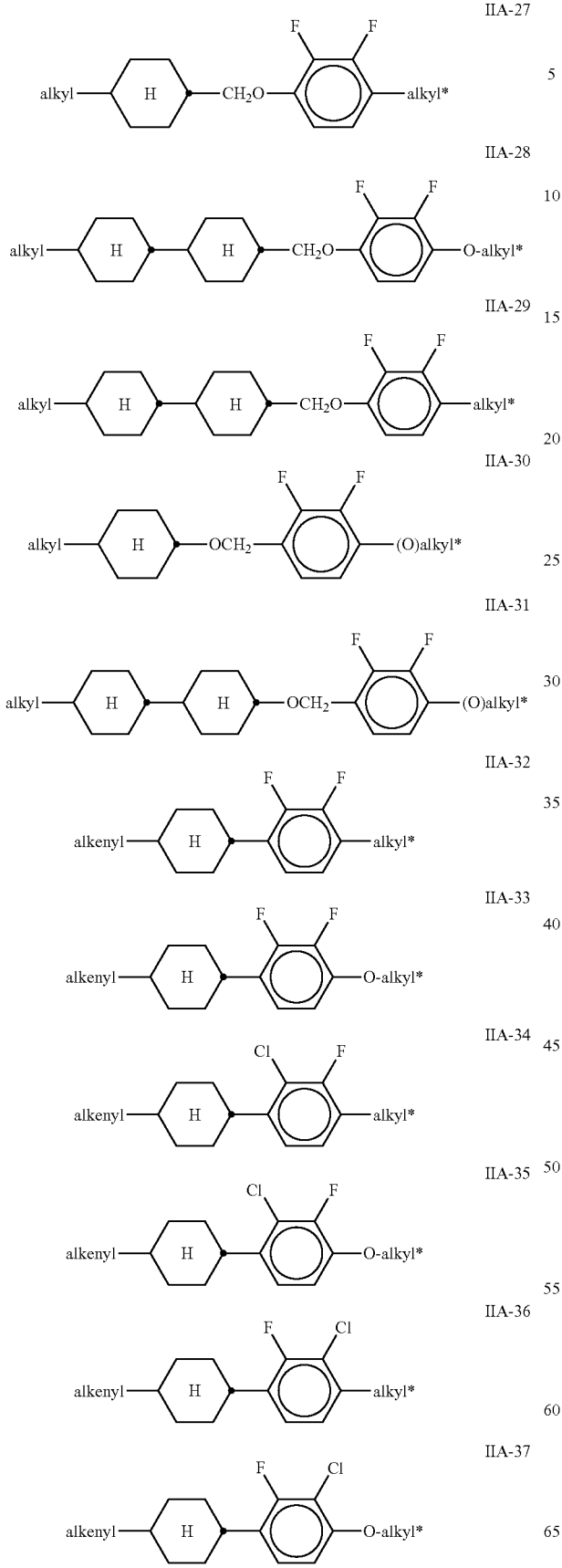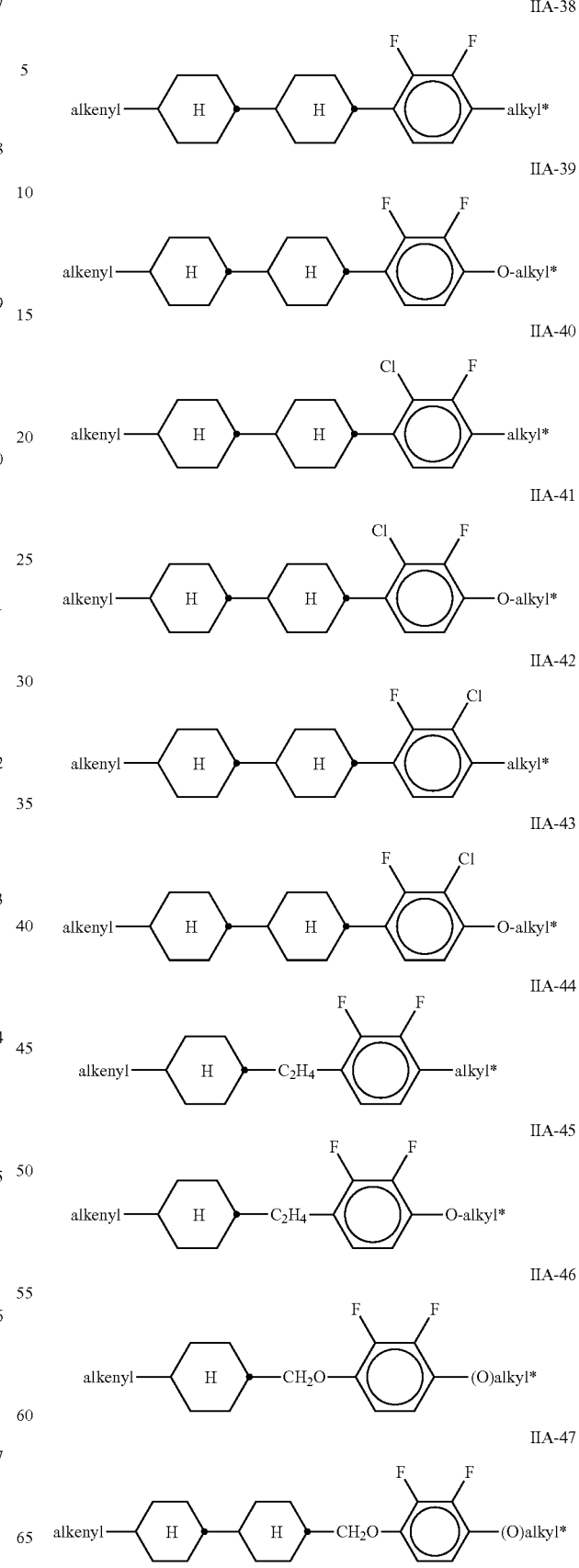

IIA-48
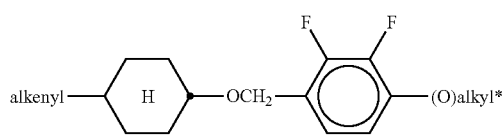
IIA-49
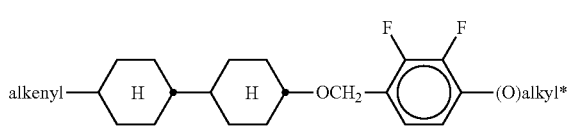
IIA-50
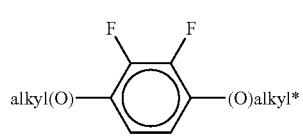
IIA-51
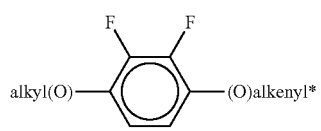
IIA-52
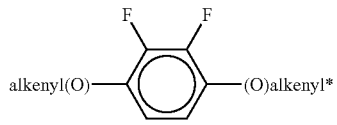
IIB-1
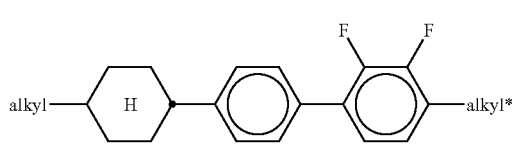
IIB-2
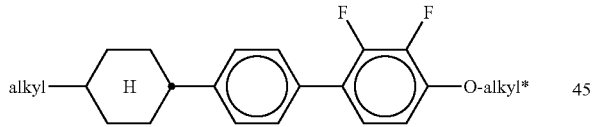
IIB-3
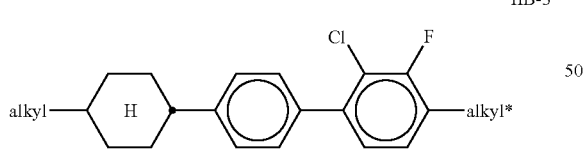
IIB-4
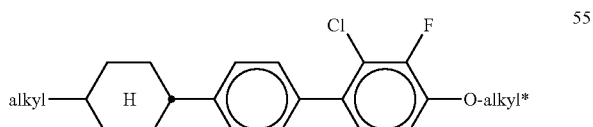
IIB-5
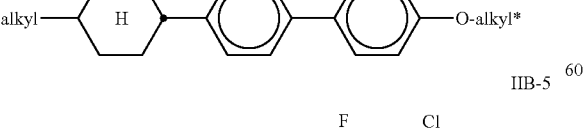
IIB-6
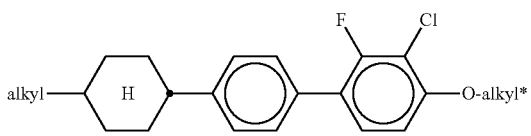
IIB-7
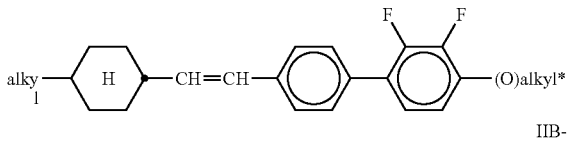
IIB-8
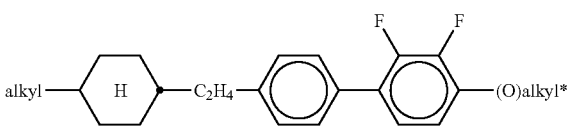
IIB-9
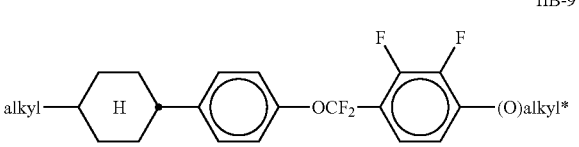
IIB-10
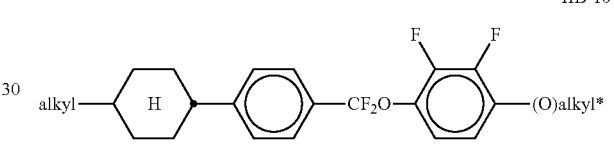
IIB-11
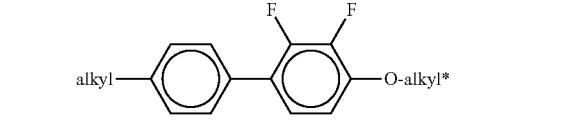
IIB-12
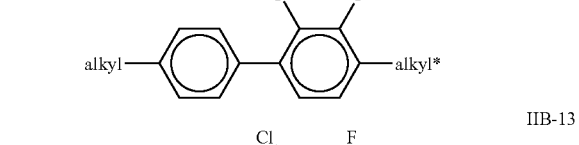
IIB-13
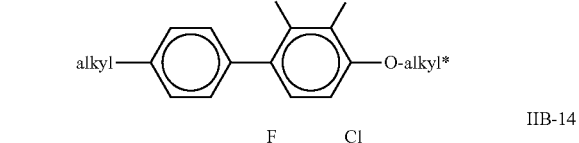
IIB-14
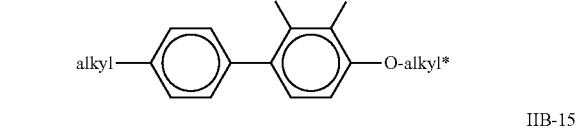
IIB-15
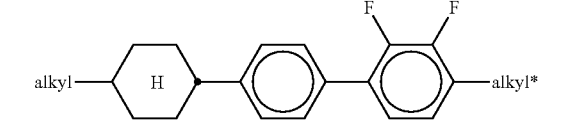
IIB-16

-continued

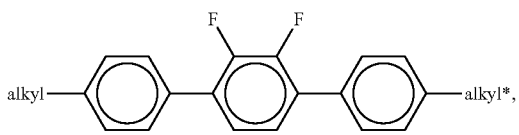
IIC-1 in which
alkyl and alkyl* each, independently of one another, denote a straight-chain alkyl radical having 1-6 C atoms, and
alkenyl and alkenyl* each, independently of one another, denote a straight-chain alkenyl radical having 2-6 C atoms.

Particularly preferred mixtures according to the invention comprise one or more compounds of the formulae IIA-2, IIA-8, IIA-14, IIA-26, II-28, IIA-33, IIA-39, IIA-45, IIA-46, IIA-47, IIA-50, IIB-2, IIB-11, IIB-16 and IIC-1.

The proportion of compounds of the formulae IIA and/or IIB in the mixture as a whole is preferably at least 20% by weight.

Particularly preferred media according to the invention comprise at least one compound of the formula IIC-1,

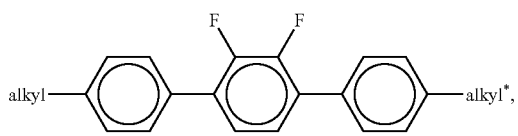

in which alkyl and alkyl* have the meanings indicated above, preferably in amounts of >2% by weight, in particular >4% by weight and particularly preferably 5-25% by weight.

Further preferred embodiments are indicated below:

The medium comprises one or more compounds of formula ST-1 in a total concentration of 1000 ppm or more, preferably 1500 ppm or more and particularly preferably 2000 ppm or more The medium comprises one or more compounds of formula ST-1 in a total concentration in the range of from 100 ppm to 3000 ppm, preferably from 500 to 2000 ppm, and particularly preferably from 1000 to 1500 ppm.

The medium comprises one or more compounds of formula ST-2 in a total concentration of 300 ppm or more, preferably 400 ppm or more and particularly preferably 500 ppm or more.

The medium comprises one or more compounds of formula ST-2 in a total concentration in the range of from 100 ppm to 1000 ppm, preferably from 300 to 800 ppm, and particularly preferably from 400 to 600 ppm.

The medium comprises 20% by weight, preferably 24% by weight, preferably 25-60% by weight, of compounds of the formula RV, in particular the compound of the formula RV-1,

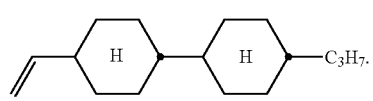
RV-1

The medium comprises 45-50% by weight of the compound of the formula RV-1,

The medium comprises the compound of the formula RV-1 and the compound of the formula RV-5, preferably in a total concentration of 30% to 60%.

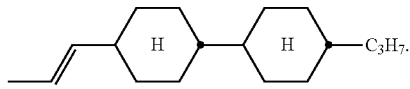
RV-5

The medium comprises the compound of the formula RV-1 and the compound of the formula RV-5 and the compound RV-7, preferably in an total concentration in the range of from 40% to 65%

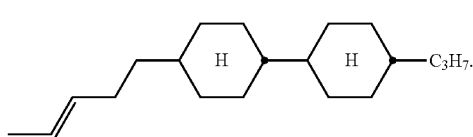
RV-7

The medium comprises two or more compounds of the formula IA, in particular of the formula IA-b;

The medium comprises 2-30% by weight, preferably 3-20% by weight, particularly preferably 3-15% by weight, of compounds of the formula IA;

Besides the compounds of the formulae IA and IB, the medium comprises further compounds selected from the group of the compounds of the formulae II, III, IX-XIII, XVII and XVIII;

The proportion of compounds of the formulae II, III, IX-XIII, XVII and XVIII in the mixture as a whole is 40 to 95% by weight;

The medium comprises 10-50% by weight, particularly preferably 12-40% by weight, of compounds of the formulae II and/or III;

The medium comprises 20-70% by weight, particularly preferably 25-65% by weight, of compounds of the formulae IX-XIII;

The medium comprises 4-30% by weight, particularly preferably 5-20% by weight, of compounds of the formula XVII;

The medium comprises 1-20% by weight, particularly preferably 2-15% by weight, of compounds of the formula XVIII;

The medium comprises at least two compounds of the formulae

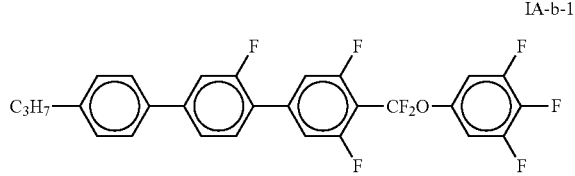
IA-b-1

-continued

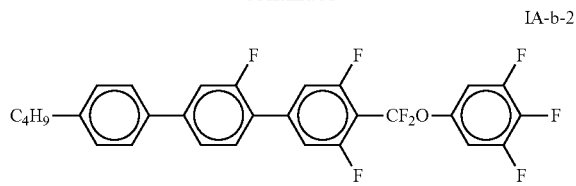
IA-b-2

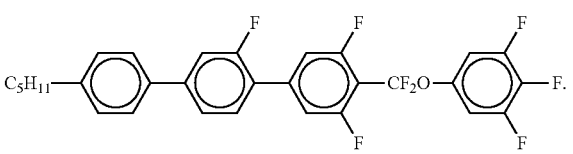
IA-b-3

The medium comprises at least two compounds of the formulae

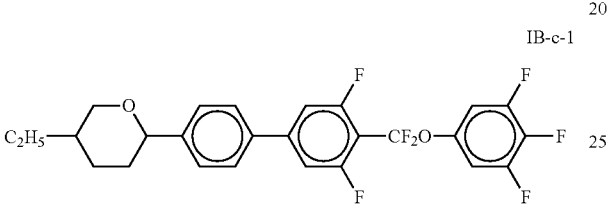
IB-c-1

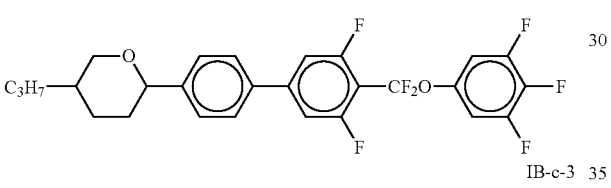
IB-c-2

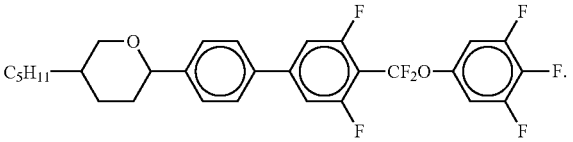
IB-c-3

The medium comprises at least two compounds of the formula IA and at least two compounds of the formula IB.
The medium comprises at least one compound of the formula IA and at least one compound of the formula IB and at least one compound of the formula IIIa.
The medium comprises at least two compounds of the formula IA and at least two compounds of the formula IB and at least one compound of the formula IIIa.
The medium comprises 25% by weight, preferably 30% by weight, of one or more compounds of the formula IA and one or more compounds of the formula IB.
The medium comprises at least one compound of the formula DPGU-n-F.
The medium comprises at least one compound of the formula CDUQU-n-F.
The medium comprises at least one compound of the formula CPU-n-OXF.
The medium comprises at least one compound of the formula PPGU-n-F.
The medium comprises at least one compound of the formula PGP-n-m, preferably two or three compounds.
The medium comprises at least one compound of the formula PGP-2-2V having the structure

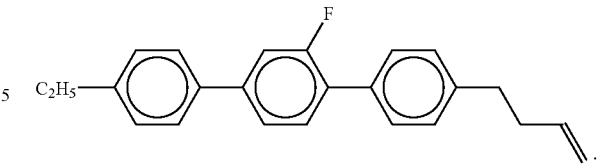

In yet another preferred embodiment the medium comprises
one or more compounds of the formula CPY-n-Om, preferably in a total concentration in the range of from 1% to 10%, more preferably from 2% to 8% and particularly preferably from 3% to 6%,
one or more compounds of the formula CY-n-Om, preferably in a total concentration in the range of from 1% to 20%, more preferably from 4% to 15% and particularly preferably from 6% to 12%,
one or more compounds of the formula CPY-n-Om, preferably in a total concentration in the range of from 1% to 10%, more preferably from 2% to 8% and particularly preferably from 3% to 6%,
one or more compounds of the formula PYP-n-m, preferably in a total concentration in the range of from 1% to 10%, more preferably from 2% to 8% and particularly preferably from 3% to 6%,
one or more compounds of the formula B-nO-Om, preferably of the formula B-2O-O5, in a total concentration in the range of from 1% to 10%, preferably 2% to 8% and particularly preferably from 3% to 6%.
one or more compounds of the formula PGUQU-n-F and one or more compounds of the formula CPY-n-Om and/or one or more compounds of the formula CY-n-Om, preferably in a total concentration in the range of from 5% to 30%, more preferably from 10% to 25% and particularly preferably from 15% to 20%.

The term "alkyl" or "alkyl*" in this application encompasses straight-chain and branched alkyl groups having 1-6 carbon atoms, in particular the straight-chain groups methyl, ethyl, propyl, butyl, pentyl and hexyl. Groups having 2-5 carbon atoms are generally preferred.

The term "alkenyl" or "alkenyl*" encompasses straight-chain and branched alkenyl groups having 2-6 carbon atoms, in particular the straight-chain groups. Preferred alkenyl groups are $C_2$-$C_7$-1E-alkenyl, $C_4$-$C_6$-3E-alkenyl, in particular $C_2$-$C_6$-1E-alkenyl. Examples of particularly preferred alkenyl groups are vinyl, 1E-propenyl, 1E-butenyl, 1E-pentenyl, 1E-hexenyl, 3-butenyl, 3E-pentenyl, 3E-hexenyl, 4-pentenyl, 4Z-hexenyl, 4E-hexenyl and 5-hexenyl. Groups having up to 5 carbon atoms are generally preferred, in particular $CH_2$=CH, $CH_3CH$=CH.

The term "fluoroalkyl" preferably encompasses straight-chain groups having a terminal fluorine, e.g., fluoromethyl, 2-fluoroethyl, 3-fluoropropyl, 4-fluorobutyl, 5-fluoropentyl, 6-fluorohexyl and 7-fluoroheptyl. However, other positions of the fluorine are not excluded.

The term "oxaalkyl" or "alkoxy" preferably encompasses straight-chain radicals of the formula $C_nH_{2n+1}$—O—$(CH_2)_m$, in which n and m each, independently of one another, denote 1 to 6. m may also denote 0. Preferably, n=1 and m=1-6 or m=0 and n=1-3.

Through a suitable choice of the meanings of $R^0$ and $X^0$, the addressing times, the threshold voltage, the steepness of the transmission characteristic lines, etc., can be modified in the desired manner. For example, 1E-alkenyl radicals, 3E-alkenyl radicals, 2E-alkenyloxy radicals and the like generally result in shorter addressing times, improved nematic tendencies and a higher ratio between the elastic constants $k_{33}$ (bend) and $k_{11}$ (splay) compared with alkyl and alkoxy radicals. 4-Alkenyl radicals, 3-alkenyl radicals and the like generally give lower threshold voltages and lower values of $k_{33}/k_{11}$ compared with alkyl and alkoxy radicals. The mixtures according to the invention are distinguished, in particular, by high $\Delta\varepsilon$ values and thus have significantly faster response times than the mixtures from the prior art.

The optimum mixing ratio of the compounds of the above-mentioned formulae depends substantially on the desired properties, on the choice of the components of the above-mentioned formulae and on the choice of any further components that may be present.

Suitable mixing ratios within the range indicated above can easily be determined from case to case.

The total amount of compounds of the above-mentioned formulae in the mixtures according to the invention is not crucial. The mixtures can therefore comprise one or more further components for the purposes of optimization of various properties. However, the observed effect on the desired improvement in the properties of the mixture is generally greater, the higher the total concentration of compounds of the above-mentioned formulae.

In a particularly preferred embodiment, the media according to the invention comprise compounds of the formulae II to VIII (preferably II, III, IV and V, in particular IIa and IIIa) in which $X^0$ denotes F, $OCF_3$, $OCHF_2$, $OCH=CF_2$, $OCF=CF_2$ or $OCF_2-CF_2H$. A favorable synergistic action with the compounds of the formulae IA and IB results in particularly advantageous properties. In particular, mixtures comprising compounds of the formulae IA and IB, IIa and IIIa are distinguished by their low threshold voltage.

The individual compounds of the above-mentioned formulae and the sub-formulae thereof which can be used in the media according to the invention are either known or can be prepared analogously to the known compounds.

The invention also relates to electro-optical displays, such as, for example, STN or MLC (matrix liquid-crystal) displays, having two plane-parallel outer plates, which, together with a frame, form a cell, integrated non-linear elements for switching individual pixels on the outer plates, and a nematic liquid-crystal mixture having positive dielectric anisotropy and high specific resistance located in the cell, which contain media of this type, and to the use of these media for electro-optical purposes.

The liquid-crystal mixtures according to the invention enable a significant broadening of the available parameter latitude. The achievable combinations of clearing point, viscosity at low temperature, thermal and UV stability and high optical anisotropy are far superior to previous materials from the prior art.

The mixtures according to the invention are suitable for mobile applications and TFT applications, such as, for example, mobile telephones and PDAs. Furthermore, the mixtures according to the invention are particularly suitably for use used in FFS, VA-IPS (vertically aligned in-plane switching), OCB and IPS displays.

The liquid-crystal mixtures according to the invention, while retaining the nematic phase down to −20° C. and preferably down to −30° C., particularly preferably down to −40° C., and the clearing point ≥75° C., preferably ≥80° C., at the same time allow rotational viscosities $\gamma_1$ of ≤110 m·Pas, particularly preferably ≤100 mPa·s, to be achieved, enabling excellent MLC displays having fast response times to be achieved. The rotational viscosities are determined at 20° C.

In a preferred embodiment, the dielectric anisotropy $\Delta\varepsilon$ of the liquid-crystal mixtures according to the invention at 20° C. is preferably ≥+2, particularly preferably ≥+3, especially preferably ≥+4. In addition, the mixtures are characterized by low rotational viscosities, preferably ≤80 mPa s, more preferably ≤70 mPa s, particularly preferably ≤60 mPa s.

In another preferred embodiment, the dielectric anisotropy $\Delta\varepsilon$ of the liquid-crystal mixtures according to the invention at 20° C. is preferably ≥+8, particularly preferably ≥+10, especially preferably ≥+15.

The birefringence $\Delta n$ of the liquid-crystal mixtures according to the invention at 20° C. is preferably in the range of from 0.080 to 0.150, more preferably from 0.090 to 0.140, particularly preferably 0.100 to 0.130.

The nematic phase range of the liquid-crystal mixtures according to the invention preferably has a width of at least 90°, more preferably of at least 100° C., in particular at least 110°. This range preferably extends at least from −25° to +80° C.

It goes without saying that, through a suitable choice of the components of the mixtures according to the invention, it is also possible for higher clearing points (for example above 100° C.) to be achieved at higher threshold voltages or lower clearing points to be achieved at lower threshold voltages with retention of the other advantageous properties. At viscosities correspondingly increased only slightly, it is likewise possible to obtain mixtures having a higher $\Delta\varepsilon$ and thus low thresholds. The MLC displays according to the invention preferably operate at the first Gooch and Tarry transmission minimum [C. H. Gooch and H. A. Tarry, Electron. Lett. 10, 2-4, 1974; C. H. Gooch and H. A. Tarry, Appl. Phys., Vol. 8, 1575-1584, 1975], where, besides particularly favorable electro-optical properties, such as, for example, high steepness of the characteristic line and low angle dependence of the contrast (German patent 30 22 818), lower dielectric anisotropy is sufficient at the same threshold voltage as in an analogous display at the second minimum. This enables significantly higher specific resistance values to be achieved using the mixtures according to the invention at the first minimum than in the case of mixtures comprising cyano compounds. Through a suitable choice of the individual components and their proportions by weight, the person skilled in the art is able to set the birefringence necessary for a pre-specified layer thickness of the MLC display using simple routine methods.

Measurements of the voltage holding ratio (HR) [S. Matsumoto et al., Liquid Crystals 5, 1320 (1989); K. Niwa et al., Proc. SID Conference, San Francisco, June 1984, p. 304 (1984); G. Weber et al., Liquid Crystals 5, 1381 (1989)] have shown that mixtures according to the invention comprising compounds of the formulae ST-1, ST-2, RV, IA and IB exhibit a significantly smaller decrease in the HR on UV exposure than analogous mixtures comprising cyanophenylcyclohexanes of the formula

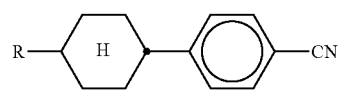

or esters of the formula

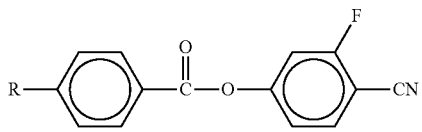

instead of the compounds of the formulae I ST-1, ST-2, RV, IA and IB.

The light stability and UV stability of the mixtures according to the invention are considerably better, i.e. they exhibit a significantly smaller decrease in the HR on exposure to light, heat or UV.

The construction of the MLC display according to the invention from polarizers, electrode base plates and surface-treated electrodes corresponds to the usual design for displays of this type. The term usual design is broadly drawn here and also encompasses all derivatives and modifications of the MLC display, in particular including matrix display elements based on poly-Si TFTs or MIM (metal-insulator-metal).

A significant difference between the displays according to the invention and the hitherto conventional displays based on the twisted nematic cell consists, however, in the choice of the liquid-crystal parameters of the liquid-crystal layer.

The liquid-crystal mixtures which can be used in accordance with the invention are prepared in a manner conventional per se, for example by mixing one or more compounds of formulae ST-1, ST-2, RV, IA, and/or IB with one or more compounds of the formulae II-XXVIII or with further liquid-crystalline compounds and/or additives. In general, the desired amount of the components used in lesser amount is dissolved in the components making up the principal constituent, advantageously at elevated temperature. It is also possible to mix solutions of the components in an organic solvent, for example in acetone, chloroform or methanol, and to remove the solvent again, for example by distillation, after thorough mixing.

The dielectrics may also comprise further additives known to the person skilled in the art and described in the literature, such as, for example, light stabilizers, antioxidants, e.g. BHT, TEMPOL, microparticles, free-radical scavengers, nanoparticles, etc. For example, 0-15% of pleochroic dyes or chiral dopants can be added. Suitable stabilizers and dopants are mentioned below in Tables C and D.

The present invention thus also relates to the use of the mixtures according to the invention in electro-optical displays and to the use of the mixtures according to the invention in shutter glasses, in particular for 3D applications, and in TN, PS-TN (polymer stabilized—twisted nematic), STN, TN-TFT, OCB, IPS, PS-IPS, FFS, PS-FFS and PS-VA-IPS displays.

In the present application and in the examples below, the structures of the liquid-crystal compounds are indicated by means of acronyms, the transformation into chemical formulae taking place in accordance with Table A. All radicals $C_nH_{2n+1}$ and $C_mH_{2m+1}$ are straight-chain alkyl radicals having n and m C atoms respectively; n, m and k are integers and preferably denote 0, 1, 2, 3, 4, 5, 6, 7, 8, 9, 10, 11 or 12. The coding in Table B is self-evident. In Table A, only the acronym for the parent structure is indicated. In individual cases, the acronym for the parent structure is followed, separated by a dash, by a code for the substituents $R^{1*}$, $R^{2*}$, $L^{1*}$ and $L^{2*}$:

| Code for $R^{1*}$, $R^{2*}$, $L^{1*}$, $L^{2*}$, $L^{3*}$ | $R^{1*}$ | $R^{2*}$ | $L^{1*}$ | $L^{2*}$ |
|---|---|---|---|---|
| nm | $C_nH_{2n+1}$ | $C_mH_{2m+1}$ | H | H |
| nOm | $C_nH_{2n+1}$ | $OC_mH_{2m+1}$ | H | H |
| nO.m | $OC_nH_{2n+1}$ | $C_mH_{2m+1}$ | H | H |
| n | $C_nH_{2n+1}$ | CN | H | H |
| nN.F | $C_nH_{2n+1}$ | CN | F | H |
| nN.F.F | $C_nH_{2n+1}$ | CN | F | F |
| nF | $C_nH_{2n+1}$ | F | H | H |
| nCl | $C_nH_{2n+1}$ | Cl | H | H |
| nOF | $OC_nH_{2n+1}$ | F | H | H |
| nF.F | $C_nH_{2n+1}$ | F | F | H |
| nF.F.F | $C_nH_{2n+1}$ | F | F | F |
| nOCF3 | $C_nH_{2n+1}$ | $OCF_3$ | H | H |
| nOCF3.F | $C_nH_{2n+1}$ | $OCF_3$ | F | H |
| n-Vm | $C_nH_{2n+1}$ | —CH=CH—$C_mH_{2m+1}$ | H | H |
| nV-Vm | $C_nH_{2n+1}$—CH=CH— | —CH=CH—$C_mH_{2m+1}$ | H | H |

Preferred mixture components are shown in Tables A and B.

TABLE A

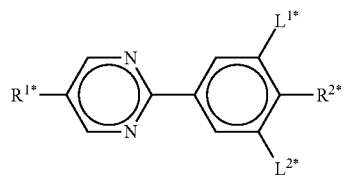

PYP

TABLE A-continued
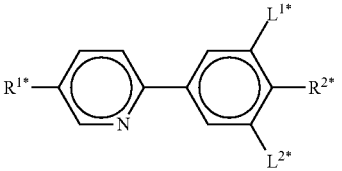 PYRP
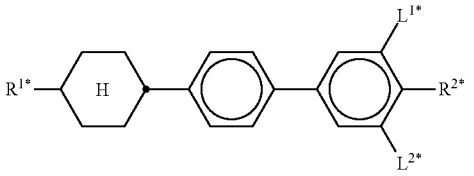 BCH
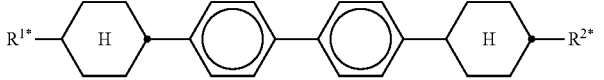 CBC
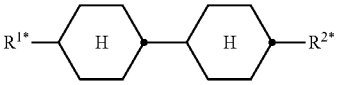 CCH
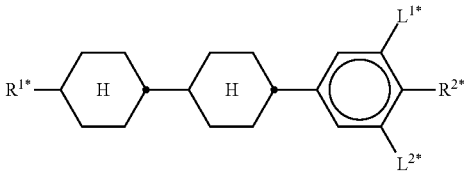 CCP
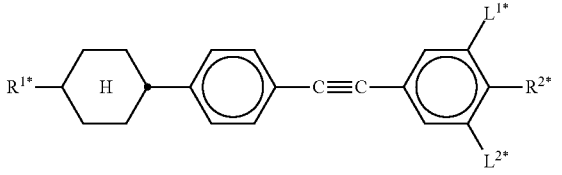 CPTP
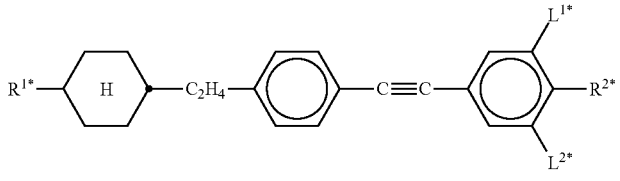 CEPTP
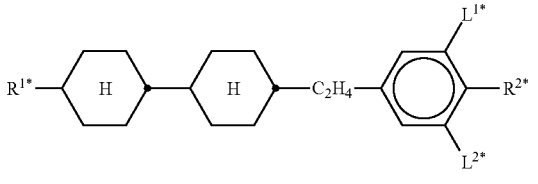 ECCP
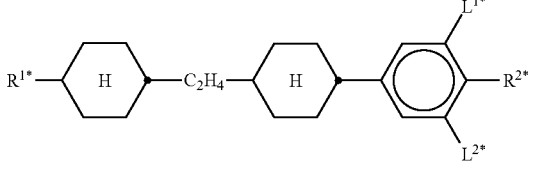 CECP TABLE A-continued
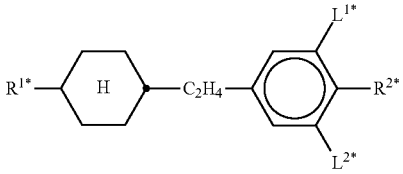 EPCH
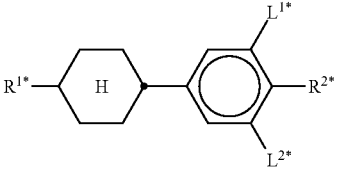 PCH
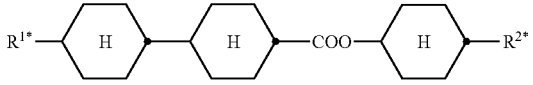 CH
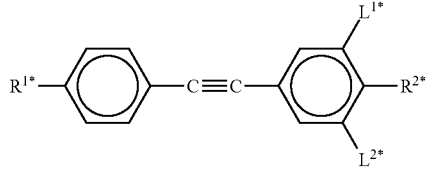 PTP
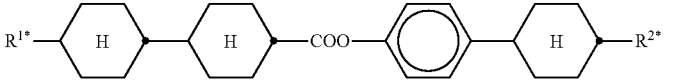 CCPC
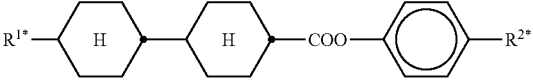 CP
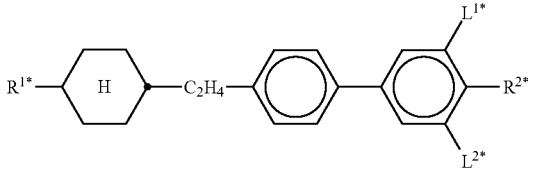 BECH
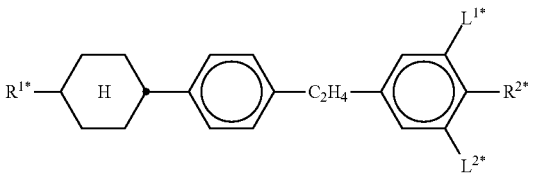 EBCH
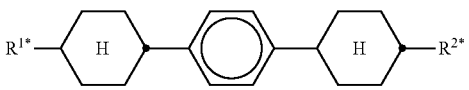 CPC
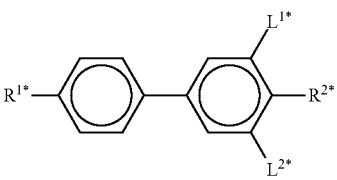 B
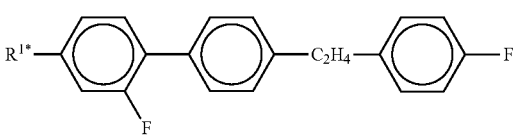 FET-nF TABLE A-continued
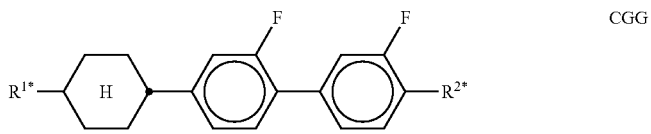
CGG
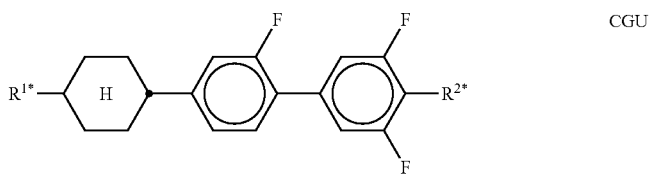
CGU
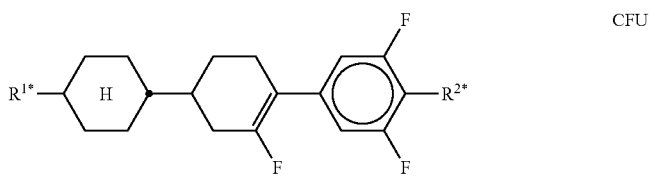
CFU
TABLE B
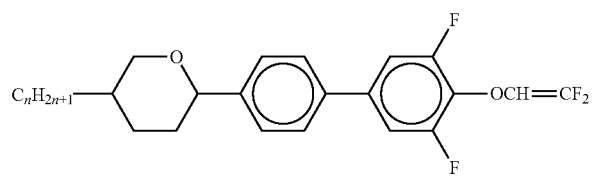
APU-n-OXF
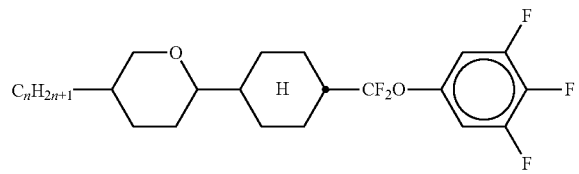
ACQU-n-F
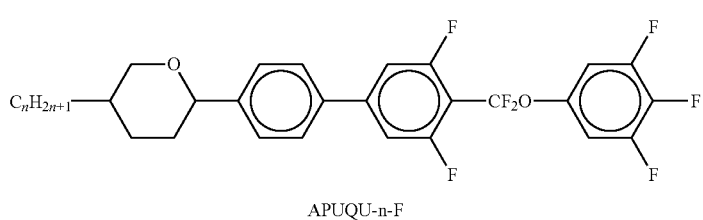
APUQU-n-F
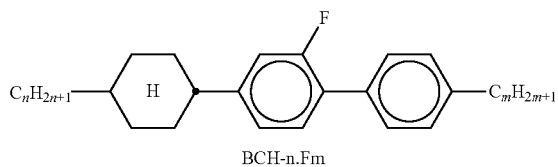
BCH-n.Fm TABLE B-continued
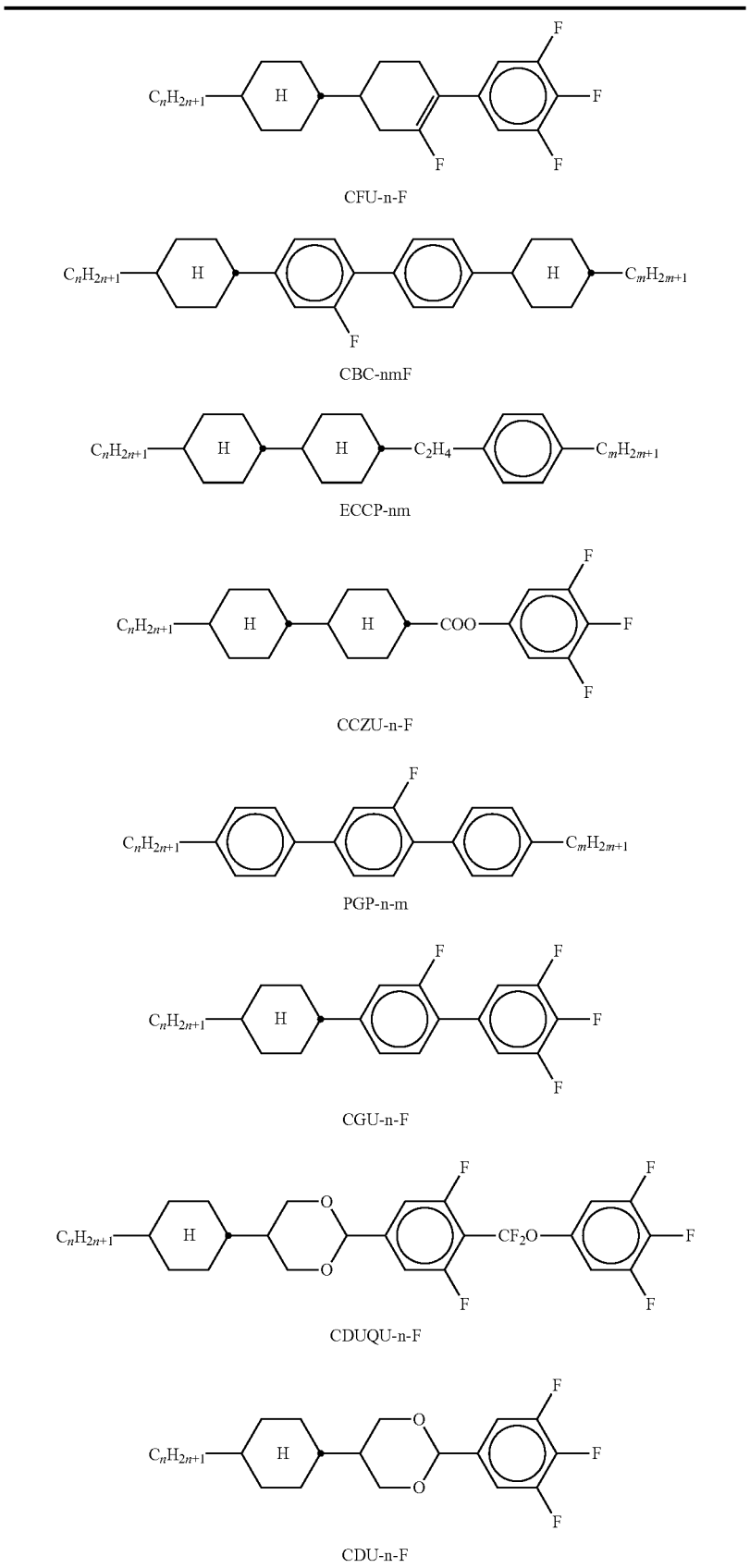

TABLE B-continued
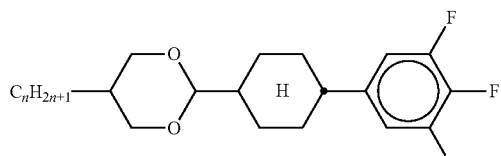
DCU-n-F
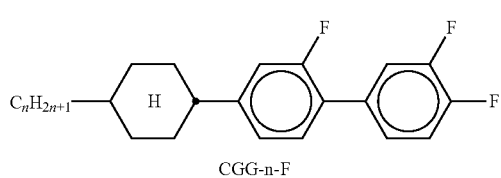
CGG-n-F
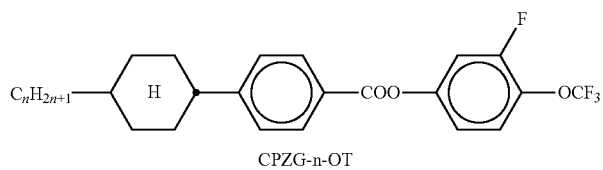
CPZG-n-OT
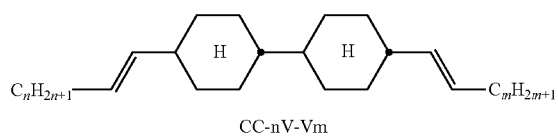
CC-nV-Vm
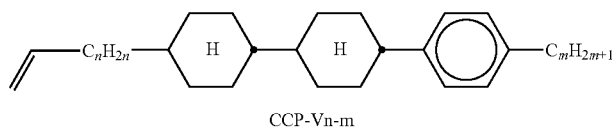
CCP-Vn-m
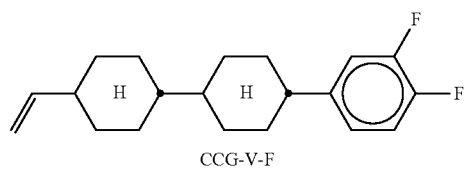
CCG-V-F
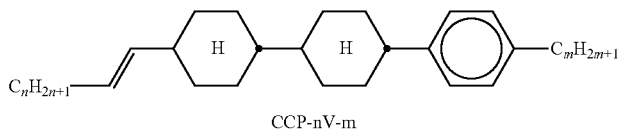
CCP-nV-m
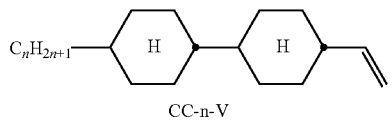
CC-n-V
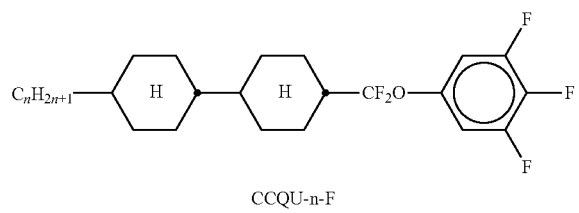
CCQU-n-F TABLE B-continued
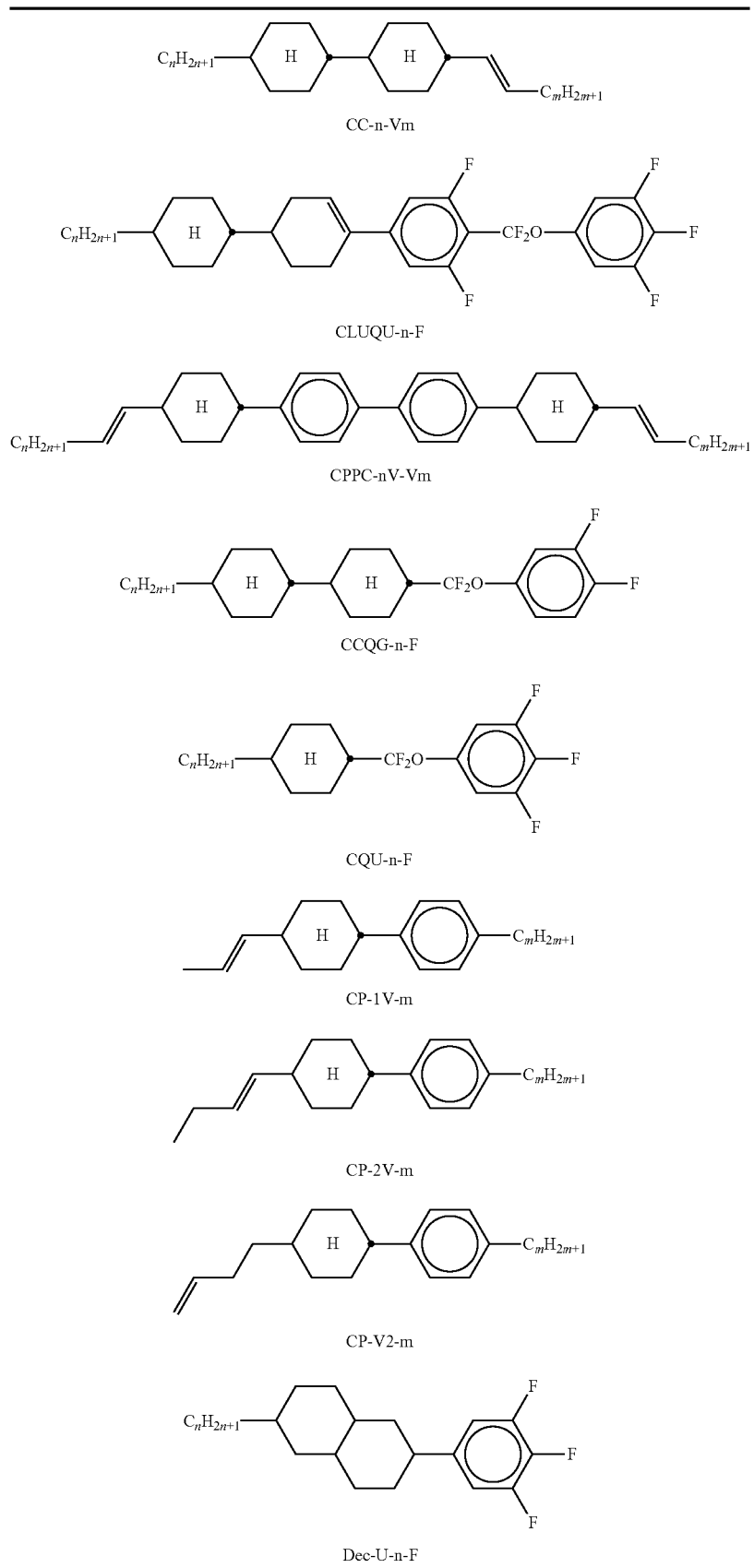

TABLE B-continued
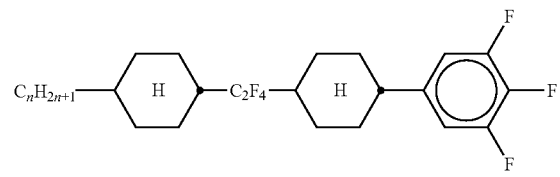
CWCU-n-F
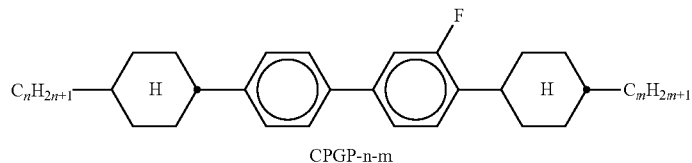
CPGP-n-m
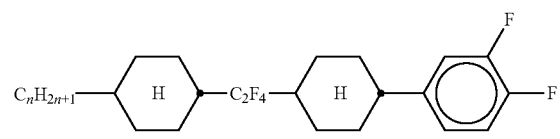
CWCG-n-F
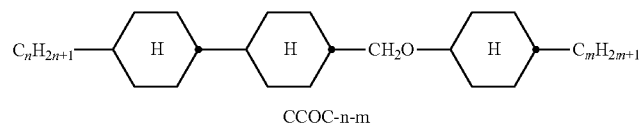
CCOC-n-m
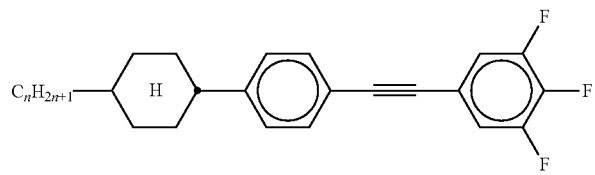
CPTU-n-F
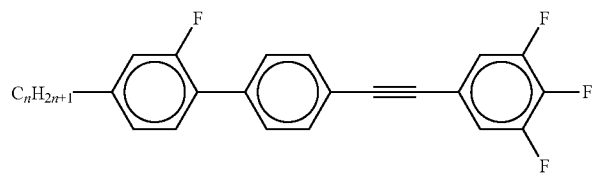
GPTU-n-F
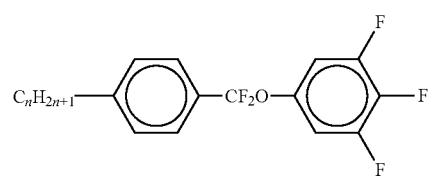
PQU-n-F
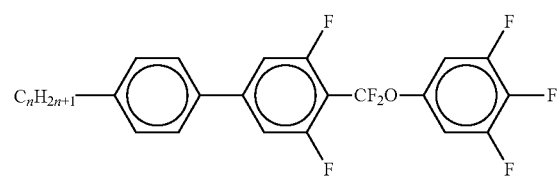
PUQU-n-F TABLE B-continued
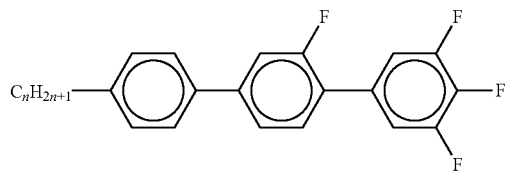
PGU-n-F
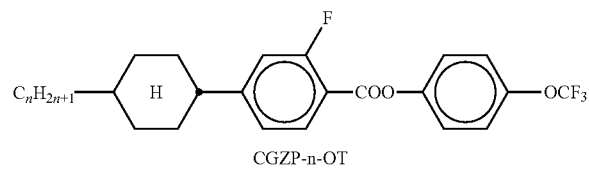
CGZP-n-OT
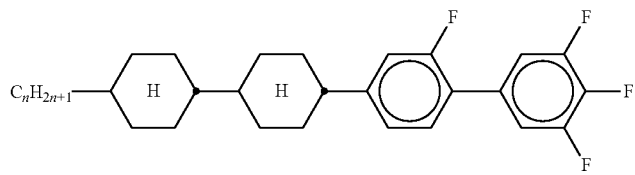
CCGU-n-F
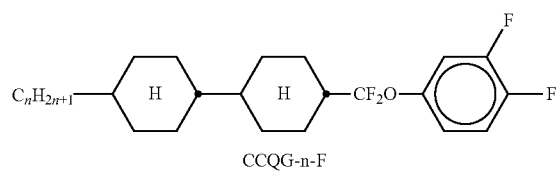
CCQG-n-F
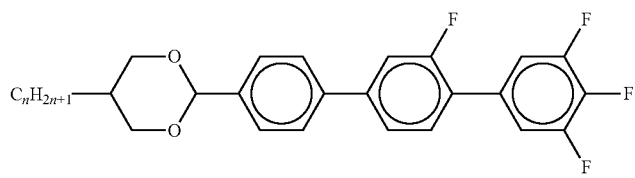
DPGU-n-F
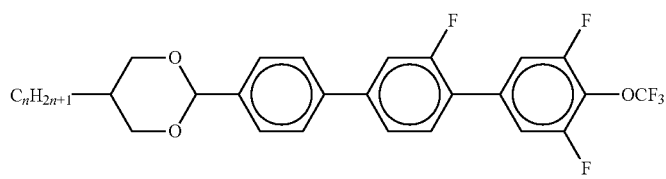
DPGU-n-OT
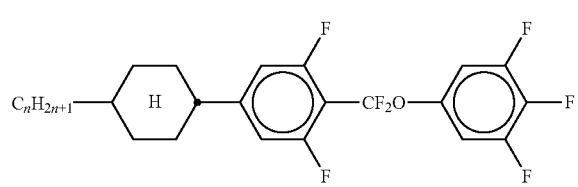
CUQU-n-F TABLE B-continued
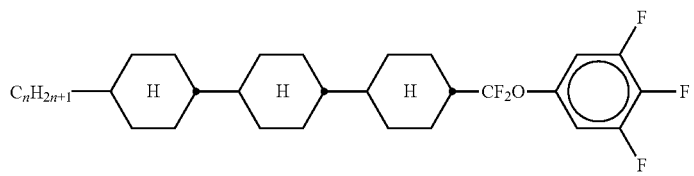
CCCQU-n-F
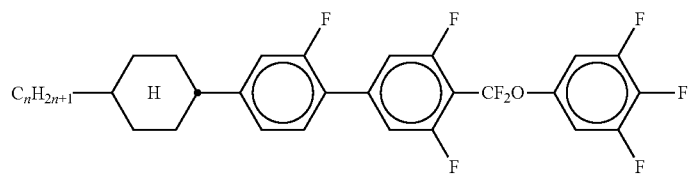
CGUQU-n-F
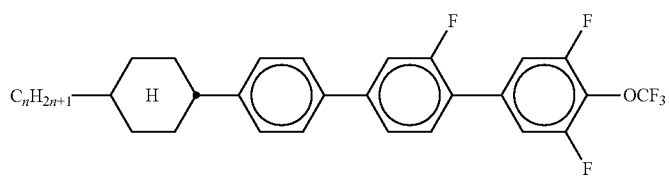
CPGU-n-OT
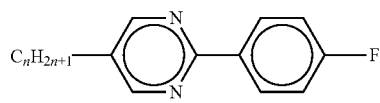
PYP-nF
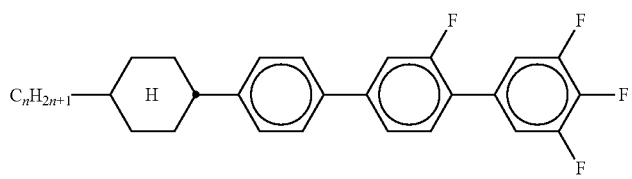
CPGU-n-F
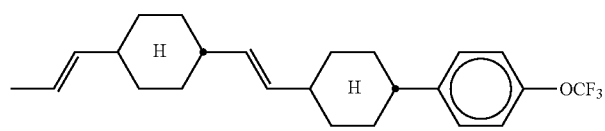
CVCP-1V-OT
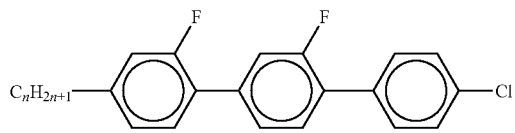
GGP-n-Cl
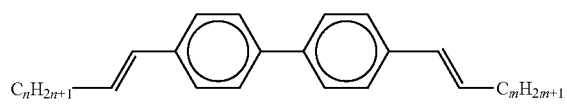
PP-nV-Vm TABLE B-continued
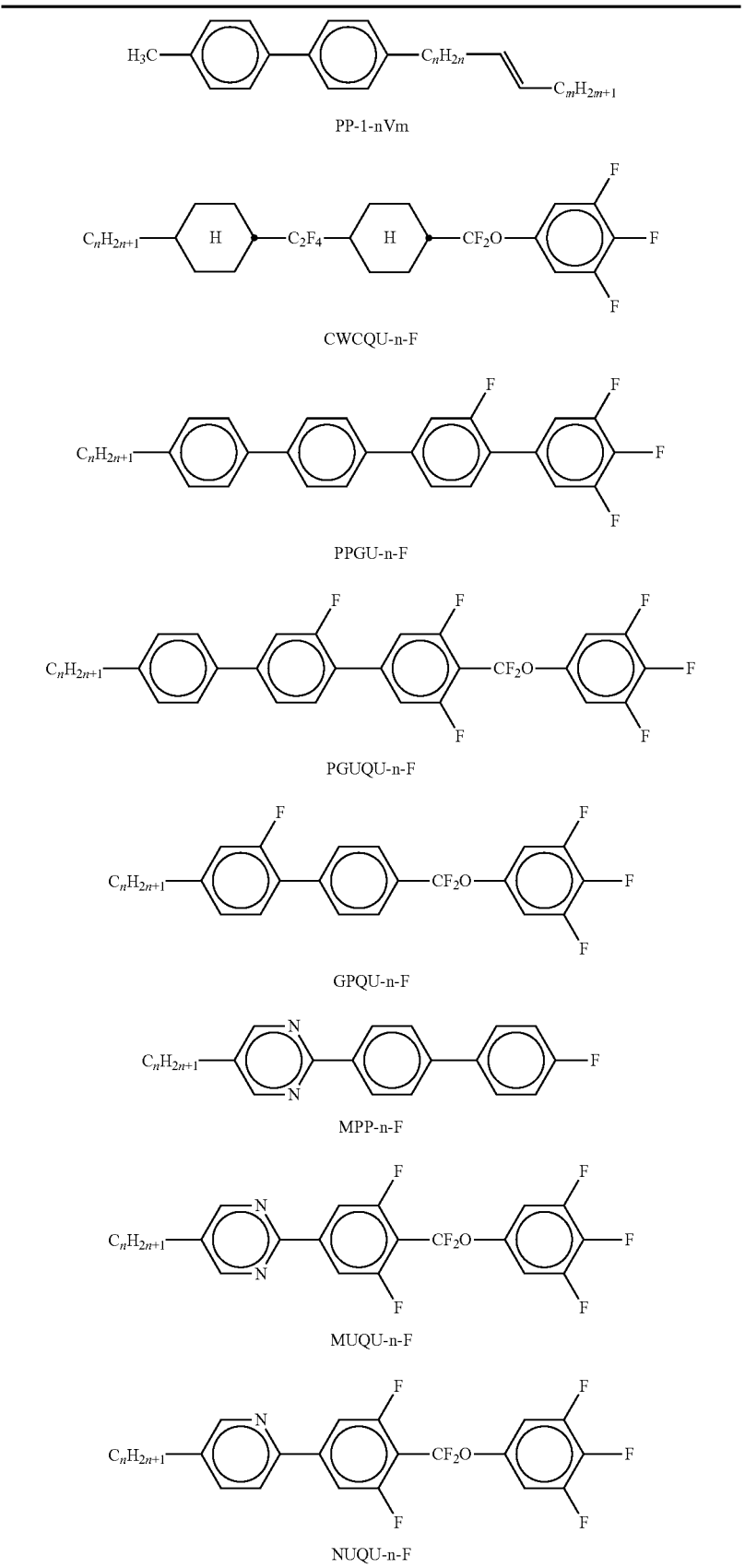

TABLE B-continued
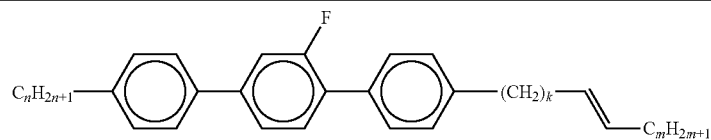
PGP-n-kVm
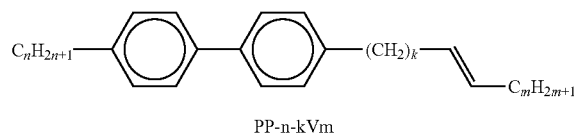
PP-n-kVm
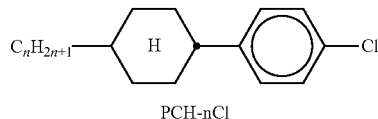
PCH-nCl
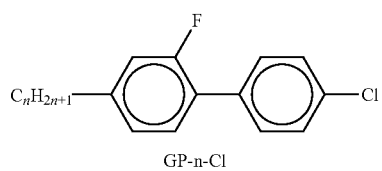
GP-n-Cl
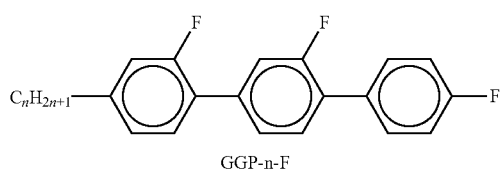
GGP-n-F
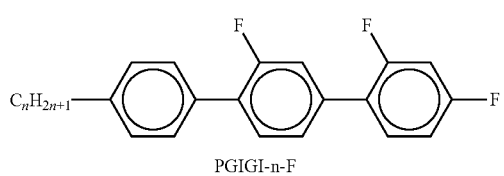
PGIGI-n-F
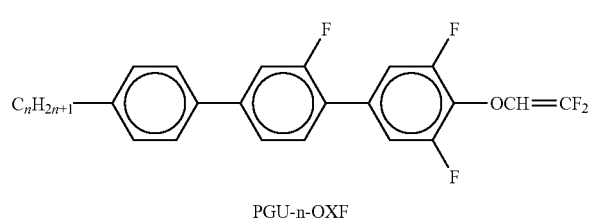
PGU-n-OXF
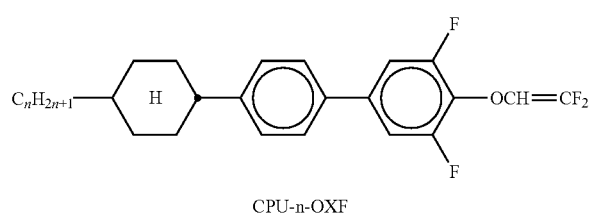
CPU-n-OXF
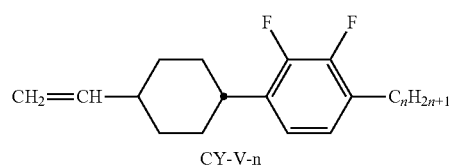
CY-V-n TABLE B-continued
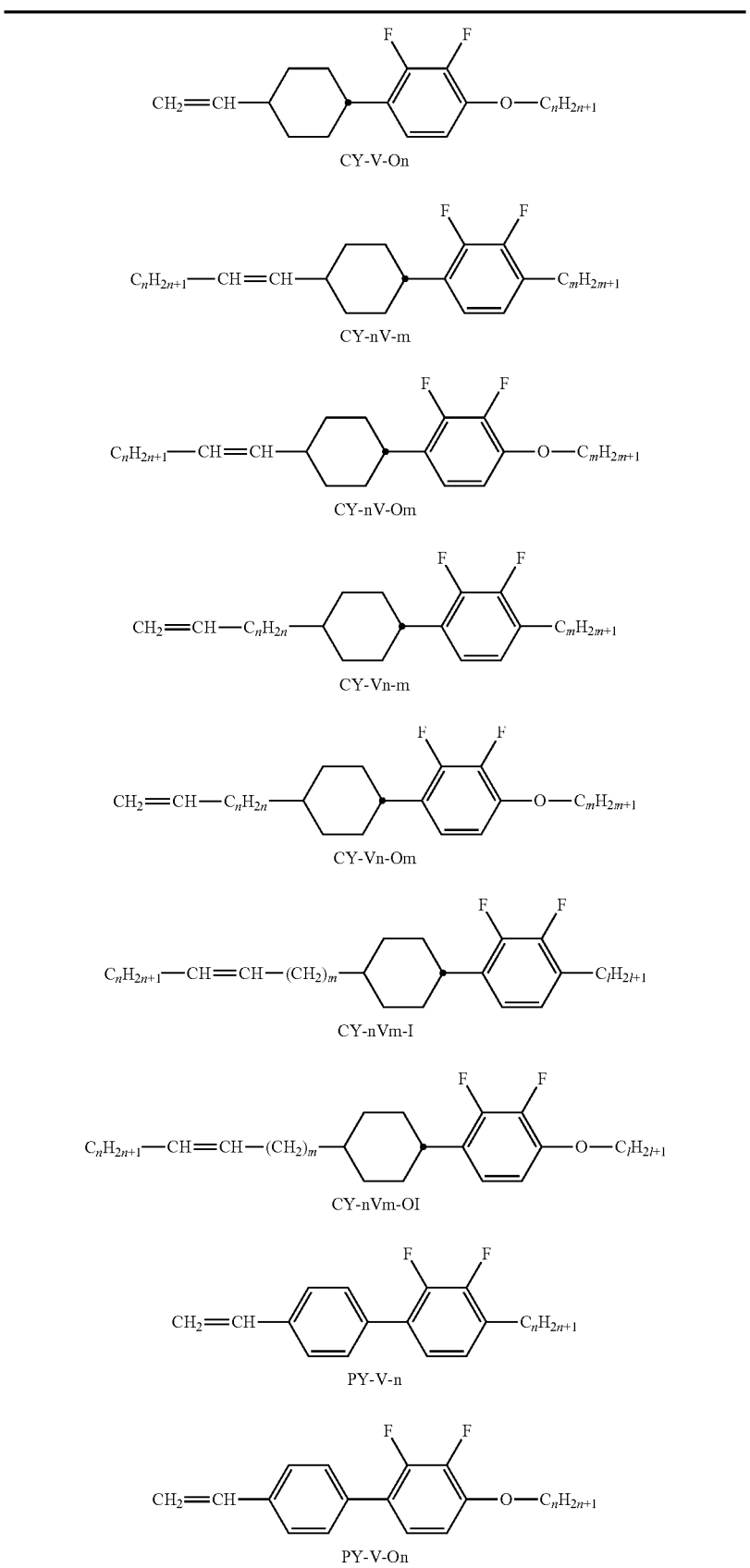

TABLE B-continued
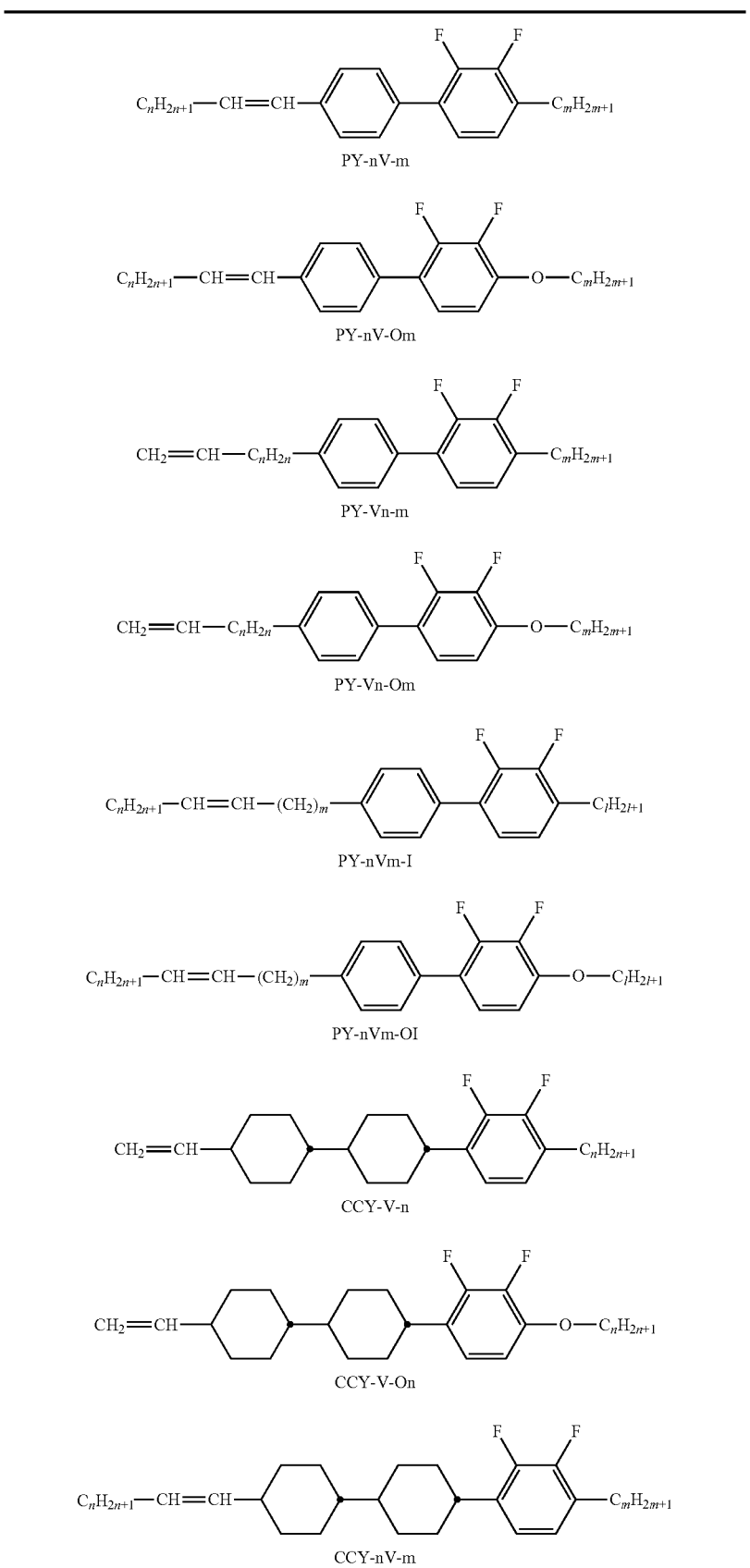

TABLE B-continued
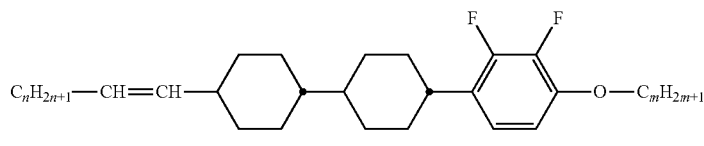
CCCY-nV-Om
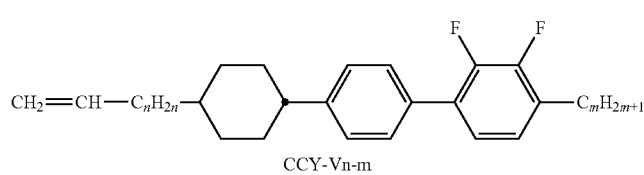
CCY-Vn-m
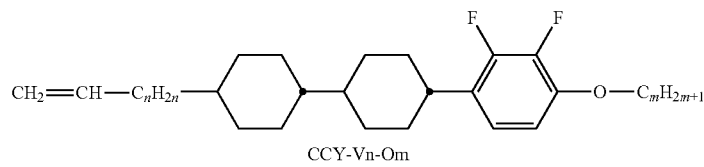
CCY-Vn-Om
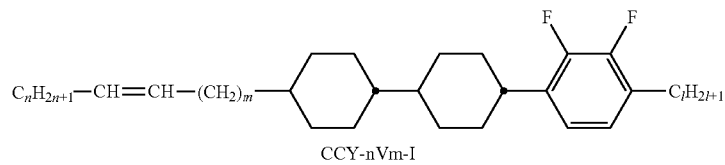
CCY-nVm-l
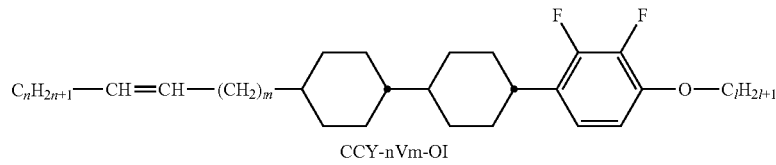
CCY-nVm-Ol
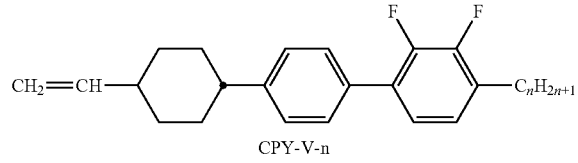
CPY-V-n
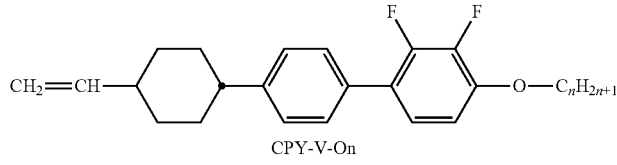
CPY-V-On
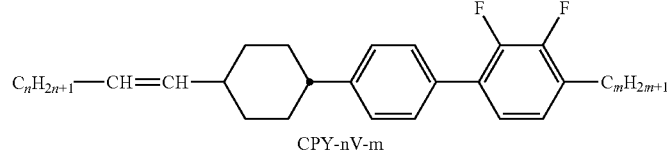
CPY-nV-m
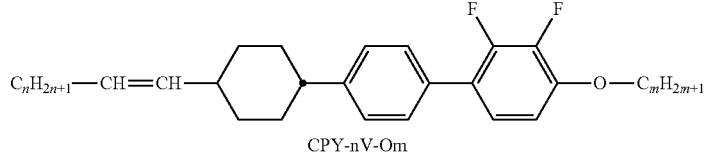
CPY-nV-Om TABLE B-continued
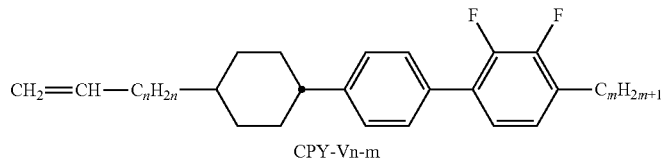
CPY-Vn-m
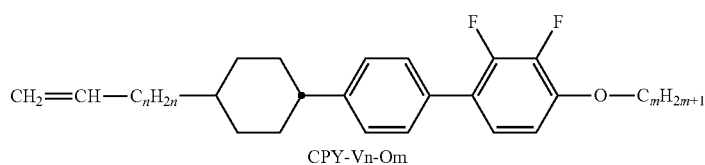
CPY-Vn-Om
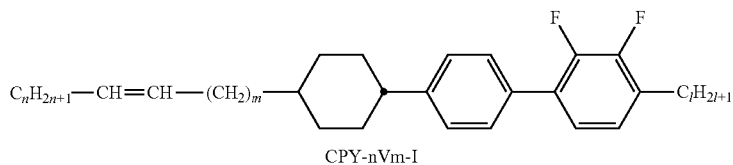
CPY-nVm-l
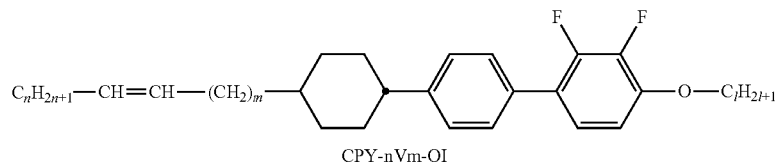
CPY-nVm-Ol
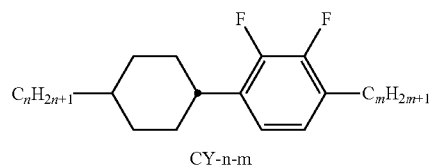
CY-n-m
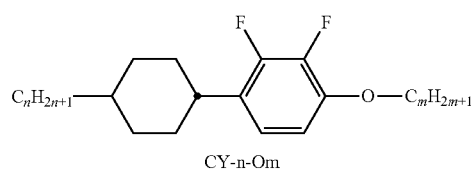
CY-n-Om
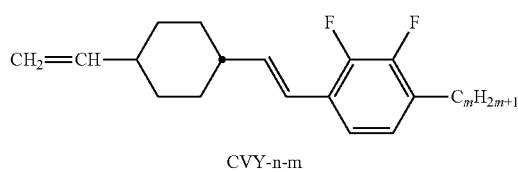
CVY-n-m
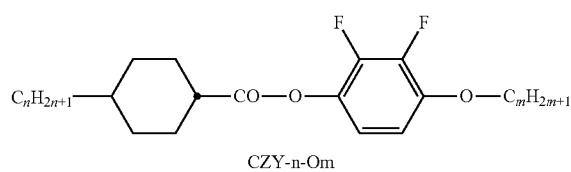
CZY-n-Om
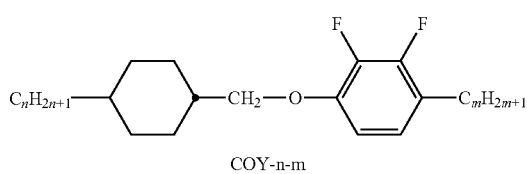
COY-n-m TABLE B-continued
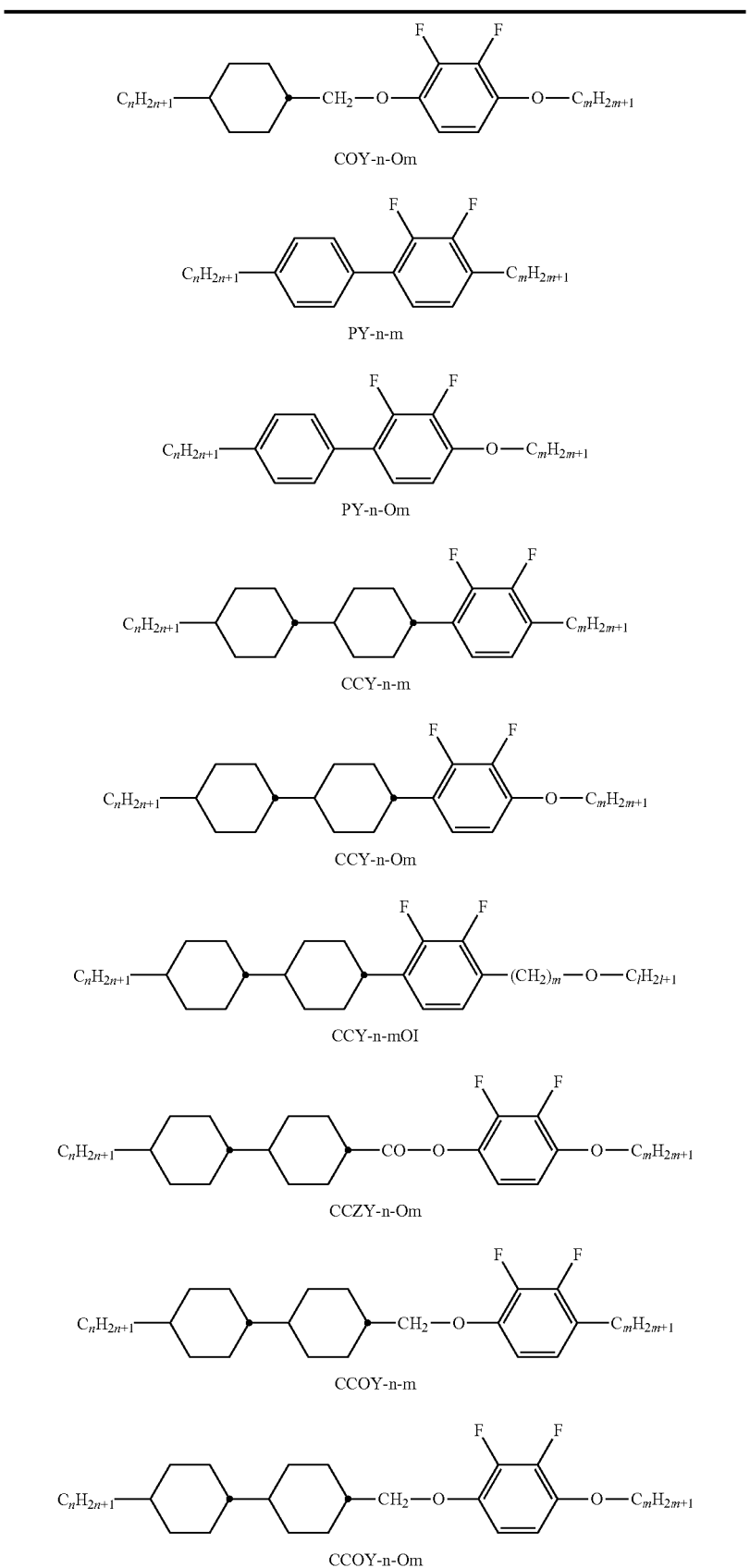

TABLE B-continued
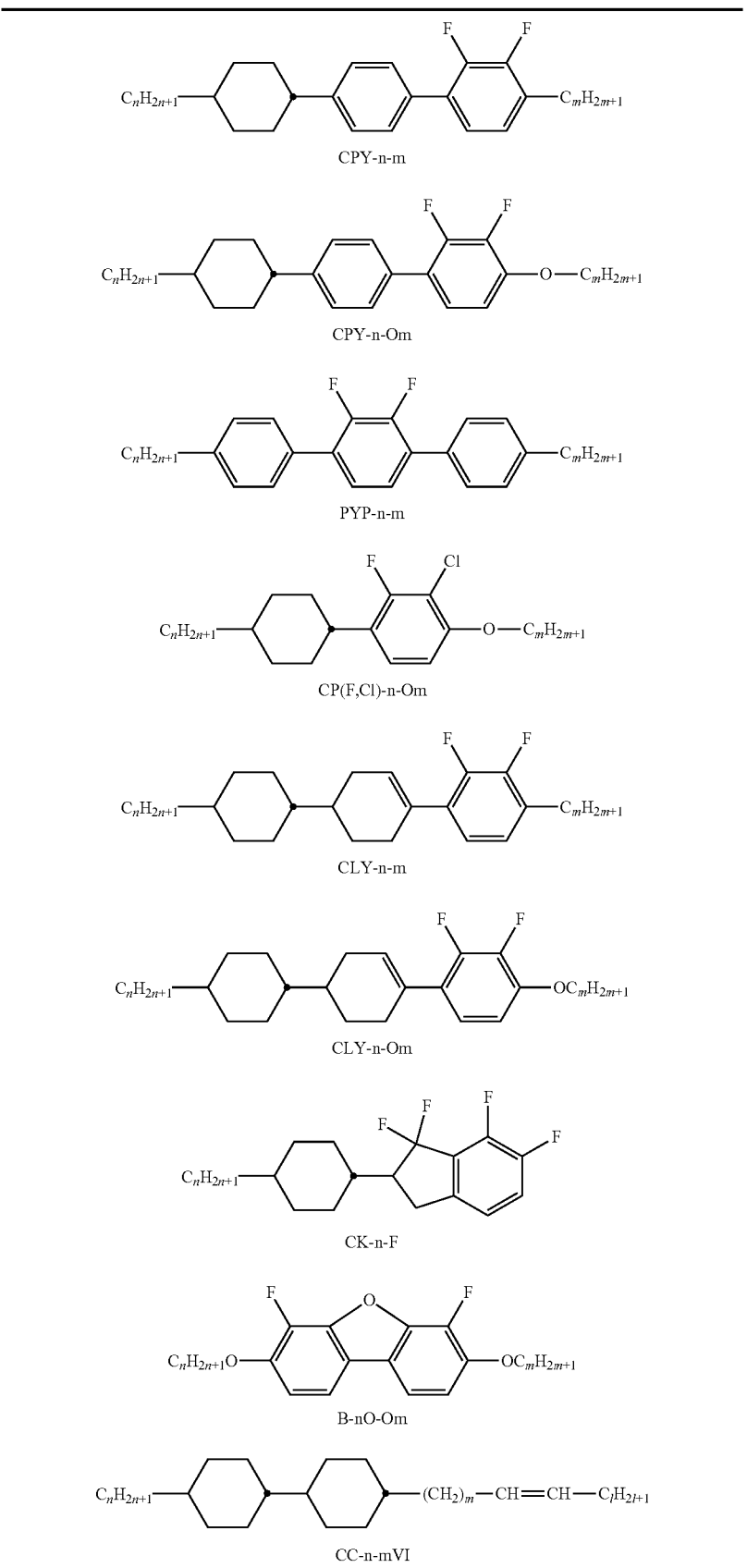

TABLE B-continued
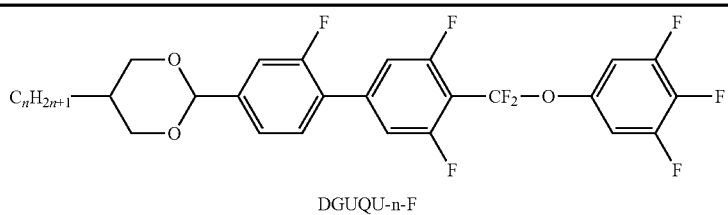
DGUQU-n-F
In the following formulae, n and m each, independently of one another, denote 0, 1, 2, 3, 4, 5, 6, 7, 8, 9, 10, 11 or 12, in particular 2, 3, 5, furthermore 0, 4, 6.
Particular preference is given to liquid-crystalline mixtures which, besides the compounds of the formulae IA and IB, comprise at least one, two, three, four or more compounds from Table B.
TABLE C
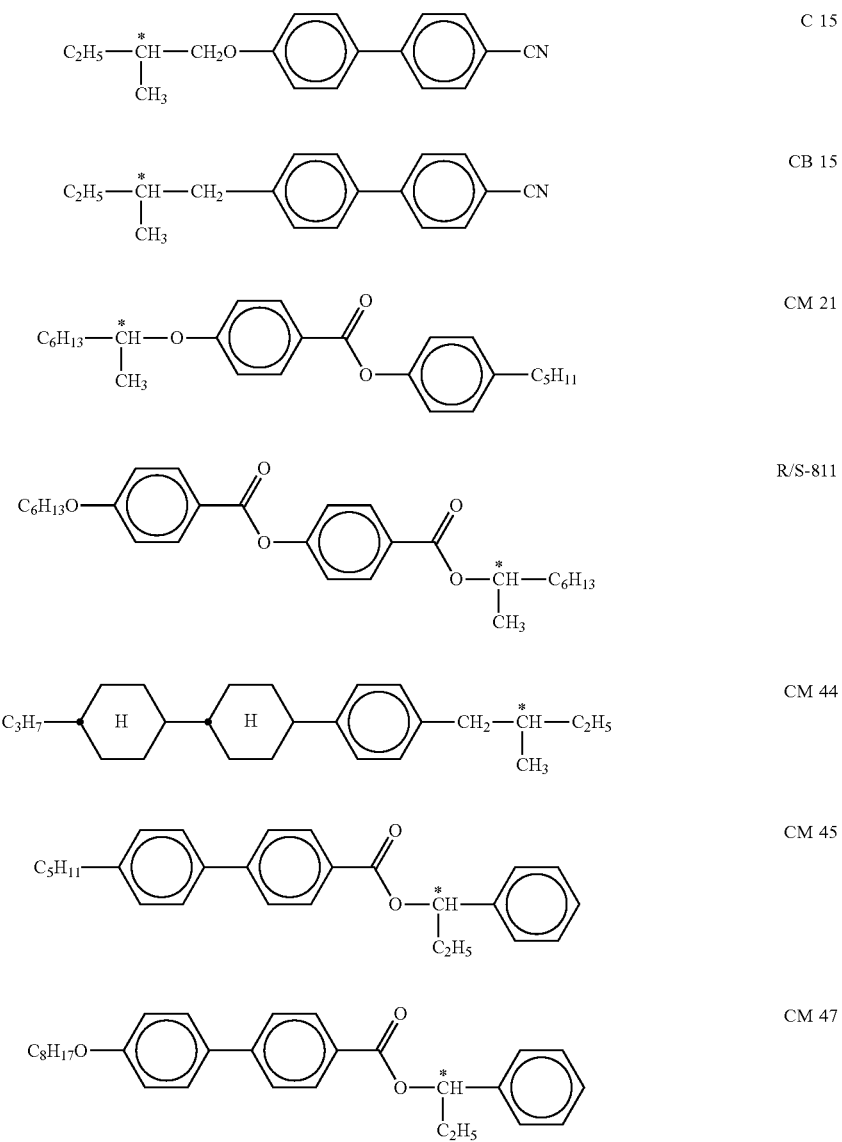

TABLE C-continued
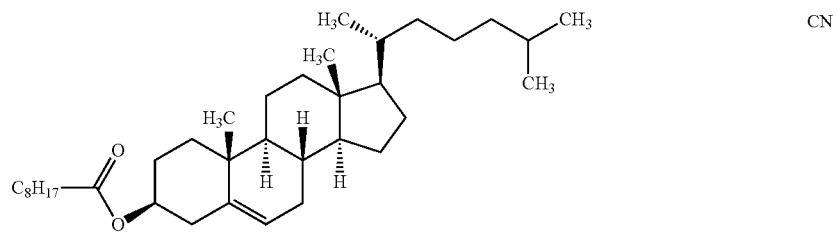 CN
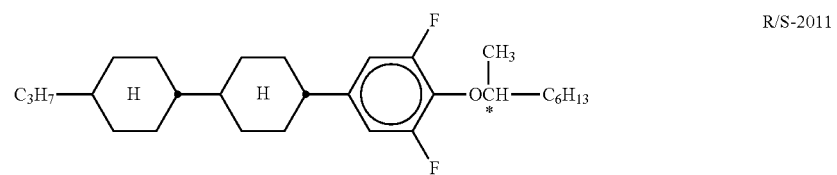 R/S-2011
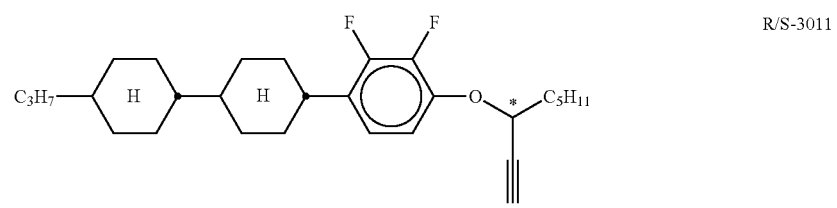 R/S-3011
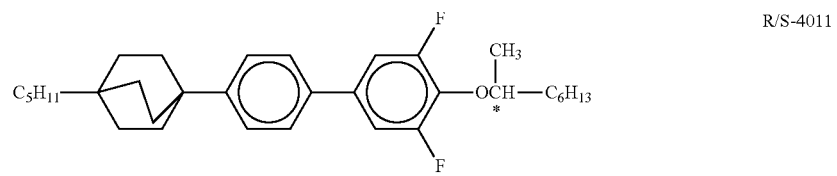 R/S-4011
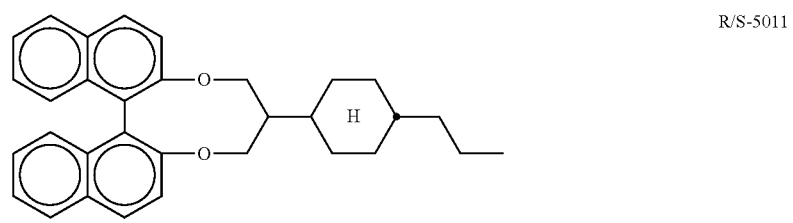 R/S-5011
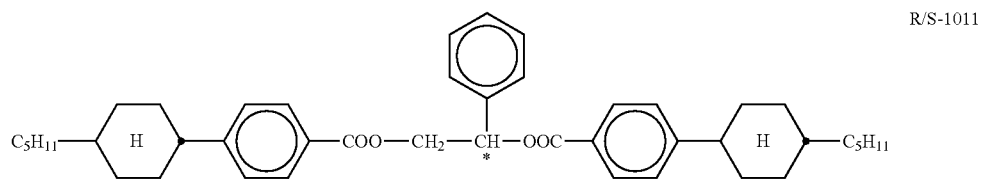 R/S-1011

Table C indicates possible dopants which are generally added to the mixtures according to the invention. The mixtures preferably comprise 0-10% by weight, in particular 0.01-5% by weight and particularly preferably 0.01-3% by weight of dopants.
TABLE D
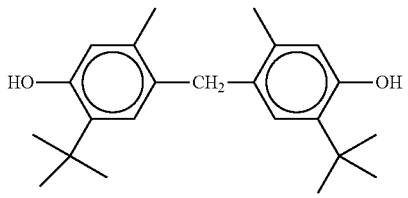
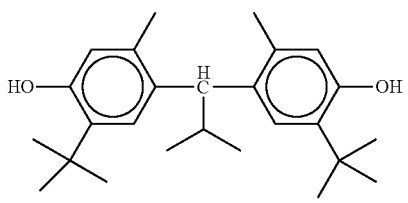
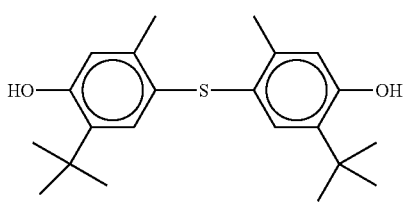
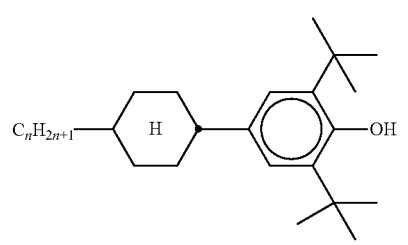
n = 1, 2, 3, 4, 5, 6 or 7
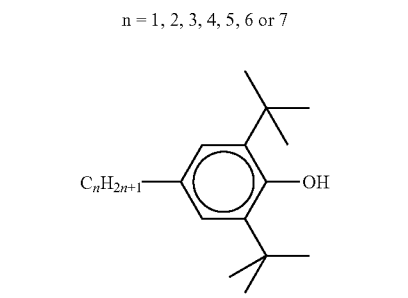
n = 1, 2, 3, 4, 5, 6 or 7
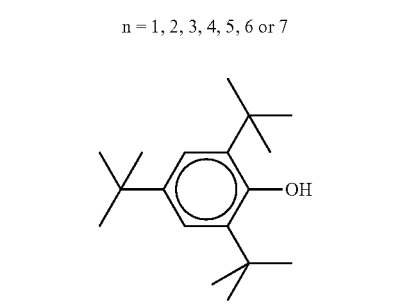
TABLE D-continued
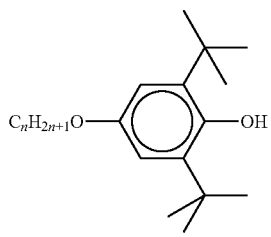
n = 1, 2, 3, 4, 5, 6 or 7
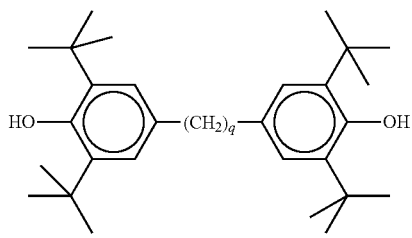
q = 1, 2, 3, 4, 5, 6 or 7
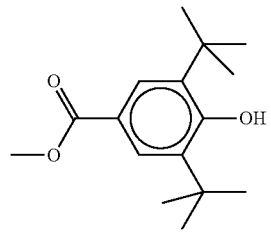
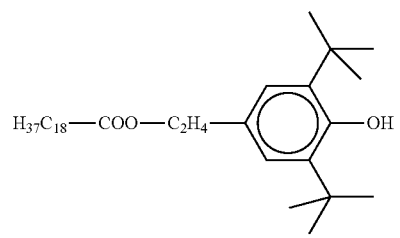
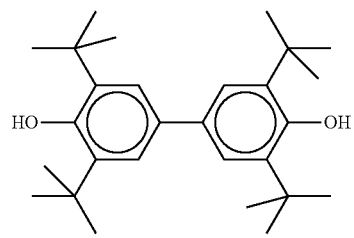

TABLE D-continued
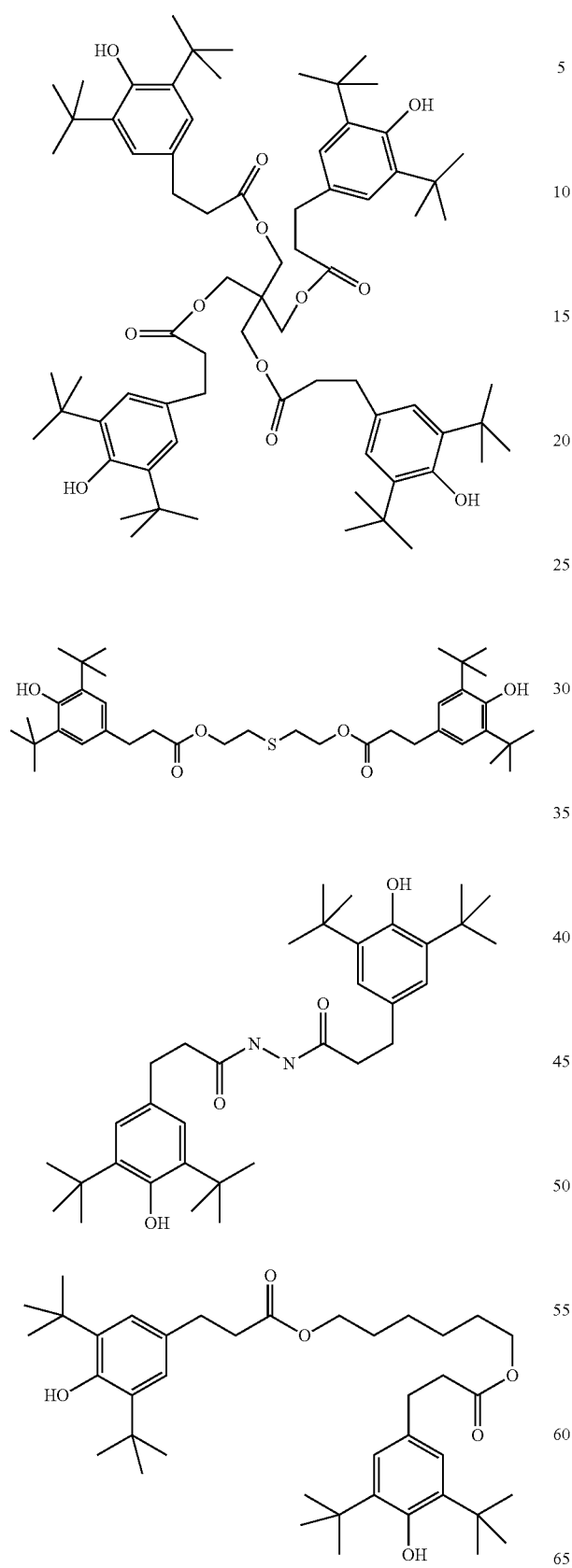
TABLE D-continued
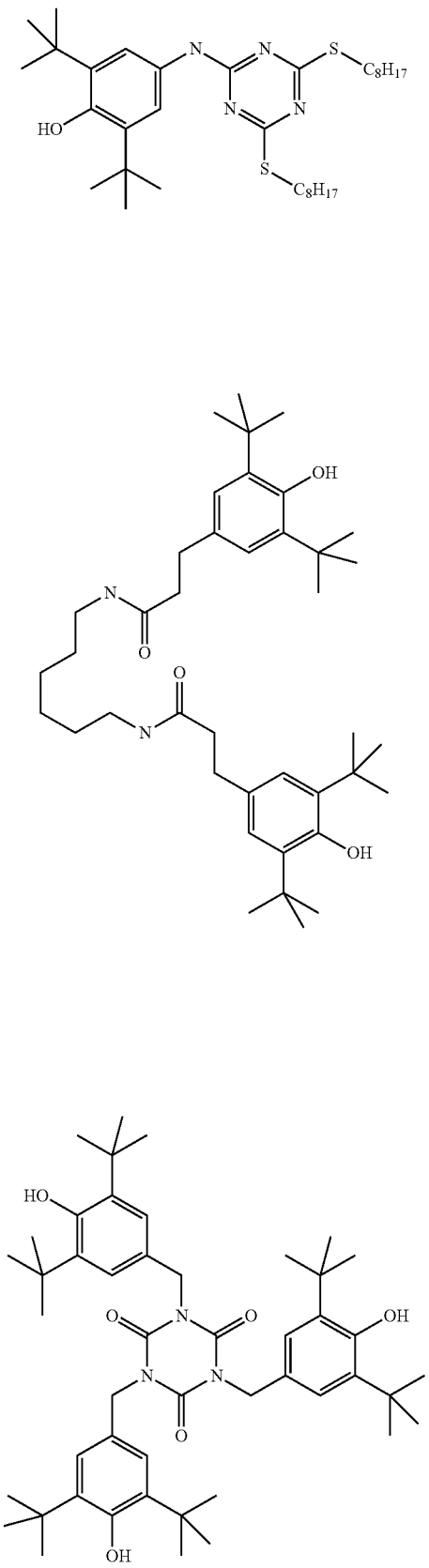

TABLE D-continued
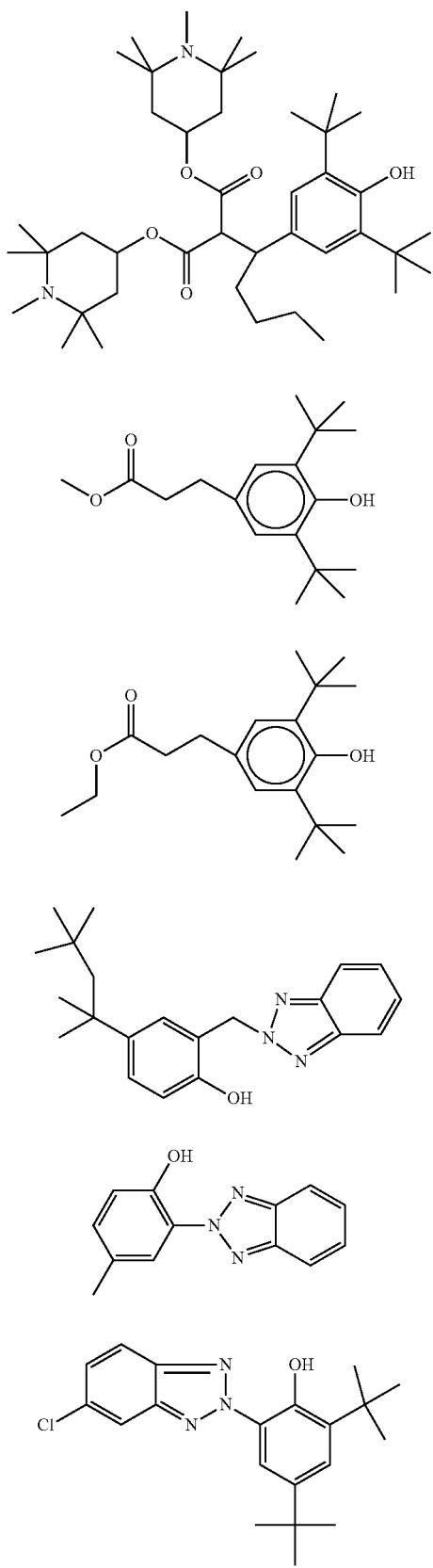
TABLE D-continued
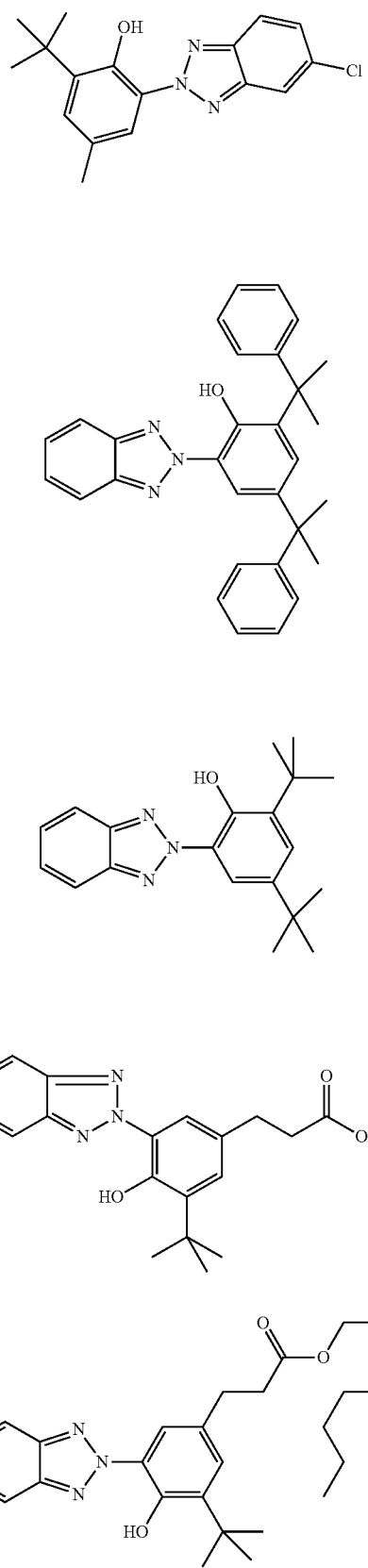

TABLE D-continued

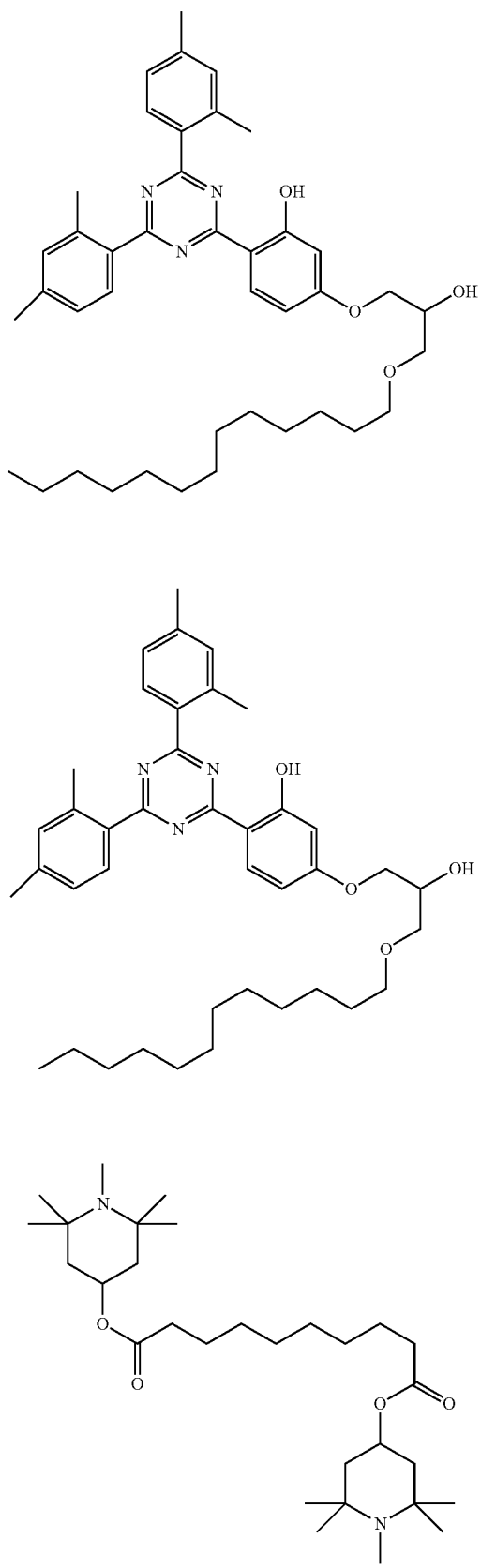

TABLE D-continued

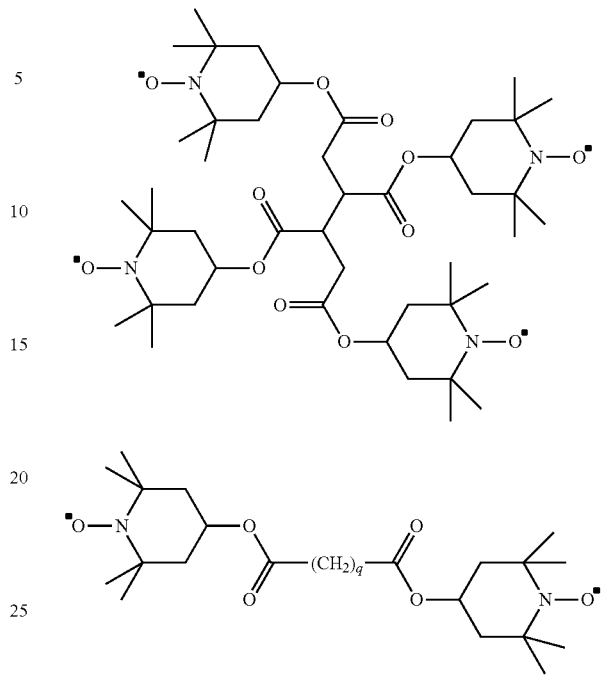

q = 1, 2, 3, 4, 5, 6, 7, 8, 9 or 10

Stabilizers, which can additionally be added, for example, to the mixtures according to the invention in amounts of 0-10% by weight, are mentioned below.

The following mixture examples are intended to explain the invention without limiting it.

Above and below, percentage data denote percent by weight. All temperatures are indicated in degrees Celsius. m.p. denotes melting point, cl.p.=clearing point. Furthermore, C=crystalline state, N=nematic phase, S=smectic phase and I=isotropic phase. The data between these symbols represent the transition temperatures. Furthermore, Δn denotes the optical anisotropy at 589 nm and 20° C., $γ_1$ denotes the rotational viscosity (mPa·s) at 20° C., Δε denotes the dielectric anisotropy at 20° C. and 1 kHz ($Δε=ε_∥-ε_⊥$, where $ε_∥$ denotes the dielectric constant parallel to the longitudinal axes of the molecules and $ε_⊥$ denotes the dielectric constant perpendicular thereto), $V_{10}$ denotes the voltage (V) for 10% transmission (viewing angle perpendicular to the plate surface), (threshold voltage), determined in a TN cell (90 degree twist) at the 1st minimum (i.e. at a dΔn value of 0.5 μm) at 20° C., $V_0$ denotes the capacitively determined Freedericks threshold voltage in an antiparallel-rubbed cell at 20° C.

All physical properties are determined in accordance with "Merck Liquid Crystals, Physical Properties of Liquid Crystals", status November 1997, Merck KGaA, Germany, and apply for a temperature of 20° C., unless explicitly indicated otherwise.

The storage stability in the bulk ($LTS_{bulk}$) of the media according to the invention at a given temperature T is determined by visual inspection. 2 g of the media of interest are filled into a closed glass vessel (bottle) of appropriate size placed in a refrigerator at a predetermined temperature. The bottles are checked at defined time intervals for the occurrence of smectic phases or crystallization. For every material and at each temperature two bottles are stored. If crystallization or the appearance of a smectic phase is observed in at least one of the two correspondent bottles the test is terminated and the time of the last inspection before the one at which the occurrence of a higher ordered phase is observed is recorded as the respective storage stability.

For the determination of the storage stability in LC cells ($LTS_{cell}$) of the media according to the present invention at a given temperature T, the media are filled into TN-type LC test cells with orientation layers, having an approximate surface area of 3 cm$^2$, an electrode area of about 3 cm$^2$ and a cell gap of 6 μm. The cells have no spacers in the area covered by the LC. Only in the edge seal spacers are used. The cells are sealed, polarizers are attached to the cells and the cells are and placed in a refrigerator with a window and internal lighting at a predetermined temperature. Generally, three cells each are filled with a given LC for each temperature investigated. The cells inside the refrigerator are inspected visually through a window defined time intervals for the occurrence of smectic phases or crystallization. Here too, the time of the last inspection before the one at which the occurrence of a higher ordered phase is observed in the first one of a given set of test cells is recorded as the respective storage stability.

EXAMPLES

The nematic host mixtures N1 to N6 are prepared as follows:

Mixture N1

| | | | |
|---|---|---|---|
| CC-3-V | 48.0% | Clearing point [° C.]: | 85.0 |
| CC-3-V1 | 8.5% | Δn (589 nm, 20° C.): | 0.1122 |
| CCP-V2-1 | 6.0% | $n_e$ (589 nm, 20° C.): | 1.6012 |
| CCGU-3-F | 4.5% | $n_o$ (589 nm, 20° C.): | 1.4890 |
| CCQU-5-F | 3.0% | Δε (1 kHz, 20° C.): | 3.4 |
| CPGU-3-OT | 3.0% | $\varepsilon_{\|\|}$ (1 kHz, 20° C.): | 6.2 |
| PGP-2-2V | 6.5% | $\varepsilon_\perp$ (1 kHz, 20° C.): | 2.8 |
| PGP-2-3 | 5.0% | $\gamma_1$ [mPa · s], (20° C.): | 58 |
| PGP-2-4 | 3.0% | $K_1$ [pN]: | 13.9 |
| PGP-2-5 | 4.0% | $K_3$ [pN]: | 15.1 |
| PUQU-3-F | 7.5% | | |
| PGUQU-4-F | 1.0% | | |

Mixture N2

| | | | |
|---|---|---|---|
| CC-3-V | 24.5% | Clearing point [° C.]: | 94.0 |
| CC-3-V1 | 9.5% | Δn (589 nm, 20° C.): | 0.1038 |
| CC-3-2V1 | 10.0% | $n_e$ (589 nm, 20° C.): | 1.5776 |
| CCP-3OCF$_3$ | 4.0% | $n_o$ (589 nm, 20° C.): | 1.4738 |
| CCQU-3-F | 9.0% | Δε (1 kHz, 20° C.): | 17.3 |
| CDUQU-5-F | 10.0% | $\varepsilon_{\|\|}$ (1 kHz, 20° C.): | 21.1 |
| APUQU-2-F | 6.0% | $\varepsilon_\perp$ (1 kHz, 20° C.): | 3.8 |
| APUQU-3-F | 8.0% | $\gamma_1$ [mPa · s], (20° C.): | 111 |
| PGUQU-3-F | 3.0% | $K_1$ [pN]: | 15.9 |
| PGUQU-4-F | 7.0% | $K_3$ [pN]: | 16.1 |
| DPGU-4-F | 5.0% | | |
| DGUQU-4-F | 4.0% | | |

Mixture N3

| | | | |
|---|---|---|---|
| CC-3-V | 42.0% | Clearing point [° C.]: | 79.5 |
| CC-3-V1 | 5.5% | Δn (589 nm, 20° C.): | 0.1054 |
| CCP-V-1 | 4.0% | $n_e$ (589 nm, 20° C.): | 1.5864 |
| CCP-3OCF$_3$ | 4.0% | $n_o$ (589 nm, 20° C.): | 1.4810 |
| PGP-2-2V | 5.0% | Δε (1 kHz, 20° C.): | 4.5 |
| APUQU-2-F | 5.0% | $\varepsilon_{\|\|}$ (1 kHz, 20° C.): | 8.4 |
| APUQU-3-F | 12.0% | $\varepsilon_\perp$ (1 kHz, 20° C.): | 3.9 |
| CPGU-3-OT | 3.0% | $\gamma_1$ [mPa · s], (20° C.): | 62 |
| PGUQU-3-F | 5.0% | $K_1$ [pN]: | 13.1 |
| CPY-3-O2 | 3.0% | $K_3$ [pN]: | 14.4 |
| CY-5-O2 | 9.0% | | |
| PYP-2-3 | 3.0% | | |

Mixture N4

| | | | |
|---|---|---|---|
| CC-3-V | 39.5% | Clearing point [° C.]: | 95.5 |
| CC-3-V1 | 10.0% | Δn (589 nm, 20° C.): | 0.1042 |
| CCP-V-1 | 12.0% | $n_e$ (589 nm, 20° C.): | 1.5892 |
| CCP-V2-1 | 6.0% | $n_o$ (589 nm, 20° C.): | 1.4850 |
| CCQU-3-F | 4.5% | Δε (1 kHz, 20° C.): | 5.0 |
| PGP-2-2V | 4.5% | $\varepsilon_{\|\|}$ (1 kHz, 20° C.): | 7.8 |
| PGP-3-2V | 5.0% | $\varepsilon_\perp$ (1 kHz, 20° C.): | 2.8 |
| APUQU-2-F | 6.0% | $\gamma_1$ [mPa · s], (20° C.): | 69 |
| APUQU-3-F | 6.0% | $K_1$ [pN]: | 15.4 |
| CPGU-3-OT | 4.5% | $K_3$ [pN]: | 17.6 |
| PGUQU-3-F | 2.0% | | |

Mixture N5

| | | | |
|---|---|---|---|
| CDUQU-3-F | 8.0% | Clearing point [° C.]: | 106.5 |
| CPGP-5-2 | 2.5% | Δn (589 nm, 20° C.): | 0.1107 |
| DGUQU-4-F | 6.5% | $n_e$ (589 nm, 20° C.): | 1.5965 |
| DPGU-4-F | 4.0% | $n_o$ (589 nm, 20° C.): | 1.4858 |
| PGUQU-3-F | 2.5% | Δε (1 kHz, 20° C.): | 6.6 |
| CCP-3OCF$_3$ | 5.0% | $\varepsilon_{\|\|}$ (1 kHz, 20° C.): | 9.6 |
| CCP-V-1 | 11.0% | $\varepsilon_\perp$ (1 kHz, 20° C.): | 3.0 |
| CCP-V2-1 | 9.0% | $\gamma_1$ [mPa · s], (20° C.): | 95 |
| PGP-2-2V | 6.0% | $K_1$ [pN]: | 18.8 |
| CC-3-2V1 | 8.0% | $K_3$ [pN]: | 19.9 |
| CC-3-V | 23.5% | | |
| CC-3-V1 | 10.0% | | |
| PP-1-2V1 | 4.0% | | |

Mixture N6

| | | | |
|---|---|---|---|
| CC-3-V | 32.5% | Clearing point [° C.]: | 79.5 |
| CC-3-V1 | 12.0% | Δn (589 nm, 20° C.): | 0.0992 |
| CC-3-2V1 | 10.5% | $n_e$ (589 nm, 20° C.): | 1.5827 |
| CCP-V-1 | 10.5% | $n_o$ (589 nm, 20° C.): | 1.4835 |
| CCP-V2-1 | 2.0% | Δε (1 kHz, 20° C.): | 3.0 |
| PGP-2-2V | 7.0% | $\varepsilon_{\|\|}$ (1 kHz, 20° C.): | 6.5 |
| APUQU-2-F | 6.0% | $\varepsilon_\perp$ (1 kHz, 20° C.): | 3.5 |
| APUQU-3-F | 7.5% | $\gamma_1$ [mPa · s], (20° C.): | 58 |
| CY-5-O2 | 5.5% | | |
| B-2O-O5 | 3.5% | | |
| PP-1-2V1 | 2.5% | | |
| PPGU-3-F | 0.5% | | |

Mixture Examples

From the host mixtures N1 to N6, the following mixture examples are prepared by addition of stabilizers of the formulae ST-1a-2-1 and ST-2a-3 in the amounts given in the table below.

ST-1a-2-1

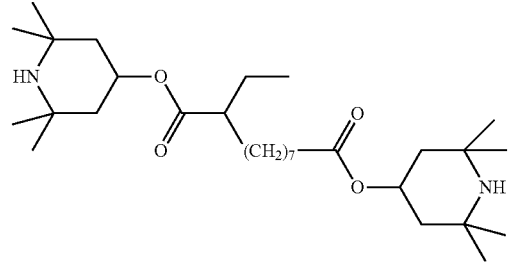

-continued

ST-2a-3

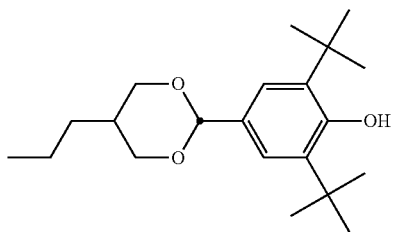

| Example | Host Mixture | Host Mixture | ST-1a-2-1 | ST-2a-3 |
|---|---|---|---|---|
| | | concentration of component [%] | | |
| C1 | N1 | 100.0 | — | — |
| M1 | N1 | 99.97 | 0.03 | — |
| M2 | N1 | 99.95 | 0.05 | — |
| M3 | N1 | 99.90 | 0.10 | — |
| M4 | N1 | 99.85 | 0.15 | — |
| M5 | N1 | 99.80 | 0.20 | — |
| M6 | N1 | 99.92 | 0.03 | 0.05 |
| M7 | N1 | 99.90 | 0.05 | 0.05 |
| M8 | N1 | 99.85 | 0.10 | 0.05 |
| M9 | N1 | 99.80 | 0.15 | 0.05 |
| M10 | N1 | 99.75 | 0.20 | 0.05 |
| M11 | N2 | 99.92 | 0.03 | 0.05 |
| M12 | N2 | 99.90 | 0.05 | 0.05 |
| M13 | N2 | 99.85 | 0.10 | 0.05 |
| M14 | N2 | 99.80 | 0.15 | 0.05 |
| M15 | N2 | 99.75 | 0.20 | 0.05 |
| M16 | N3 | 99.92 | 0.03 | 0.05 |
| M17 | N3 | 99.90 | 0.05 | 0.05 |
| M18 | N3 | 99.85 | 0.10 | 0.05 |
| M19 | N3 | 99.80 | 0.15 | 0.05 |
| M20 | N3 | 99.75 | 0.20 | 0.05 |
| M21 | N4 | 99.92 | 0.03 | 0.05 |
| M22 | N4 | 99.90 | 0.05 | 0.05 |
| M23 | N4 | 99.85 | 0.10 | 0.05 |
| M24 | N4 | 99.80 | 0.15 | 0.05 |
| M25 | N4 | 99.75 | 0.20 | 0.05 |
| M26 | N5 | 99.85 | 0.10 | 0.05 |
| M27 | N6 | 99.85 | 0.10 | 0.05 |

Stress Tests

Test cells having the alignment layer AL-16301 (Japan Synthetic Rubber (JSR), Japan) with a layer thickness of 3.2 μm (electrodes: ECB layout) are filled with the corresponding mixtures and their voltage holding ratio is measured.

Measurement Conditions

1. UV-Load

The initial value and the value after UV exposure with a high-pressure mercury vapor lamp from Hoya (Execure 3000) with an edge filter (T=50% at 340 nm), with an exposure intensity of 3 J/cm², are determined at a temperature of 25° C. The exposure intensity is measured using an Ushio UIT-101+UVD-365PD sensor at a wavelength of 365 nm. The VHR is measured at a temperature of 100° C. after 5 minutes in the oven. The voltage is 1 V at 60 Hz. The results are summarized in the following table 1.

2. Heat Load

For the heat load experiments the test cells are kept at 100° C. in an oven for the given period of time.

3. Backlight Load

Corresponding investigations of the mixtures were then carried out in sealed test cells with exposure to commercial LCD TV backlighting (CCFL). The temperature of the test cells here was about 40° C. due to the heat evolution by the backlighting.

The results of the stress tests are summarized in tables 1 to 3.

TABLE 1

VHR values after UV load[1]

| | Mixture | | | | | |
|---|---|---|---|---|---|---|
| | C1 | M1 | M2 | M3 | M4 | M5 |
| initial | 98.10 | 98.95 | 98.93 | 98.98 | 99.00 | 99.00 |
| after UV | 97.72 | 99.14 | 99.01 | 99.08 | 99.06 | 99.08 |

[1]measured at 60 Hz, 100° C.

TABLE 2

VHR values after heat load[1]

| | Mixture | | | | | |
|---|---|---|---|---|---|---|
| t [h] | C1 | M1 | M2 | M3 | M4 | M5 |
| 0 | 97.56 | 98.80 | 99.08 | 99.07 | 99.13 | 99.27 |
| 24 | 97.74 | 99.49 | 99.59 | 99.59 | 99.61 | 99.62 |
| 48 | 97.26 | 99.53 | 99.56 | 99.63 | 99.62 | 99.59 |
| 120 | 96.92 | 99.56 | 99.66 | 99.62 | 99.63 | 99.65 |

[1]measured at 60 Hz, 100° C.

TABLE 3

VHR values after backlight load[1]

| | Mixture | | | | | |
|---|---|---|---|---|---|---|
| t [h] | C1 | M1 | M2 | M3 | M4 | M5 |
| 0 | 98.29 | 99.27 | 99.24 | 99.33 | 99.22 | 99.13 |
| 24 | 95.62 | 99.52 | 99.51 | 99.55 | 99.50 | 99.50 |
| 168 | 88.87 | 99.33 | 99.32 | 99.37 | 99.33 | 99.28 |
| 336 | 80.72 | 98.99 | 98.97 | 99.12 | 99.11 | 99.10 |
| 504 | 76.39 | 98.77 | 98.72 | 98.86 | 98.90 | 98.91 |

[1]measured at 60 Hz, 100° C.

The values given in the tables 1 to 3 show, that even in a small concentration of only 0.03%, the VHR of the mixtures comprising the compound of the formula ST-1a-2-1 is significantly improved in comparison to the unstabilized host mixture (comparative example C1) before UV, backlight or heat stress and in particular thereafter. An increase in the concentration does not lead to a further improvement of the VHR after stress.

LTS Measurements

A nematic mixture N7 is prepared from 99.95% of mixture N1 and 0.05% of additive ST-2a-3. Mixtures M28 to M32 are prepared by addition of additive ST-1a-2-1 in the amounts given in the following table 4.

TABLE 4

LTS tests (in bulk)

| Example | Host Mixture | Host Mixture | ST-1a-2-1 | LTS [h] at −20° C. |
|---|---|---|---|---|
| | | concentration of component [%] | | |
| M28 | N7 | 99.97 | 0.03 | >1000 |
| M29 | N7 | 99.95 | 0.05 | >1000 |
| M30 | N7 | 99.90 | 0.10 | >1000 |

TABLE 4-continued

LTS tests (in bulk)

| Example | Host Mixture | Host Mixture | ST-1a-2-1 | LTS [h] at −20° C. |
|---|---|---|---|---|
| M31 | N7 | 99.85 | 0.15 | >1000 |
| M32 | N7 | 99.80 | 0.20 | 768 < Cr < 792 |

As can be seen from table 4, for concentrations of 0.03 to 0.15% of additive ST-1a-2-1, no crystallization occurs for at least 1000 h. In case of mixture M32 having a concentration of 0.020% of ST-1a-2-1, crystallization did only occur after a period of between 768 and 792 h which is still sufficient for practical applications.

Hence, the additive ST-1a-2-1 is surprisingly well soluble in a very high concentration of at least 0.20%.

The VHR values obtained by investigation of the mixtures M6 to M27, additionally comprising the additive ST-2a-3, are, within the measuring accuracy, the same as observed for the mixtures M1 to M5.

Surprisingly, the mixtures M5, M10, M15, M20 and M25, comprising 0.2% of additive ST-1a-2-1 and in combination with 0.05% of additive ST-2a-3 show a very advantageous combination of low image sticking, very good LTS and in particular no or for applications sufficiently low degree of edge mura in display panels. This is particularly unexpected because there was no further improvement of the VHR when using concentrations of ST-1a-2-1 higher than 0.03% as shown above.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The entire disclosure[s] of all applications, patents and publications, cited herein and of corresponding EP application No. 17161384.7, filed Mar. 16, 2017, is [are] incorporated by reference herein.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A liquid-crystalline medium, comprising:
a) one or more compounds of formula ST-1a

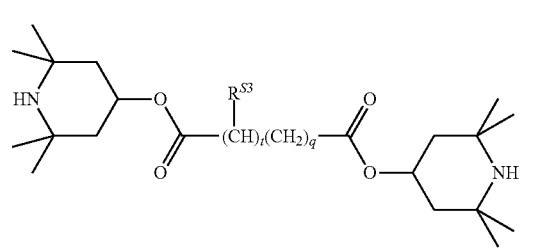

in which
$R^{S3}$ denotes alkyl having 1 to 6 C atoms;
t is 1, and
q is 0, 1, 2, 3, 4, 5, 6, 7, 8, or 9;
and
b) one or more compounds of formula ST-2

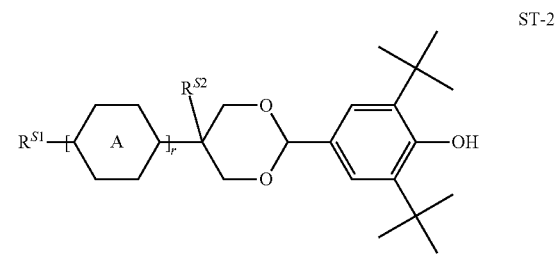

in which

denotes

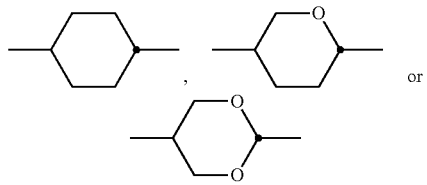

$R^{S1}$ denotes H, or an alkyl, alkenyl or alkoxy radical in each case having up to 15 C atoms, and in which one or more H atoms may each be replaced by halogen,
$R^{S2}$ denotes H, or alkyl, alkenyl or alkoxy radical in each case having up to 7 C atoms, and in which one or more H atoms may each be replaced by halogen,
r is 0 or 1;
and
c) one or more compounds of formula RV

in which $R^{21}$ denotes an unsubstituted alkyl radical having 1 to 7 C atoms or an unsubstituted alkenyl radical having 2 to 7 C atoms, and $R^{22}$ denotes an unsubstituted alkenyl radical having 2 to 7 C atoms, and d) one or more compounds selected from formulae IA and IB,

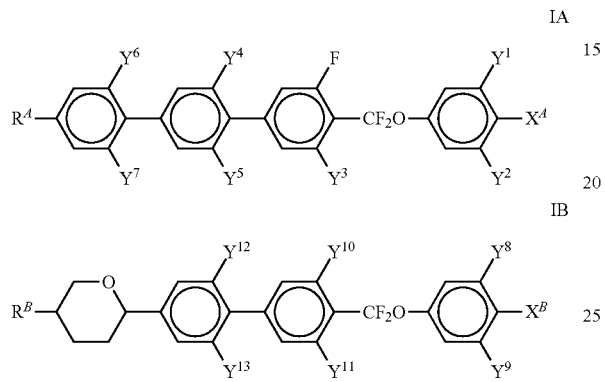

in which $R^A$ and $R^B$ each, independently of one another, denotes a halogenated or unsubstituted alkyl or alkoxy radical having 1 to 15 C atoms, where, in addition, one or more $CH_2$ groups in these radicals may each be replaced, independently of one another, by —C≡C—, —$CF_2O$—, —CH=CH—,

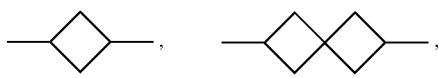

—O—, —CO—O— or —O—CO— in such a way that O atoms are not linked directly to one another, $X^A$ and $X^B$ each, independently of one another, denotes F, Cl, CN, $SF_5$, SCN, NCS, or a halogenated alkyl radical, a halogenated alkenyl radical, a halogenated alkoxy radical or a halogenated alkenyloxy radical, in each case having up to 6 C atoms, and $Y^{1-13}$ each, independently of one another, denote H or F;

wherein the medium comprises one or more compounds of formula ST-1a in a total concentration of 1500 ppm to 3000 ppm, and comprises one or more compounds of formula ST-2 in a total concentration of 300 ppm or more.

2. The liquid-crystalline medium according to claim 1, wherein the medium comprises a compound of formula ST-1a in which q is 7, t is 1 and $R^{S3}$ denotes ethyl.

3. The liquid-crystalline medium according to claim 1, wherein said one or more compounds of formula ST-2 is/are one or more compounds of formula ST-2a

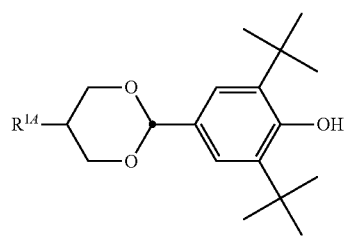

in which $R^{1A}$ denotes alkyl having 1 to 7 C atoms.

4. The liquid-crystalline medium according to claim 1, wherein said one or more compounds selected from formulae IA are selected from formulae IA-a to IA-f,

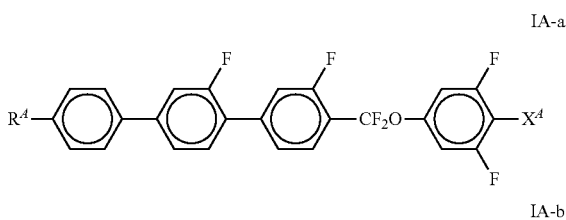

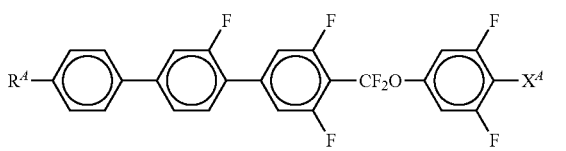

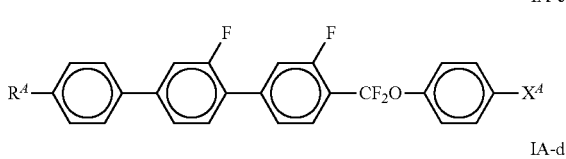

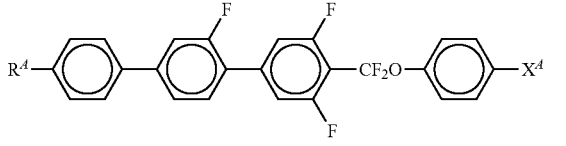

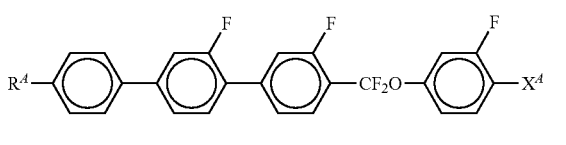

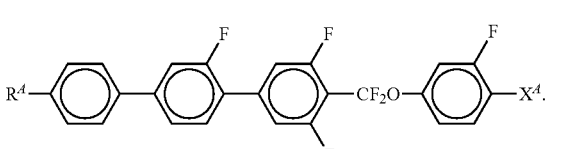

wherein groups $R^A$ and $X^A$ are as defined in claim 1.

5. The liquid-crystalline according to claim 1, wherein said one or more compounds selected from formulae IB are selected from formulae IB-a to IB-h

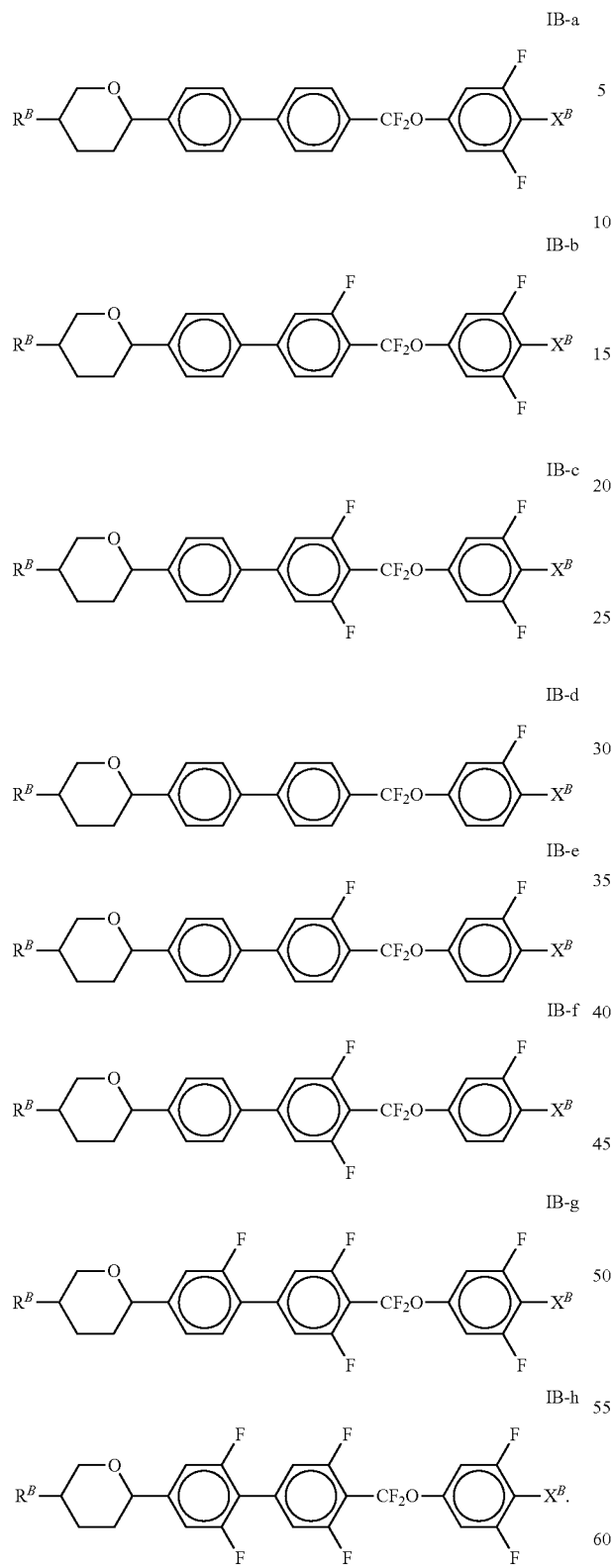

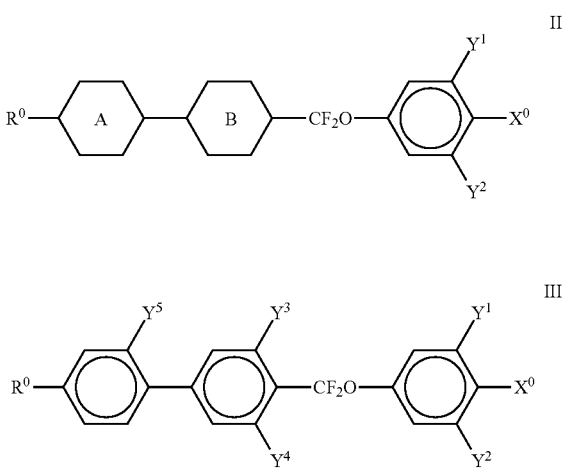

in which
- R⁰ denotes a halogenated or unsubstituted alkyl or alkoxy radical having 1 to 15 C atoms, where, in addition, one or more $CH_2$ groups in these radicals may each be replaced, independently of one another, by —C≡C—, —$CF_2$O—, —CH=CH—,

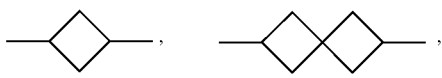

—O—, —CO—O— or —O—CO— in such a way that O atoms are not linked directly to one another,
- $X^0$ denotes F, Cl, CN, $SF_5$, SCN, NCS, or a halogenated alkyl radical, a halogenated alkenyl radical, a halogenated alkoxy radical or a halogenated alkenyloxy radical, in each case having up to 6 C atoms,
- $Y^{1-5}$ each, independently of one another, denote H or F, and

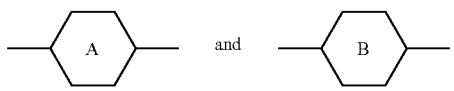

each, independently of one another, denote

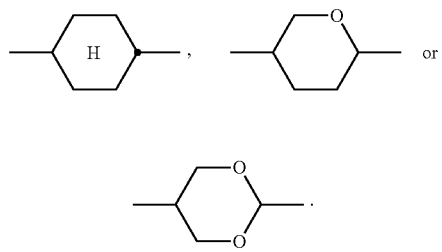

wherein groups $R^B$ and $X^B$ are as defined in claim 1.

6. The liquid-crystalline medium according to claim 1, wherein said medium additionally comprises one or more compounds selected from formulae II and/or III,

7. The liquid-crystalline medium according to claim 1, wherein said medium additionally comprises one or more compounds selected from formulae IV to VIII,

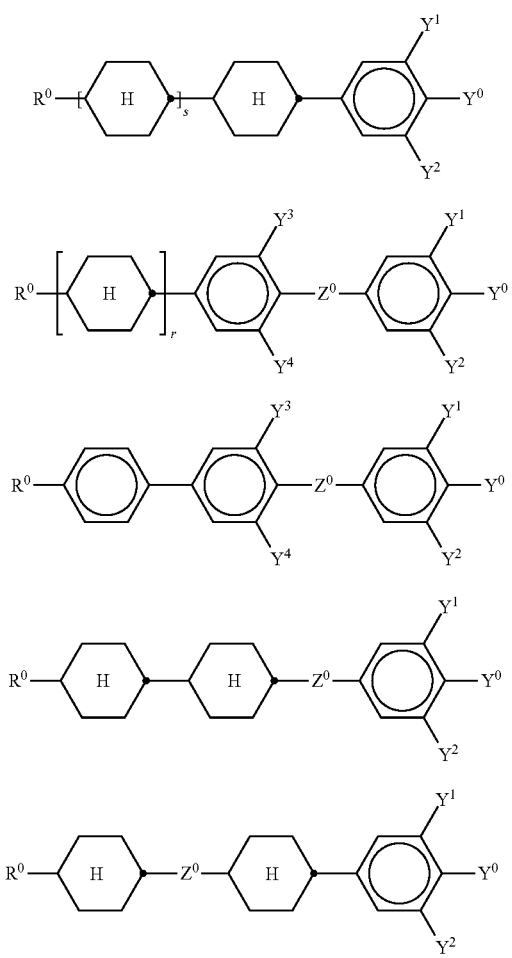

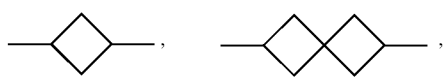

in which
- R⁰ denotes a halogenated or unsubstituted alkyl or alkoxy radical having 1 to 15 C atoms, where, in addition, one or more CH₂ groups in these radicals may each be replaced, independently of one another, by —C≡C—, —CF₂O—, —CH=CH—, —O—, —CO—O— or —O—CO— in such a way that O atoms are not linked directly to one another,
- X⁰ denotes F, Cl, CN, SF₅, SCN, NCS, or a halogenated alkyl radical, a halogenated alkenyl radical, a halogenated alkoxy radical or a halogenated alkenyloxy radical, each having up to 6 C atoms,
- $Y^{1-4}$ each, independently of one another, denote H or F,
- Z⁰ denotes —C₂H₄—, —(CH₂)₄—, —CH=CH—, —CF=CF—, —C₂F₄—, —CH₂CF₂—, —CF₂CH₂—, —CH₂O—, —OCH₂—, —COO— or —OCF₂—, and, in formulae V and VI, Z⁰ can also be a single bond, and, in formulae V and VIII, Z⁰ can also be —CF₂O—,
- r denotes 0 or 1, and
- s denotes 0 or 1.

8. The liquid-crystalline medium according to claim 1, wherein said medium additionally comprises one or more compounds selected from formulae IX to XII,

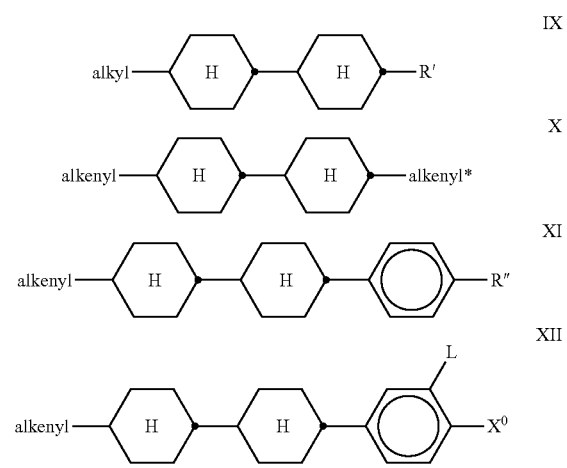

in which
- X⁰ denotes F, Cl, CN, SF₅, SCN, NCS, or a halogenated alkyl radical, a halogenated alkenyl radical, a halogenated alkoxy radical or a halogenated alkenyloxy radical, in each case having up to 6 C atoms,
- L denotes H or F,
- "alkyl" denotes $C_{1-6}$-alkyl,
- R' denotes $C_{1-6}$-alkyl or $C_{1-6}$-alkoxy
- R'' denotes $C_{1-6}$-alkyl, $C_{1-6}$-alkoxy or $C_{2-6}$-alkenyl, and
- "alkenyl" and "alkenyl*" each, independently of one another, denote $C_{2-6}$-alkenyl.

9. The liquid-crystalline medium according to claim 1, wherein said medium additionally comprises one or more compounds of formula XVII,

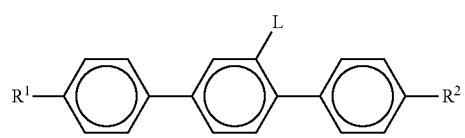

in which
- R¹ and R² each, independently of one another, denote n-alkyl, alkoxy, oxaalkyl, fluoroalkyl or alkenyl, in each case having up to 8 C atoms, and L denotes H or F.

10. The liquid-crystalline medium according to claim 1, wherein said medium further comprises one or more compounds selected from formulae XXVII, XXVIII and XXIX,

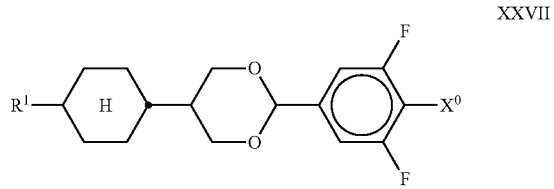

XXVIII

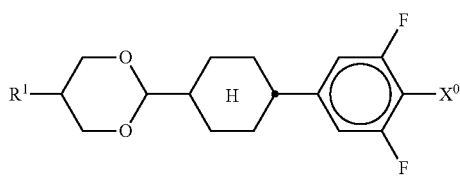

XXIX

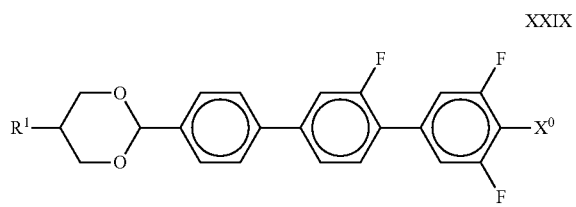

in which
R¹ denotes n-alkyl, alkoxy, oxaalkyl, fluoroalkyl or alkenyl, in each case having up to 8 C atoms, and X⁰ denotes F, Cl, CN, SF₅, SCN, NCS, or a halogenated alkyl radical, a halogenated alkenyl radical, a halogenated alkoxy radical or a halogenated alkenyloxy radical, in each case having up to 6 C atoms.

11. The liquid-crystalline medium according to claim 1, wherein said medium further comprises one or more compounds selected from formulae XIX, XX, XXI, XXII, XXIII and XXIV,

XIX

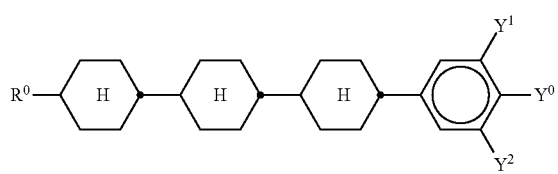

XX

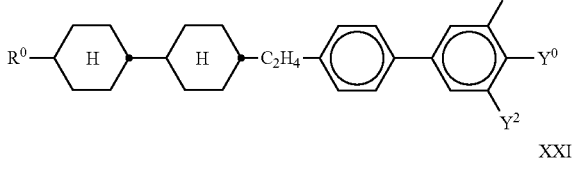

XXI

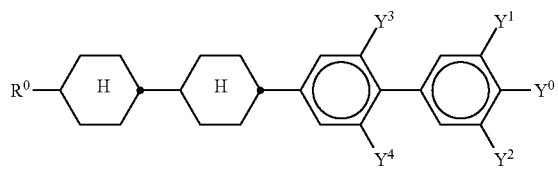

XXII

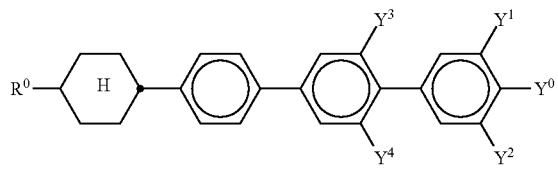

XXIII

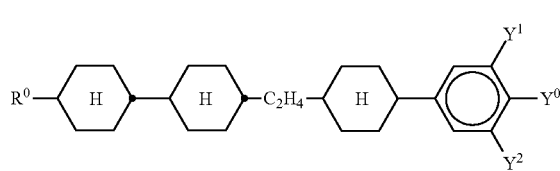

XXIV

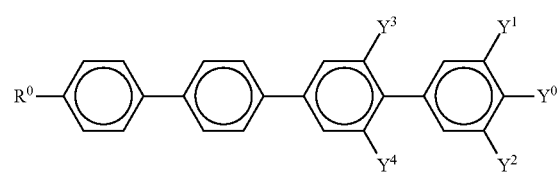

in which
R⁰ denotes a halogenated or unsubstituted alkyl or alkoxy radical having 1 to 15 C atoms, where, in addition, one or more CH₂ groups in these radicals may each be replaced, independently of one another, by —C≡C—, —CF₂O—, —CH=CH—,

—O—, —CO—O— or —O—CO— in such a way that O atoms are not linked directly to one another, X⁰ denotes F, Cl, CN, SF₅, SCN, NCS, or a halogenated alkyl radical, a halogenated alkenyl radical, a halogenated alkoxy radical or a halogenated alkenyloxy radical, in each case having up to 6 C atoms, and Y¹⁻⁴ each, independently of one another, denote H or F.

12. The liquid-crystalline medium according to claim 1, wherein said medium further comprises ≥20% by weight of a compound of formula IXb, IXb

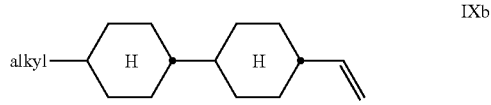

in which "alkyl" denotes C₁₋₆-alkyl.

13. The liquid-crystalline medium according to claim 1, wherein said medium additionally comprises one or more compounds selected from formulae IIIA, IIB and IIC

IIA

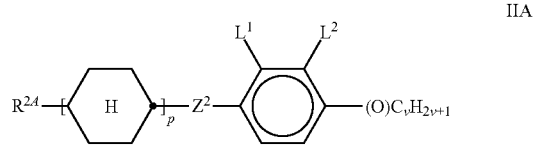

IIB

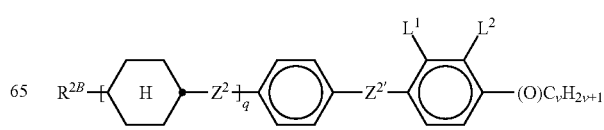

-continued

IIC

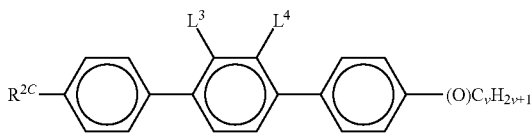

in which
R²ᴬ, R²ᴮ and R²ᶜ each, independently of one another, denote H, an alkyl or alkenyl radical having up to 15 C atoms which is unsubstituted, monosubstituted by CN or CF₃ or at least monosubstituted by halogen, where, in addition, one or more CH₂ groups in these radicals may each be replaced by —O—, —S—,

—C≡C—, —CF₂O—, —OCF₂—, —OC—O— or —O—CO— in such a way that O atoms are not linked directly to one another,
$L^{1-4}$ each, independently of one another, denote F, Cl, CF₃ or CHF₂,
$Z^2$ and $Z^{2'}$ each, independently of one another, denote a single bond, —CH₂CH₂—, —CH=CH—, —CF₂O—, —OCF₂—, —CH₂O—, —OCH₂—, —COO—, —OCO—, —C₂F₄—, —CF=CF—, or —CH=CHCH₂O—,
(O) denotes —O— or a single bond,
P denotes 0, 1 or 2,
q denotes 0 or 1, and
v denotes 1 to 6.

14. A process for the preparation of a liquid-crystalline medium according to claim 1, said process comprising:
mixing one or more compounds of the formula IA and one or more compounds of the formula IB and one or more compounds of formula RV, with one or more further liquid-crystalline compounds and one or more additives of formula ST-1a and one or more additives of formula ST 2.

15. A method of generating an electro-optical effect comprising applying a voltage to a liquid-crystalline medium according to claim 1.

16. The method according to claim 15, wherein said liquid-crystalline medium is in a shutter glass, a 3D application, or in TN, PS-TN, STN, TN-TFT, OCB, IPS, PS-IPS, FFS, PS-FFS or PS-VA-IPS display.

17. An electro-optical liquid-crystal display containing a liquid-crystalline medium according to claim 1.

18. The liquid-crystalline medium according to claim 1, wherein the medium comprises one or more compounds of formula ST-1a in a total concentration of 2000 ppm to 3000 ppm.

19. The liquid-crystalline medium according to claim 1, wherein the medium comprises one or more compounds of formula ST-2 in a total concentration 400 ppm or more.

20. The liquid-crystalline medium according to claim 1, wherein the medium comprises one or more compounds of formula ST-2 in a total concentration 500 ppm or more.

21. The liquid-crystalline medium according to claim 1, wherein the medium comprises one or more compounds of formula ST-2 in a total concentration of from 300 ppm to 1000 ppm.

22. The liquid-crystalline medium according to claim 1, wherein the medium comprises one or more compounds of formula ST-2 in a total concentration of from 300 to 800 ppm.

23. The liquid-crystalline medium according to claim 1, wherein the medium comprises one or more compounds of formula ST-2 in a total concentration of from 400 to 600 ppm.

24. The liquid-crystalline medium according to claim 1, wherein the compound of formula ST-2 is a compound of the following formula:

* * * * *